United States Patent
Yasumura

(10) Patent No.: US 7,110,268 B2
(45) Date of Patent: Sep. 19, 2006

(54) SWITCHING POWER SUPPLY CIRCUIT

(75) Inventor: Masayuki Yasumura, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 11/141,346

(22) Filed: May 31, 2005

(65) Prior Publication Data

US 2005/0270805 A1    Dec. 8, 2005

(30) Foreign Application Priority Data

| May 31, 2004 | (JP) | ............................ P2004-162175 |
| Jun. 30, 2004 | (JP) | ............................ P2004-194105 |
| Sep. 13, 2004 | (JP) | ............................ P2004-265441 |
| Sep. 16, 2004 | (JP) | ............................ P2004-269828 |
| Feb. 28, 2005 | (JP) | ............................ P2005-054550 |

(51) Int. Cl.
*H02M 3/335* (2006.01)

(52) U.S. Cl. .................................. 363/21.03

(58) Field of Classification Search ............. 363/21.03, 363/21.02, 16
See application file for complete search history.

(56) References Cited

U.S. PATENT DOCUMENTS 6,483,721 B1 * 11/2002 Terashi ........................ 363/17
6,654,259 B1 * 11/2003 Koshita et al. .......... 363/21.03

FOREIGN PATENT DOCUMENTS

JP    2003-235259 A    8/2003

* cited by examiner

*Primary Examiner*—Shawn Riley
(74) *Attorney, Agent, or Firm*—Lerner,David,Littenberg, Krumholz & Mentlik,LLP

(57) ABSTRACT

The present invention provides a power supply circuit performing constant voltage control by switching frequency control and achieving minimization of a necessary control range of the switching frequency control and implementation of a configuration ready for a wide range. A switching power supply circuit includes a switching circuit, a switching driving unit, an insulating converter transformer, a primary side series resonance circuit, a secondary side series resonance circuit, a secondary side DC output voltage production unit, a constant voltage control circuit, and a composite coupling coefficient setting mechanism.

15 Claims, 44 Drawing Sheets

VAC=100V, Po=150W

VAC=100V, Po=25W

WHEN VAC=100V, Po=150W

WHEN VAC=100V, Po=25W $fo1 \approx 70kHz$, $fo2 \approx 35kHz$

WHEN VAC=100V, Po=150W

WHEN VAC=100V, Po=25W

VAC=100V, Pomax=200W

VAC=230V, Pomax=200W

VAC=100V, Pomin=0W

VAC=230V, Pomin=0W fo1≈70kHz, fo2≈80kHz

VAC=100V, Pomax=150W    VAC=230V, Pomax=150W

VAC=100V, Pomin=0W    VAC=230V, Pomin=0W fo1≒70kHz, fo2≒80kHz

VAC=100V, Po=150W        VAC=100V, Po=25W

SWITCHING POWER SUPPLY CIRCUIT

CROSS-REFERENCE TO RELATED APPLICATIONS

The present application claims priority from Japanese Application Nos. 2004-162175 filed May 31, 2004, 2004-194105 filed Jun. 30, 2004, 2004-265441 filed Sep. 13, 2004, 2004-269828 filed Sep. 16, 2004, and 2005-054550 filed Feb. 28, 2005, the disclosures of which are hereby incorporated by reference herein.

BACKGROUND OF THE INVENTION

This invention relates to a switching power supply circuit to be used as a power supply for various electronic apparatus.

Various power supply circuits having a resonance type converter on the primary side have been proposed by the assignee of the present application. One such power supply circuit is disclosed, for example, in Japanese Patent Laid-Open No. 2003-235259 (hereinafter referred to as Patent Document 1).

FIG. 44 shows the switching power supply circuit disclosed in Patent Document 1 which includes a resonance type converter. Referring to FIG. 44, the power supply circuit shown includes a switching converter. The switching converter is configured such that a partial voltage resonance circuit for performing a voltage resonance operation only upon turn-off during switching is combined with a separately excited current resonance type converter of a half bridge coupling scheme.

The switching power supply circuit shown in FIG. 44 is provided, for example, as a power supply of a printer apparatus. In the printer apparatus, for example, the load power exhibits a variation over a comparatively wide range from approximately 100 W or more to no load.

In the power supply circuit shown in FIG. 44, a common mode noise filter formed from two filter capacitors CL and a common mode choke coil CMC is connected to a commercial AC power supply AC.

Further, as a rectification smoothing circuit for producing a DC input voltage from the commercial AC power supply AC, a full wave rectification circuit formed from a bridge rectification circuit Di and a smoothing capacitor Ci is provided at the stage following the common mode noise filter.

The rectification output of the bridge rectification circuit Di is charged into the smoothing capacitor Ci, and as a result, a rectification smoothed voltage Ei (DC input voltage) having a level equal to that of an AC input voltage VAC is obtained across the smoothing capacitor Ci.

The current resonance type converter for receiving and switching the DC input voltage includes a switching circuit system wherein two switching devices Q1 and Q2, each formed from a MOS-FET, are connected to each other in a half bridge coupling scheme as seen in FIG. 44. Damper diodes DD1 and DD2 each formed from a body diode are individually connected in parallel to each other and in such directions as seen in FIG. 44 between the drain-source of the switching devices Q1 and Q2, respectively.

Further, a partial resonance capacitor Cp is connected in parallel between the drain-source of the switching device Q2. A parallel resonance circuit (partial voltage resonance circuit) is formed from the capacitance of the partial resonance capacitor Cp and the leakage inductance L1 of a primary winding N1. The partial voltage resonance circuit performs a partial voltage resonance operation wherein it voltage resonates only when the switching devices Q1 and Q2 are turned off.

In the power supply circuit, in order to switching drive the switching devices Q1 and Q2, an oscillation and driving circuit 2 formed from, for example, a general-purpose IC is provided. The oscillation and driving circuit 2 includes an oscillation circuit and a driving circuit, and applies a driving signal (gate voltage) having a required frequency to the gates of the switching devices Q1 and Q2. Consequently, the switching devices Q1 and Q2 perform a switching operation such that they are turned on and off alternately at a required switching frequency.

An insulating converter transformer PIT (Power Isolation Transformer) transmits the switching outputs of the switching devices Q1 and Q2 to the secondary side.

In this instance, the primary winding N1 of the insulating converter transformer PIT is connected at one end thereof to a node (switching output point) between the source of the switching device Q1 and the drain of the switching device Q2 through a series connection with a primary side series resonance capacitor C1 so that the switching output can be obtained from the node. The primary winding N1 is connected at the other end thereof to the primary side ground as seen in FIG. 44.

In this instance, the series resonance capacitor C1 and the primary winding N1 are connected in series to each other. Thus, a primary side series resonance circuit for making the operation of the switching converter that of a current resonance type is formed from the capacitance of the series resonance capacitor C1 and the leakage inductance L1 of the primary winding N1 (series resonance winding) of the insulating converter transformer PIT.

From the description above, resonance operation of the current resonance type by the primary side series resonance circuit (L1–C1) and partial voltage resonance operation by the partial voltage resonance circuit (Cp//L1) described hereinabove can be obtained by the primary side switching converter shown in FIG. 44.

In particular, the power supply circuit shown in FIG. 44 adopts a form in which the resonance circuit for making the operation of the primary side switching converter that of the resonance type is combined with another resonance circuit. A switching converter of the type just described is hereinafter referred to as a composite resonance type converter.

While a description with reference to the drawings is omitted here, the insulating converter transformer PIT described above is structured such that it includes an EE type core formed by combining E type cores made of, for example, a ferrite material with each other. Further, the primary winding N1 and a secondary winding N2 are wound on an inner magnetic leg of the EE type core at winding portions provided divisionally for the primary and secondary sides.

Further, a gap of 1.5 mm or less is formed in the inner magnetic leg of the EE type core of the insulating converter transformer PIT. Consequently, a coupling coefficient of 0.75 or more is obtained between the primary winding N1 and the secondary winding N2.

For the secondary winding N2 of the insulating converter transformer PIT, a full wave rectification circuit is provided. The full wave rectification circuit is formed from a bridge rectification circuit formed from rectification diodes Do1 to Do4, and a smoothing capacitor Co.

Consequently, a secondary side DC output voltage Eo, which is a DC voltage having a level equal to that of the alternating voltage induced in the secondary winding N2, can be obtained as a voltage across the smoothing capacitor Co. The secondary side DC output voltage Eo is supplied as a main DC power supply to a main load (not shown), and is also branched and input as a detection voltage for constant voltage control to the control circuit 1.

The control circuit 1 outputs a control signal to the oscillation and driving circuit 2 in the form of a current or a voltage whose level is adjusted corresponding to that of the secondary side DC output voltage Eo.

The frequency of an oscillation signal produced by the oscillation circuit in the oscillation and driving circuit 2 is adjusted based on the control signal input from the control circuit 1 to adjust the frequency of the switching driving signal to be applied to the gates of the switching devices Q1 and Q2. Consequently, the switching frequency is adjusted. Since the switching frequency of the switching devices Q1 and Q2 is adjustably controlled in response to the level of the secondary side DC output voltage Eo in this manner, the resonance impedance of the primary side series resonance circuit is varied and also the energy to be transferred from the primary winding N1, which forms the primary side series resonance circuit, to the secondary side is varied. Further, at this time, the level of the secondary side DC output voltage Eo is also adjustably controlled. Consequently, constant voltage control for the secondary side DC output voltage Eo can be implemented.

It is to be noted that such constant voltage control for adjustably controlling the switching frequency to achieve stabilization as described above is hereinafter referred to as the "switching frequency controlling method".

FIG. 46 is a waveform diagram illustrating the operation of part of the power supply circuit shown in FIG. 44. Referring to FIG. 46, waveforms on the left side indicate the operation when the load power Po is Po=150 W, and waveforms on the right side indicate the operation of the same portions when the load power Po is Po=25 W. As an input voltage condition, the AC input voltage VAC is fixed at VAC=100 V.

Referring to FIG. 46, the voltage V1 of a rectangular wave is a voltage across the switching device Q2 and indicates on and off timings of the switching device Q2. The period that the voltage V1 is at the 0 level is an on period in which the switching device Q2 conducts. Within the on period, switching current IQ2 having the waveform illustrated in FIG. 46 is supplied to the switching circuit system formed from the switching device Q2 and the clamp diode DD2. Further, the period that the voltage V1 is clamped at the level of a rectification smoothed voltage Ei is a period in which the switching device Q2 is off, and the switching current IQ2 has the zero level as seen in FIG. 46.

Further, though not shown, the voltage obtained across the other switching device Q1 and the switching current flowing to the switching circuit (Q1, DD1) have waveforms shifted by 180° in phase from the waveforms of the voltage V1 and the switching current IQ2, respectively. In short, as described above, the switching devices Q1 and Q2 perform the switching operation such that they are turned on and off alternately.

Further, the switching currents flowing to the switching circuits (Q1, DD1 and Q2, DD2) are composed to obtain a current having the waveform shown in FIG. 46, and the resulting current is used as the primary side series resonance current Io to flow to the primary side series resonance circuit (C1–N1(L1)).

Further, it can be recognized, for example, from a comparison between the waveform of the voltage V1 shown in FIG. 46 when the load power Po=150 W and the waveform of the voltage V1 shown in FIG. 46 when the load power Po=25 W that the switching frequency is controlled. The switching frequency on the primary side, when the load to the secondary side DC output voltage Eo is heavy (Po=150 W), is lower than that when the load to the secondary side DC output voltage Eo is light (Po=25 W). In particular, the switching frequency decreases in response to a decrease in the level of the secondary side DC output voltage Eo as the load becomes heavier, but the switching frequency increases in response to an increase in the level of the secondary side DC output voltage Eo as the load becomes lighter. This indicates the fact that a constant voltage controlling operation by upper side control is performed as a switching frequency controlling method.

Further, since the operation on the primary side described above is obtained, an alternating voltage V2 having the waveform shown in FIG. 46 is induced in the secondary winding N2 of the insulating converter transformer PIT. Then, within the period of any one of the half cycles in which the alternating voltage V2 has a positive polarity, the rectification diodes [Do1, Do4] on the secondary side conduct to allow rectification current ID1 to flow in the waveform and at the timing shown in FIG. 46. Further, within the period of the other one of the half cycles in which the alternating voltage V2 has a negative polarity, the rectification diodes [Do2, Do3] on the secondary side conduct to allow rectification current ID3 to flow in the waveform and at the timing shown in FIG. 46. Further, as seen in FIG. 46, the rectification currents ID1 and ID3 are composed to form secondary winding current I2 to flow to the secondary winding N2.

FIG. 47 illustrates an AC→DC power conversion efficiency and a characteristic of the switching frequency of the power supply circuit shown in FIG. 44 with respect to the load variation under the input voltage condition of the AC input voltage VAC=100 V.

The switching frequency fs has a characteristic that it decreases as the load increases because the constant voltage controlling operation is performed. However, the characteristic just described is not a linear variation characteristic with respect to the load variation. For example, within a range from the load power Po=approximately 25 W to Po=0 W or less, the tendency is exhibited that the switching frequency fs increases steeply.

Meanwhile, the AC→DC power conversion efficiency ($\eta$AC→DC) has a tendency that it increases as the load power Po increases, and when the load power Po=150 W, an $\eta$AC→DC power conversion efficiency of approximately 91.0% is obtained.

It is to be noted that, in order to obtain the experimental results described with reference to FIGS. 46 and 47, the components shown in FIG. 44 are set as mentioned just below.

Insulating converter transformer PIT (EER-35 type ferrite core, gap length=1.4 mm, coupling coefficient k=0.75)

Primary winding N1=35 T (turns), secondary winding N2=50 T

Primary side series resonance capacitor C1=0.039 µF

Partial resonance capacitor Cp=330 pF

Another example of the switching power supply circuit is shown in the circuit diagram of FIG. 45. It is to be noted that, in FIG. 45, like elements to those of FIG. 44 are denoted by like reference characters, and a description of them is omitted herein to avoid redundancy.

The secondary side rectification circuit of the power supply circuit shown in FIG. 45 includes a full wave rectification circuit. In particular, a center tap is provided for the secondary winding N2 such that the secondary winding N2 is divided into secondary winding sections N2A and N2B. In this instance, the secondary winding sections N2A and N2B are formed from numbers of turns equal to each other. Further, the center tap is grounded to the secondary side ground. Furthermore, the rectification diodes Do1 and Do2 and the secondary side smoothing capacitor Co are connected to the secondary winding N2. By the full wave rectification circuit, the secondary side DC output voltage Eo can be obtained as a voltage across the smoothing capacitor Co.

A power supply circuit having the configuration described above may be provided as the power supply of a plasma display apparatus. In the plasma display apparatus, the load power Po varies over a comparatively wide range, for example, from Po=100 W or more to no load. Further, a secondary side DC output voltage having, for examples a comparatively high level of 200 V or more is required.

When an experiment regarding the power supply circuit shown in FIG. 45 was performed, results of operation and a characteristic substantially equal to those illustrated in FIGS. 46 and 47 were obtained.

It is to be noted that, when the experiment was performed, the components of the circuit shown in FIG. 45 were set as given below.

Insulating converter transformer PIT (EER-35 type ferrite core, gap length=1.4 mm, coupling coefficient k=0.75)

Primary winding N1=35 T (turns), secondary winding N2=secondary winding section N2A+secondary winding N2B=50 T+50 T=100 T Primary side series resonance capacitor C1=0.039 μF Partial resonance capacitor Cp=330 pF As described above, the power supply circuit shown in FIG. 45 is provided as a power supply of a plasma display apparatus and is configured so that the secondary side DC output voltage Eo obtained has a comparatively high level. In order to cope with this, in the circuit shown in FIG. 45, the secondary side rectification circuit is formed as a full wave rectification circuit, and the number of turns of the secondary winding N2 is suitably increased to 100 T.

Incidentally, where the configuration as a resonance type converter for implementing stabilization of the secondary side DC output voltage by the switching frequency controlling method is adopted as in the case of the power supply circuit shown in FIG. 44 (FIG. 45), the adjustable controlling range of the switching frequency for stabilization is a comparatively wide range.

This is described with reference to FIG. 48. FIG. 48 illustrates a constant voltage controlling characteristic of the power supply circuit shown in FIG. 44 (FIG. 45) in the form of a relationship between the level of the switching frequency fs and the level of the secondary side DC output voltage Eo.

It is to be noted that, in the description given with reference to FIG. 48, it is a premise that the power supply circuit in FIG. 44 (FIG. 45) adopts upper side control as the switching frequency controlling method. Upper side control as used herein is a controlling method for adjustably controlling the switching frequency within a frequency range higher than a resonance frequency fo1 of the primary side series resonance circuit and utilizing the variation of the resonance impedance caused by the adjustment control to control the level of the secondary side DC output voltage Eo.

Generally, the resonance impedance of the series resonance circuit is lowest at the resonance frequency fo1. Consequently, as a relationship between the secondary side DC output voltage Eo and the switching frequency fs in upper side control, the level of the secondary DC output voltage Eo increases as the switching frequency fs approaches the resonance frequency fo1, but decreases as the switching frequency fs moves away from the resonance frequency fo1.

Accordingly, as seen in FIG. 48, the level of the secondary side DC output voltage Eo with respect to the switching frequency fs in a condition that the load power Po is constant exhibits a quadratic curve variation. In particular, the level of the secondary side DC output voltage Eo exhibits a peak when the switching frequency fs is equal to the resonance frequency fo1 of the primary side series resonance circuit, and decreases as the switching frequency fs moves away from the resonance frequency fo1.

Further, the level of the secondary side DC output voltage Eo corresponding to the switching frequency fs in the same condition as that described above exhibits a characteristic that it shifts such that the level at the maximum load power Pomax is less by a predetermined amount than the level at the minimum load power Pomin. In particular, where it is considered that the switching frequency fs is fixed, the level of the secondary side DC output voltage Eo decreases as the load condition becomes heavier.

If an attempt is made to stabilize the secondary side DC output voltage Eo by upper side control so that Eo=tg may be satisfied where such a characteristic as just described is exhibited, then the adjustment range (necessary control range) of the switching frequency necessary for the power supply circuit shown in FIG. 44 (FIG. 45) is a range indicated by the reference character Δ fs.

Actually, the power supply circuit shown in FIG. 44 performs the constant voltage control based on the switching frequency controlling method so that the secondary side DC output voltage Eo is stabilized at 135 V so as to cope with the input variation range and the load conditions. The variation range is from the AC input voltage VAC=85 V to 120 V of the AC 100 V type. The load conditions are the maximum load power Pomax=150 W and the minimum load power Pomin=0 W (no load) to the secondary side DC output voltage Eo, which is a main DC power supply.

In this instance, the variation range of the switching frequency fs that is varied for the constant voltage control by the power supply circuit shown in FIG. 44 is fs=80 kHz to 200 kHz or more, and also the range Δ fs is a correspondingly wide range of 120 kHz or more.

Further, the power supply circuit shown in FIG. 45 performs the constant voltage control so that the secondary side DC output voltage Eo is stabilized at the rated level of approximately 200 V. Therefore, similar to the power supply circuit shown in FIG. 44, the range Δ fs of the power supply circuit shown in FIG. 45 is a correspondingly wide range.

As one of the power supply circuits, a power supply circuit ready for a wide range is known, which is configured so as to operate with an AC input voltage range, for example, from approximately AC 85 V to 288 V. It can be applied both in an area in which the AC input voltage of the AC 100 V type is used, such as, for example, Japan, U.S.A. and so forth, and in another area in which the AC input voltage of the AC 200 V type is used, such as, for example, Europe.

Thus, it is considered here that the power supply circuit shown in FIG. 44 (FIG. 45) is configured as a power supply circuit ready for a wide range as described above.

As described above, where the power supply circuit is ready for a wide range, it is ready for an AC input voltage range, for example, from AC 85 V to 288 V. Accordingly, the variation range of the level of the secondary side DC output voltage Eo increases when compared with that in an alternative case in which the power supply circuit is ready for a single range of, for example, only the AC 100 V type or only the AC 200 V type. In order to perform the constant voltage control for the secondary side DC output voltage Eo whose variation range is expanded in correspondence to such an AC input voltage range as described above, switching frequency control over a still wider range is required. For example, in the power supply circuit shown in FIG. 44 (FIG. 45), it is necessary to expand the controlling range of the switching frequency fs to approximately 80 kHz to 500 kHz.

However, the upper limit to the driving frequency with which an IC (oscillation driving circuit 2) for driving an actual switching device can cope is approximately 200 kHz. Further, even if a switching driving IC that can be driven with such a high frequency as described above is configured and mounted, when the switching device is driven with such a high frequency as described above, the power conversion efficiency drops remarkably. Therefore, it is difficult to practically use the switching driving IC described above as an actual power supply circuit. Incidentally, the upper limit to the AC input voltage VAC which can be stabilized, for example, by the power supply circuit shown in FIG. 44 (FIG. 45), is approximately 100 V.

Therefore, in order to configure a switching power supply circuit using switching frequency control for stabilization as a switching power supply circuit ready for a wide range, it is known to adopt, for example, such a configuration as described below.

In particular, a rectification circuit system receiving a commercial AC power supply to produce the DC input voltage (Ei) is provided with a function of performing a changeover between a voltage doubler rectification circuit and a full wave rectification circuit in response to an input of commercial AC power supply of the AC 100 V type and the AC 200 V type.

In this instance, the circuit is configured such that the level of the commercial AC power supply is detected and the circuit connection of the rectification circuit system is changed over by a switch using an electromagnetic relay such that a voltage doubler rectification circuit or a full wave rectification circuit is formed in response to the detected level.

However, in such a configuration for the changeover of the rectification circuit system as described above, a number of electromagnetic relays are required as described above. Further, at least a pair of smoothing capacitors must be provided in order to form a voltage doubler rectification circuit. Therefore, the number of parts increases and this increases the cost. Also, the mounting area of a power supply circuit board is expanded to increase the size of the circuit. In particular, since the smoothing capacitors and the electromagnetic relays are large-size parts from among those parts forming the power supply circuit, the size of the board becomes rather large.

Where the configuration for changeover between full wave rectification operation and voltage doubler rectification operation is applied, if, when the commercial AC power supply of the AC 200 V type is input, the level of the AC input voltage becomes lower than that corresponding to the AC 200 type because an instantaneous service interruption occurs or the AC input voltage decreases to a voltage level lower than the rated voltage or the like, then a malfunction may occur in which it is detected that the commercial AC power supply input is the AC 100 V type and a changeover from the full wave rectification circuit to the voltage doubler rectification circuit is performed. If such a malfunction occurs, then the voltage doubler rectification will be performed for an AC input voltage having the level of the AC 200 V type. Therefore, there is the possibility that, for example, the switching devices Q1, Q2 and so forth may be broken by being subjected to a voltage higher than that which they can withstand.

Therefore, as an actual circuit, in order to prevent the occurrence of such a malfunction as described above, a configuration is adopted in which not only is the DC input voltage of the switching converter on the main power supply side detected, but the DC input voltage of the converter circuit on the standby power supply side is also detected. Consequently, a member for detecting the converter circuit on the standby power supply side must be added, and an increase of the cost described above and an increase of the size of the circuit board result.

Further, the DC input voltage of the converter on the standby power supply side is detected in order to prevent a malfunction. This signifies that only an electronic apparatus which includes not only a main power supply but also a standby power supply can actually use a power supply circuit which includes a circuit for changing over the rectification operation and which is ready for a wide range. In other words, the type of electronic apparatus in which the power supply can be incorporated is limited to that which includes a standby power supply, and the range of utilization becomes much narrower.

Further, as a configuration ready for a wide range, a configuration is also known in which the form of the current resonance converter on the primary side is changed over between that of a half bridge connection and that of a full bridge connection in response to an input of a commercial power supply of the A 100 V type/AC 200 V type.

With the configuration just described, even if the AC input voltage of the AC 200 V type drops to the level of the AC 100 V type, for example, as a result of such instantaneous interruption as described above or the like to cause a malfunction, the switching operation is only changed over from a half bridge operation to a full bridge operation. As a result, a situation does not arise in which a voltage higher than the withstanding voltage is applied to the switching devices. Therefore, the DC input voltage on the standby power supply side need not be detected. Consequently, the configuration can be applied to an electronic apparatus that does not include a standby power supply. Further, since a changeover of the commercial power supply line is not involved, a changeover of the circuit formation by a semiconductor switch is possible. Therefore, a large-size switching member such as an electromagnetic relay need not be provided.

However, with the configuration described above, at least four switching devices must be provided in order to form a full bridge connection in response to the AC 100 V type. In particular, in comparison with the configuration of a converter using only a half bridge connection, which can be formed from two switching devices, an additional two switching devices must be added.

Further, in the configuration described, four switching devices perform the switching operation in the full bridge operation, and three switching devices perform the switching operation even in the half bridge operation. While the resonance converter produces low switching noise, the disadvantage in regard to switching noise increases as the number of switching devices performing switching operations in such a manner as described above increases.

Also, where any one of the configurations described above is adopted as a configuration ready for a wide range in such a manner as described above, when compared with an alternative configuration ready for a single range, an increase in the circuit scale and an increase in the cost caused by an increase in the number of parts cannot be avoided. Further, intrinsic problems which do not appear with the configuration ready for a single range, such as a limitation on the range of apparatuses which can be utilized and an increase in the switching noise and so forth occur with the former configuration and the latter configuration, respectively.

Further, where the control range of the switching frequency is a suitably wide range as in the case of the power supply circuit shown in FIG. 44 (FIG. 45), a problem also occurs that a high-speed response characteristic in the stabilization of the secondary side DC output voltage Eo decreases.

Some electronic apparatus involve varying operations such that the load condition changes over instantaneously, for example, between a state in which the load has a maximum level and another state in which the load is substantially zero. A load exhibiting such a load variation as just described is also called a switching load. The power supply circuit to be incorporated in such an apparatus as just described must be configured so that the secondary side DC output voltage is appropriately stabilized against a load variation such as that of a switching load.

However, as described above with reference to FIG. 48, where the switching frequency has a characteristic of a wide control range, a comparatively long time is required to adjust the switching frequency with which the secondary side DC output voltage is provided to the required level in response to a load variation such as that of the switching load described above. In short, an undesirable result is obtained as the response characteristic of the constant voltage control.

It can be recognized that the power supply circuit shown in FIG. 44 (FIG. 45) is particularly disadvantageous in the constant voltage control response characteristic to a switching load as described above. In the switching frequency characteristic according to the constant voltage control, the switching frequency varies by a great amount within the load range from the load power Po=approximately 25 W to 0 W as seen in FIG. 47.

SUMMARY OF THE INVENTION

According to the present invention, there is provided a switching power supply circuit including a switching circuit, a switching driving unit, an insulating converter transformer, a primary side series resonance circuit, a secondary side series resonance circuit, a secondary side DC output voltage production unit, a constant voltage control unit, and a composite coupling coefficient setting unit. The switching circuit includes a switching device operable to perform a switching operation at a switching frequency based on a DC input voltage. The switching driving unit drives the switching device to perform the switching operation. The insulating converter transformer has a core with a primary winding on a primary side and a secondary winding on a secondary side, the primary winding being supplied with the switching output of the switching operation, and the secondary winding having an alternating voltage induced therein by the primary winding. The core has a gap formed at a predetermined position between the primary side and the secondary side, the gap having a length selected to produce a predetermined coupling coefficient between the primary side and secondary side. The primary side series resonance circuit includes a leakage inductance component of the primary winding and a capacitance of a primary side series resonance capacitor connected in series with the primary winding for producing a predetermined primary side resonance frequency for making the switching circuit operate on a current resonance basis. The secondary side series resonance circuit includes a leakage inductance component of the secondary winding and a capacitance of a secondary side series resonance capacitor connected in series with the secondary winding for producing a predetermined secondary side resonance frequency. The primary side series resonance circuit and the secondary side series resonance circuit form an electromagnetic coupling type resonance circuit. The secondary side DC output voltage production unit is operable to input a resonance output from the secondary side series resonance circuit and to perform a rectification operation on the input resonance output to produce a secondary side DC output voltage. The constant voltage control unit is operable to control the switching driving unit in response to a level of the secondary side DC output voltage to adjust the switching frequency of the switching circuit to perform constant voltage control for the secondary side DC output voltage. The composite coupling coefficient setting unit is operable to set a composite coupling coefficient between the primary side and the secondary side of the insulating converter transformer so that the electromagnetic coupling type resonance circuit has a unimodal output characteristic with respect to an input of a frequency signal having the switching frequency.

The switching power supply circuit adopts the basic configuration of a current resonance type converter including a primary side series resonance circuit, and also forms a series resonance circuit on the secondary side from the secondary winding and a secondary side series resonance capacitor.

Where the configuration described is adopted, the switching power supply circuit of the present invention includes a coupling type resonance capacity formed by the magnetic coupling of the insulating converter transformer. Further, the composite coupling coefficient between the primary side and the secondary side of the insulating converter transformer in the power supply circuit is set so that a unimodal output characteristic is obtained with respect to an input of a frequency signal (switching output) having the switching frequency. Since the unimodal characteristic is obtained in this manner, the variation range or necessary control range of the switching frequency required for stabilization can be reduced when compared with an alternative case wherein a series resonance circuit is formed only on the primary side.

In this manner, with the switching power supply circuit, the variable control range, that is, the necessary control range, of the switching frequency necessary for the constant voltage control is reduced.

Consequently, a resonance type converter ready for a wide range only by the switching frequency control can be readily obtained. Where a wide range can be achieved with only the switching frequency control, the necessity, for example, to change over a rectification circuit system in response to the level of a commercial AC power supply or to adopt a configuration for changing over a switching circuit system between a half bridge connection and a full bridge connection is eliminated. Consequently, advantages can be realized, including a reduction in the number of circuit components and a reduction in the board area, that the range of application of the power supply circuit to electronic apparatus is expanded, and that the switching power supply circuit is tough against switching noise.

As a basic configuration for achieving such advantages of the present invention as described above, it is only necessary to add a secondary side series resonance capacitor to the configuration of the current resonance type converter including the primary side series resonance circuit, and to adopt a configuration for the provision of an inductor connected in series with the primary winding and/or the secondary winding. Therefore, the need to increase the number of parts or to alter the parts is very small.

Further, where the necessary control range of the switching frequency is reduced as described above, the reliability of the constant voltage control is improved. This makes it possible to perform constant voltage control with a higher reliability than ever for a load variation called a switching load which varies in a switching manner between a maximum load condition and a no-load condition. This enhances the reliability of an apparatus in which the switching power supply circuit is incorporated.

BRIEF DESCRIPTION OF THE DRAWINGS

These and other objects of the invention will be seen by reference to the description, taken in connection with the accompanying drawings, in which.

DETAILED DESCRIPTION

Figure 1:
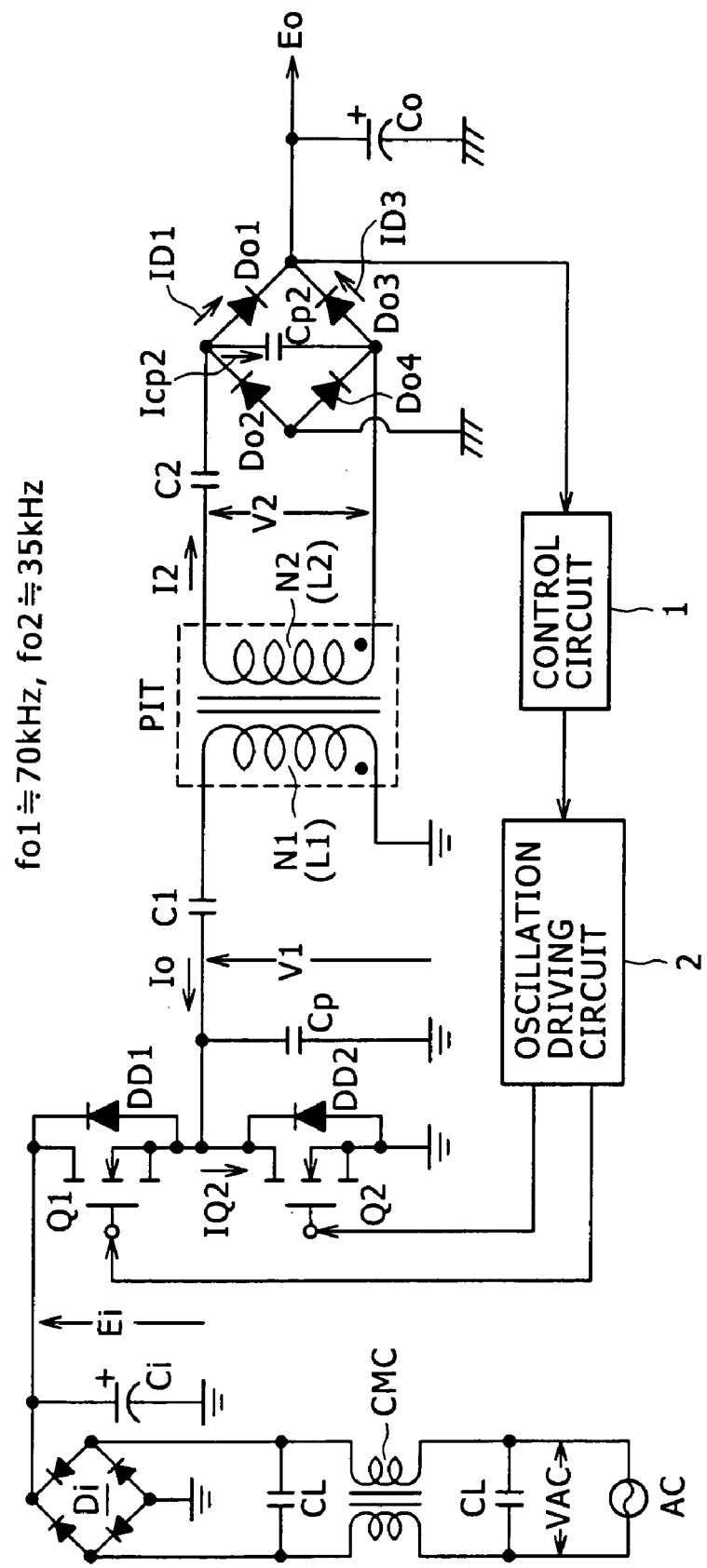
FIG. 1 is a circuit diagram showing an example of the configuration of a power supply circuit according a first embodiment of the present invention.

FIG. 1 shows an example of the configuration of a switching power supply circuit according to a first embodiment of the present invention. Referring to FIG. 1, the power supply circuit is configured such that the basic configuration of the primary side thereof is a combination of a partial voltage resonance circuit with a separated excited current resonance type converter of a half-bridge coupling type.

Further, the power supply circuit of the first embodiment has a configuration ready for a wide range. The circuit operates in response to commercial AC power supplies of both the AC 100 V type and the AC 200 V type. Further, the power supply circuit is ready for a range of variation of the load power Po, for example, from Po=approximately 150 W (100 W or more) to Po=0 W (no load).

Furthermore, the power supply circuit is supposed to be used as a power supply, for example, of a printer apparatus and is configured so as to be ready for a load power Po from 150 W to 0 W.

First, in the power supply circuit shown in FIG. 1, a common mode noise filter is provided for a commercial AC power supply AC and is formed from a pair of filter capacitors CL and a common mode choke coil CMC.

Further, a full-wave rectification circuit including a bridge rectification circuit Di and a smoothing capacitor Ci is connected to the commercial AC power supply AC at the stage following the noise filter.

The full-wave rectification circuit receives the commercial AC power supply AC to perform a full-wave rectification operation such that a rectification smoothed voltage Ei (DC input voltage) is obtained across the smoothing capacitor Ci. The rectification smoothed voltage Ei in this instance has a voltage level equal to that of an AC input voltage VAC.

A current resonance type converter for receiving and switching (interrupting) the DC input voltage includes a switching circuit formed from two switching elements Q1 and Q2 each in the form of a MOS-FET connected in a half-bridge connection as seen in FIG. 1. Damper diodes DD1 and DD2 are connected in parallel between the drain-source of the switching elements Q1 and Q2, respectively. The anode and the cathode of the damper diode DD1 are connected to the source and the drain, respectively, of the switching element Q1. Similarly, the anode and the cathode of the damper diode DD2 are connected to the source and the drain, respectively, of the switching element Q2. The damper diodes DD1 and DD2 are provided as body diodes for the switching elements Q1 and Q2, respectively.

Further, a primary side partial resonance capacitor Cp is connected in parallel between the drain-source of the switching element Q2. The capacitance of the primary side partial resonance capacitor Cp and the leakage inductance L1 of a primary winding N1 cooperatively form a parallel resonance circuit (partial voltage resonance circuit). A partial voltage resonance operation is obtained in which the switching elements Q1 and Q2 exhibit voltage resonance only when the switching elements Q1 and Q2 are turned off.

An oscillation driving circuit 2 is provided to drive the switching elements Q1 and Q2 for switching. The oscillation driving circuit 2 includes an oscillation circuit and a driving circuit and may be formed, for example, using an IC for universal use. The oscillation circuit of the oscillation driving circuit 2 generates an oscillation signal of a required frequency, and the driving circuit makes use of the oscillation signal to generate a switching driving signal used as a gate voltage for driving a MOS-FET for switching. The switching driving signal is applied to the gates of the switching elements Q1 and Q2. Consequently, the switching elements Q1 and Q2 perform a switching operation such that they successively and alternately turn on and off in accordance with a switching frequency corresponding to the period of the switching driving signal.

An insulating converter transformer PIT is provided to transmit the switching outputs of the switching elements Q1 and Q2 to the secondary side.

The insulating converter transformer PIT has the primary winding N1. The primary winding N1 is connected at one end thereof to a node (switching output point) between the source of the switching element Q1 and the drain of the switching element Q2 through a series connection with a primary side series resonance capacitor C1 so that the switching outputs are transmitted. The primary winding N1 is connected at the other end thereof to the primary side ground.

Figure 2:
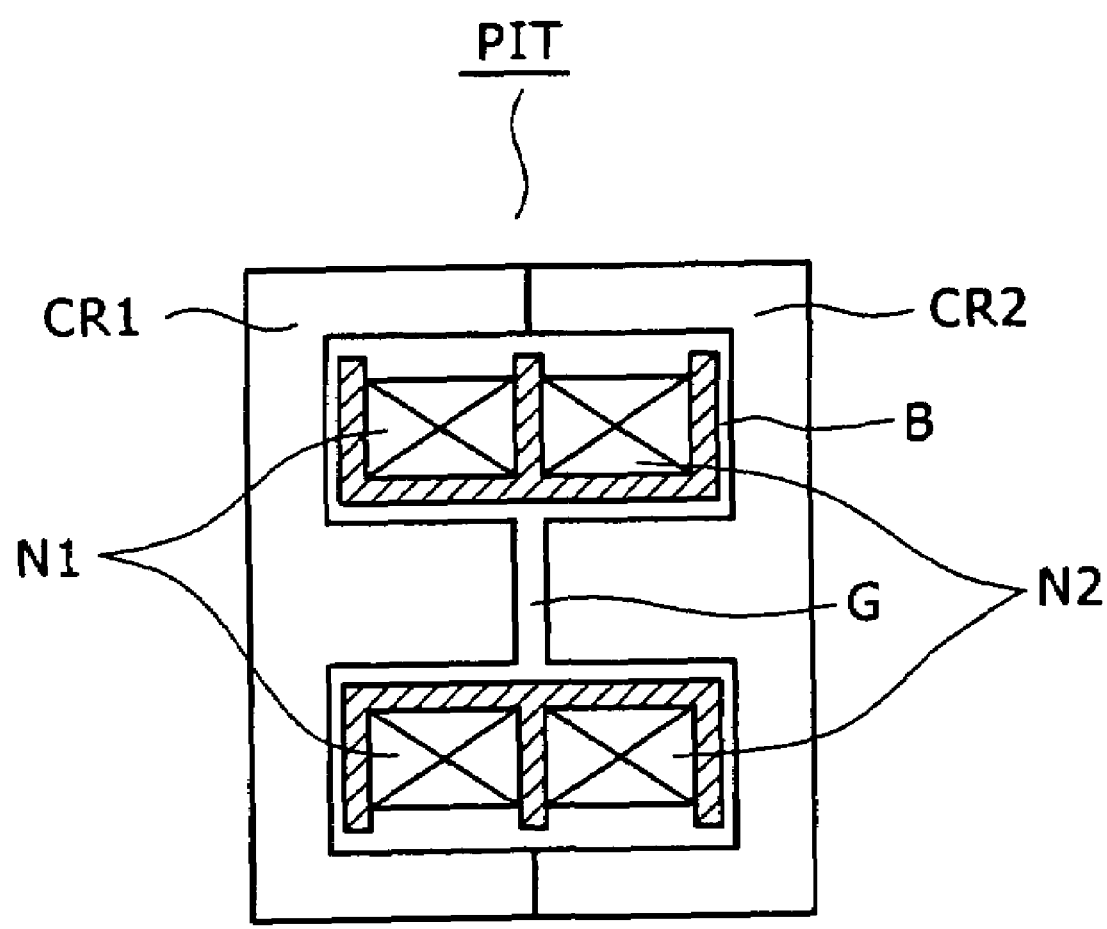
FIG. 2 is a sectional view showing an example of the structure of an insulating converter transformer provided in the switching power supply circuit of the first embodiment.

The insulating converter transformer PIT has the structure shown in the sectional view of FIG. 2. Referring to FIG. 2, the insulating converter transformer PIT includes an EE type core (EE-shaped core) formed from a pair of E-type cores CR1 and CR2 made of a ferrite material and combined such that magnetic legs thereof are opposed to each other.

The insulating converter transformer PIT further includes a bobbin B made of, for example, a resin material and having such a divisional shape that winding receiving portions on the primary side and the secondary side thereof are independent of each other. The primary winding N1 is wound on one of the winding receiving portions of the bobbin B. Meanwhile, a secondary winding N2 is wound on the other winding receiving portion. The bobbin B on which the primary winding N1 and the secondary winding N2 are wound in this manner is attached to the EE type core (CR1, CR2). Consequently, the primary side winding and the secondary side winding are wound in different winding regions on the inner magnetic leg of the EE type core. Thus, the structure of the insulating converter transformer PIT as a whole is obtained.

A gap G is formed in the manner seen in FIG. 2 in the inner magnetic leg of the EE type core. The gap G in this instance is formed such that the gap length thereof is set, for example, to approximately 2.8 mm so that the coupling coefficient k between the primary side and the secondary side may be, for example, k=0.65 or less, indicating a loose coupling state. Actually, the coupling coefficient k was set to k=0.63. The gap G can be formed by forming the inner magnetic leg of each of the E-type cores CR1 and CR2 shorter than the outer two magnetic legs.

Incidentally, in power supply circuits in the related art which include a current resonance type converter such as the power supply circuit described hereinabove with reference to FIG. 44 or 45, the gap formed in the core of the insulating converter transformer PIT is set, for example, to 1.5 mm to 1.6 mm or less so as to obtain a coupling coefficient k of 0.75 or more.

In short, in the present embodiment, the coupling degree between the primary side and the secondary side of the insulating converter transformer PIT is set lower than in the power supply circuits in the related art.

Referring back to FIG. 1, in the insulating converter transformer PIT having the configuration described above with reference to FIG. 2, the primary winding N1 has a predetermined leakage inductance L1. Further, as described hereinabove, the primary winding N1 and the primary side series resonance capacitor C1 are connected in series. Accordingly, the leakage inductance L1, of the primary winding N1, and the capacitance of the primary side series resonance capacitor C1 cooperatively form a series resonance circuit (primary side series resonance circuit).

The primary side series resonance circuit is connected to the switching output point of the switching elements Q1 and Q2. Consequently, the switching output of the switching elements Q1 and Q2 is transmitted to the primary side series resonance circuit. The primary side series resonance circuit performs a resonance operation with the switching output transmitted thereto to thereby make the operation of the primary side switching converter that of a current resonance type.

Incidentally, from the foregoing description, the primary side switching converter shown in FIG. 1 performs operations of the current resonance type by the primary side series resonance circuit (L1–C1) and partial voltage resonance operations by the primary side partial voltage resonance circuit (Cp//L1) described hereinabove.

In other words, the primary side of the power supply circuit shown in FIG. 1 has a configuration as follows. A resonance circuit for making the primary side switching converter that of a resonance type is combined with another resonance circuit. A switching converter formed from a combination of two resonance circuits in this manner is hereinafter referred to as a "composite resonance type converter".

An alternating voltage corresponding to the switching output transmitted to the primary winding N1 is excited (induced) in the secondary winding N2 of the insulating converter transformer PIT.

A secondary side series resonance capacitor C2 is connected in series to one end portion of the secondary winding N2. Consequently, a secondary side series resonance circuit is formed from the capacitance of the secondary side series resonance capacitor C2 and a leakage inductance L2 of the secondary winding N2. In short, in the present embodiment, a series resonance circuit is formed on each of the primary and secondary sides of the insulating converter transformer PIT.

A full-wave rectification circuit is connected to the secondary side series resonance circuit (L2–C2). The full-wave rectification circuit is formed from a bridge rectification circuit formed from four rectification diodes Do1 to Do4 connected in the manner seen in FIG. 1, and a smoothing capacitor Co.

The full rectification circuit operates such that, within one of two half periods of an alternating voltage excited in the secondary winding N2, the set of the rectification diodes [Do1, Do4] of the bridge rectification circuit conduct to charge the rectification current into the smoothing capacitor Co. On the other hand, within the other half period of the alternating voltage excited in the secondary winding N2, the other set of the rectification diodes [Do2, Do3] conduct to charge the rectification current into the smoothing capacitor Co.

Consequently, a secondary side DC output voltage Eo obtained as a voltage across the smoothing capacitor Co has a level equal to the level of the alternating voltage excited in the secondary winding N2.

The secondary side DC output voltage Eo obtained in this manner is supplied to a load (not shown) and also is branched and input as a detection voltage for a control circuit 1 hereinafter described.

Further, since the full wave rectification circuit performs a rectification smoothing operation for the resonance output of the secondary side series resonance circuit, the secondary side rectification operation of the full wave rectification circuit is also that of a current resonance type. In short, the rectification current waveform includes a sine waveform of the resonance frequency of the secondary side series resonance circuit.

In the present embodiment, the relationship between the resonance frequency fo1 of the primary side series resonance circuit and the resonance frequency fo2 of the secondary side series resonance circuit is set such that the resonance frequency fo2 is lower than the resonance frequency fo1. Actually, in the power supply circuit shown in FIG. 1, the resonance frequency fo1 is set to approximately 70 kHz while the resonance frequency fo2 is set to approximately 35 kHz so as to be approximately ½ the resonance frequency fo1.

Meanwhile, on the secondary side of the power supply circuit shown in FIG. 1, a secondary side partial resonance capacitor Cp2 is inserted in parallel to the series connection circuit of the secondary winding N2 and the secondary side series resonance capacitor C2 which form the secondary side series resonance circuit (L2–C2).

The capacitance of the secondary side partial resonance capacitor Cp2 and the leakage inductance L2 of the secondary winding N2 cooperatively form a parallel resonance circuit as a secondary side partial voltage resonance circuit (partial resonance circuit). The secondary side partial voltage resonance circuit performs a secondary side partial voltage resonance operation. The secondary side partial voltage resonance operation voltage resonates only at timings at which the set of the rectification diodes [Do1, Do4] and the other set of the rectification diodes [Do2, Do3], which form the secondary side full-wave rectification circuit, turn off and on.

The partial voltage resonance operation forms a path along which a reverse current is produced when each of the sets of the rectification diodes [Do1, Do4] and [Do2, Do3] turns off. Since the reactive power at this time decreases, a reduction of the power loss by the secondary side rectification circuit is achieved.

From the foregoing description, the switching power supply circuit of the present invention includes a primary side series resonance circuit (L1–C1) and a primary side partial voltage resonance circuit (L1//Cp) on the primary side, and includes a secondary side series resonance circuit (L2–C2) and a secondary side partial voltage resonance circuit (L2//Cp2) on the secondary side.

As described hereinabove, a switching converter including a combination of two resonance circuits, which includes a series resonance circuit and a partial voltage resonance circuit like those on the secondary side, is hereinafter referred to as a composite resonance type converter. Meanwhile, a switching converter including a combination of three or more resonance circuits as in the case of the present embodiment is hereinafter referred to as a multiple (composite) resonance type converter.

The control circuit 1 is provided to stabilize the secondary side DC output voltage Eo in accordance with a switching frequency controlling method.

The control circuit 1 in this instance supplies a detection output corresponding to a level variation of the secondary side DC output voltage Eo, which is a detection input, to the oscillation driving circuit 2. The oscillation driving circuit 2 drives the switching elements Q1 and Q2 so as to vary the switching frequency in response to the detection output of the control circuit 1 input thereto. To this end, the oscillation driving circuit 2 varies the frequency of the oscillation signal to be produced by the internal oscillation circuit.

As the switching frequency of the switching elements Q1 and Q2 varies, the resonance impedance of the primary side series resonance circuit, and the power amount to be transmitted from the primary winding N1 to the secondary winding N2 side of the insulating converter transformer PIT varies to thereby stabilize the level of the secondary side DC output voltage Eo.

Although details are hereinafter described, according to the switching frequency controlling method for the power supply circuit of the present embodiment, a frequency range higher than an intermediate resonance frequency fo is set as a variation range of the switching frequency. The intermediate resonance frequency fo depends upon the resonance frequency fo1 of the primary side series resonance circuit and the resonance frequency fo2 of the secondary side series resonance circuit. In other words, an upper side controlling system is adopted.

Generally, a series resonance circuit exhibits the lowest resonance impedance at its resonance frequency. From this, where the upper side controlling system based on the resonance frequency of a series resonance circuit is adopted as in the present embodiment, the resonance impedance increases as the switching frequency fs increases.

Accordingly, for example, if the load becomes heavier and the secondary side DC output voltage Eo drops, then the switching frequency is controlled so as to become lower. This decreases the resonance impedance and increases the power transmission amount from the primary side to the secondary side, and consequently, the secondary side DC output voltage Eo rises.

On the other hand, if the load becomes lighter and the secondary side DC output voltage Eo rises, then the switching frequency is controlled so as to become higher. Consequently, the resonance impedance increases and the power transmission amount described above decreases. Consequently, the secondary side DC output voltage Eo drops. The switching frequency is varied in this manner to stabilize the secondary side DC output voltage Eo.

Figure 3:
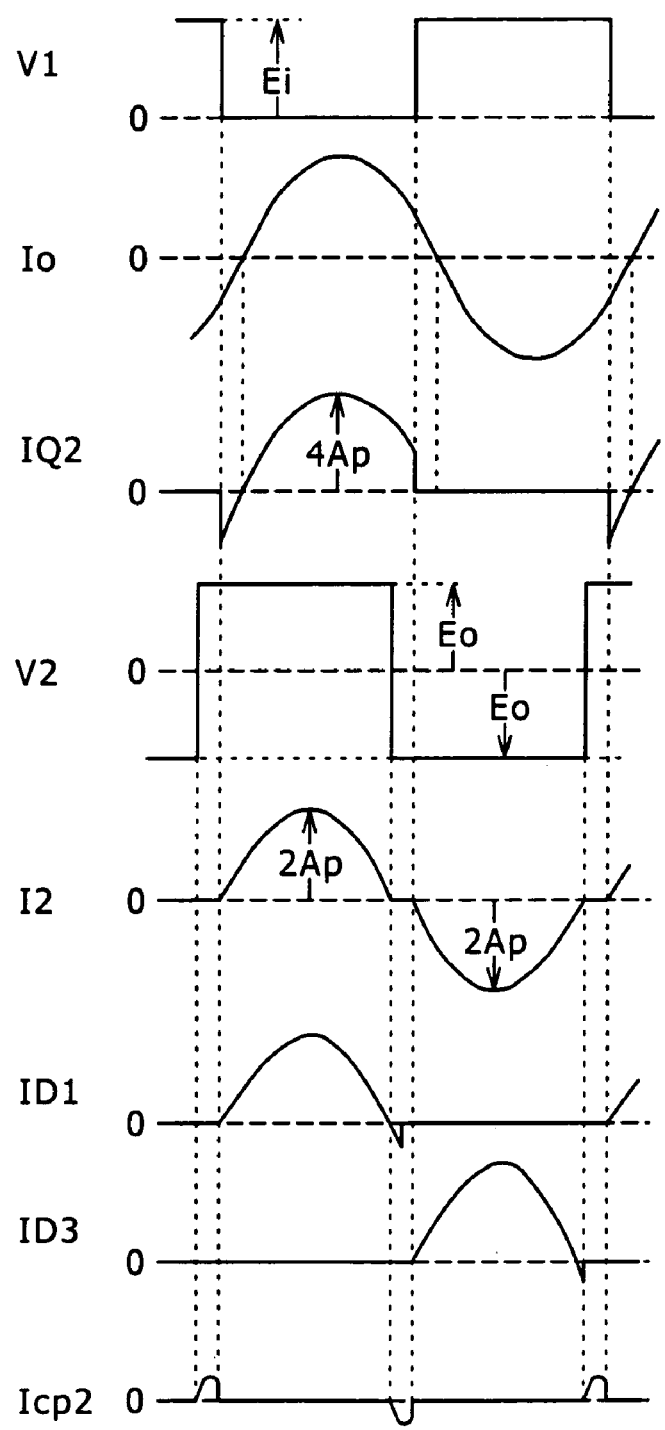
FIG. 3 is a waveform diagram illustrating the operation, in a maximum load power condition, of several components of the power supply circuit of the first embodiment.
Figure 4:
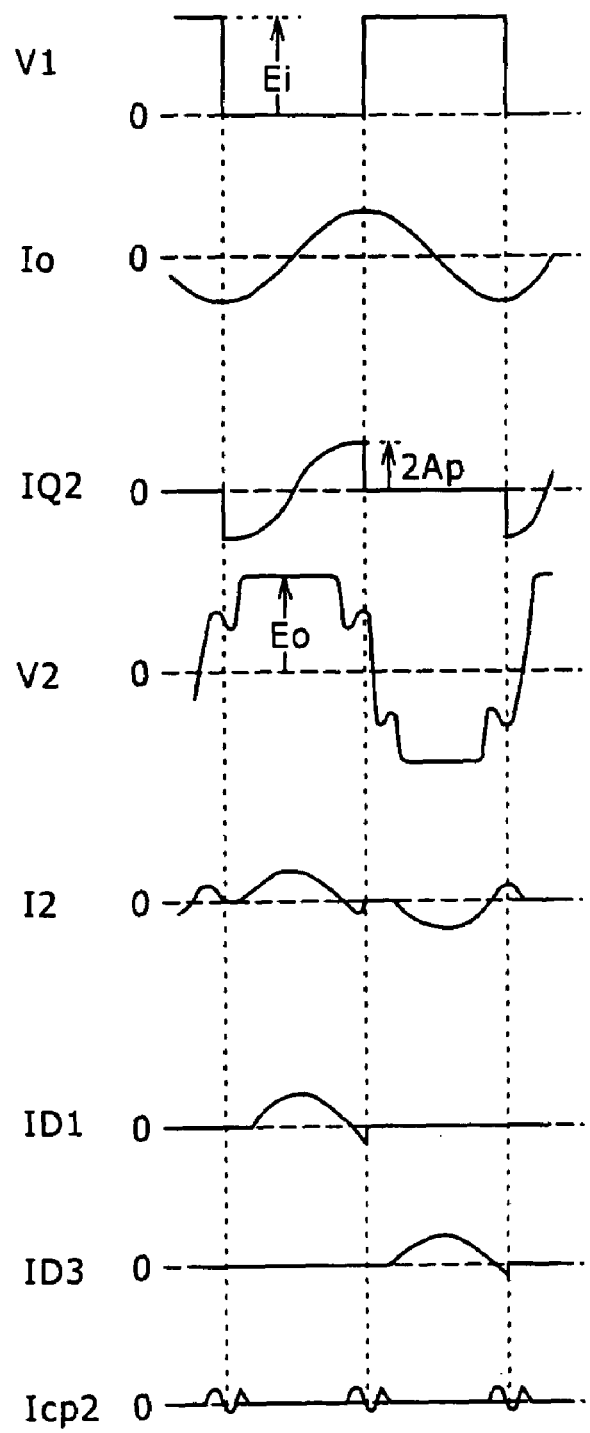
FIG. 4 is a waveform diagram illustrating the operation, in a light load condition, of the several components of the power supply circuit of the first embodiment.

FIGS. 3 and 4 illustrate operation waveforms of the components of the power supply circuit shown in FIG. 1.

In particular, FIG. 3 illustrates the operation waveforms when the load power Po is Po=150 W (maximum load power), while FIG. 4 illustrates the operation waveforms when the load power Po is Po=25 W corresponding to a light load condition. It is to be noted that FIGS. 3 and 4 illustrate the results of experiments conducted with an AC input voltage fixed at VAC=100 V.

Further, in order to obtain the experiment results illustrated in FIGS. 3 and 4, the components shown in FIG. 1 were set as mentioned just below.

Insulating converter transformer PIT

EER-35 type ferrite core, gap length=2.8 mm, coupling coefficient k=0.63,

Primary winding N1=45 T (turns)=225 μH, leakage inductance L1=133 μH

Secondary winding N2=50 T=250 μH, leakage inductance L2=148 μH

Primary side series resonance capacitor C1=0.039 μF
Secondary side series resonance capacitor C2=0.15 μF
Primary side partial resonance capacitor Cp1=330 pF
Secondary side partial resonance capacitor Cp2=330 pF It is to be noted that the resonance frequency fo1 of the primary side series resonance circuit of fo1≈70 kHz is set from the leakage inductance L1 of the primary winding N1=133 μH and the primary side series resonance capacitor C1=0.039 μF, and the resonance frequency fo2≈35 kHz is set from the leakage inductance L2 of the secondary winding N2=148 μH and the secondary side series resonance capacitor C2=0.15 μF. It is to be noted that the core of the EER type is well known in the art, and also it is known that the EER type includes the EE type. In the present specification, the term EE type is used to include both the EER type and the EE type because the cores of both types have an EE-shaped cross-section.

Referring to FIGS. 3 and 4, the voltage V1 is a voltage across the switching element Q2 and indicates on/off timings of the switching element Q2. In particular, within a period that the voltage V1 has a zero level, the switching current IQ2 of the switching element Q2 illustrated in FIGS. 3 and 4 flows and the switching element Q2 exhibits an on state. On the other hand, within a period that the voltage V1 is clamped at the level of the rectification smoothed voltage Ei, the switching current IQ2 has a zero level and the switching element Q2 exhibits an off state.

Further, though not shown, the voltage across the switching element Q1 has a waveform shifted by 180 degrees from that of the voltage V1. Similarly, the switching current IQ1 of the switching element Q1 has a waveform shifted by 180 degrees in phase from that of the switching current IQ2. In other words, the switching element Q1 and the switching element Q2 are switched on and off alternately.

The primary side series resonance current Io flowing through the primary side series resonance circuit has the waveform seen in FIGS. 3 and 4. The waveform is a composite waveform of the switching current IQ1 and the switching current IQ2.

It is to be noted that, where the waveforms of the voltage V1 and the switching current IQ2 illustrated in FIGS. 3 and 4 are actually compared with each other, the period of the waveforms of FIG. 4 is shorter than that of the waveforms of FIG. 3. This indicates that the voltage V1 and the switching current IQ2 are controlled so that the switching frequency increases as the load decreases from a high load to a low load. This indicates that the stabilization control is performed such that, where the load becomes heavier and the level of the secondary side DC output voltage Eo decreases, the switching frequency is decreased, but where the load becomes lighter and the level of the secondary side DC output voltage Eo increases, the switching frequency is increased.

Then, when the load becomes heavier and the switching frequency is controlled so as to decrease, the peak level of the switching current IQ2 is 4 Ap as seen in FIG. 3. On the other hand, when the load becomes lighter and switching frequency is controlled so as to increase, the peak level of the switching current IQ2 is 2 Ap. From this, it can be recognized also that the switching current on the primary side is changed so as to increase in response to a decreasing tendency of the level of the secondary side DC output voltage Eo in a heavy load condition, but the switching current is changed to decrease in response to an increasing tendency of the level of the secondary side DC output voltage Eo in a light load condition.

When the primary side series resonance current Io described above flows, an alternating voltage V2 illustrated in FIG. 3 or 4 flows through the secondary winding N2 of the insulating converter transformer PIT. The positive and negative peak levels (absolute values) of the alternating voltage V2 are equal to the level of the secondary side DC output voltage Eo.

Since such an alternating voltage V2 as just described is obtained, the sets of the rectification diodes [Do1, Do4] and [Do2, Do3] in the bridge rectification circuit on the secondary side are rendered conducting and rectification current flows on the secondary side.

The rectification current ID1, in which the rectification diodes [Do1, Do4] conduct and flow, flows within the period that the alternating voltage V2 excited in the secondary winding N2 has a positive polarity as seen in FIGS. 3 and 4. On the other hand, the rectification current ID3, in which the rectification diodes [Do2, Do3] conduct and flow, flows within the period that the alternating voltage V2 has a negative polarity.

The rectification current I2 is obtained at a line between the secondary side ground and the node of the rectification diodes Do2 and Do4 serving as a negative output terminal of the bridge rectification circuit, and has the waveform seen in FIG. 3 or 4. The waveform is a composite waveform of the rectification currents ID1 and ID3.

Further, in this instance, the current Icp2 flows through the secondary side partial resonance capacitor Cp2 provided on the secondary side. As seen in FIG. 3 or 4, the current Icp2 flows at timings at which the rectification diodes Do1 to Do4 are turned off. In particular, it can be seen from the waveform of the current Icp2 that a reverse current generated upon turning off the rectification diodes Do1 to Do4 flows. Also by this, suppression of the power loss of the rectification diodes Do1 to Do4 can be achieved as described hereinabove.

The power supply circuit of FIG. 1 having the configuration described above includes series resonance circuits (primary side series resonance circuit (L1–C1) and secondary side series resonance circuit (L2–C2)) individually on the primary side and the secondary side. According to the present embodiment, since the power supply circuit based on a current resonance type converter has such a configuration as described above, it can be practically applied as a power supply circuit ready for a wide range. The circuit ready for a wide range operates with commercial AC power supply inputs of both the AC 100 V type and the AC 200 V type. This is described more particularly below.

Figure 5:
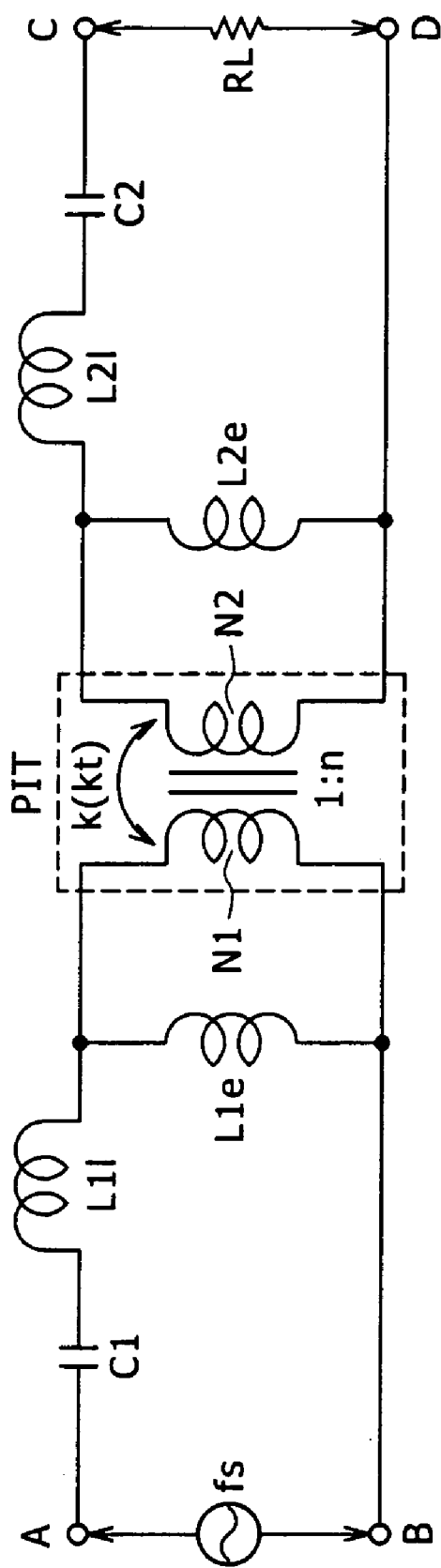
FIG. 5 is a circuit diagram showing an equivalent circuit to the power supply circuit of the first embodiment, which is viewed as an electromagnetic connection type resonance circuit.

FIG. 5 shows an equivalent circuit where the power supply circuit of the present embodiment shown in FIG. 1 is viewed from the relationship between the primary side series resonance circuit and the secondary side series resonance circuit.

Referring to FIG. 5, in the insulating converter transformer PIT shown, the primary winding N1 and the secondary winding N2 wound thereon have predetermined numbers of turns such that they have a winding turn ratio of 1:n. Further, it is shown that the coupling degree between the primary side and the secondary side of the insulating converter transformer PIT is given by the coupling coefficient k.

Furthermore, it is shown that, on the primary side of the insulating converter transformer PIT, the primary winding N1 has a leakage inductance L1$l$ and an exciting inductance L1$e$. Meanwhile, on the secondary side of the insulating converter transformer PIT, the secondary winding N2 has a leakage inductance L2$l$ and an exciting inductance L2$e$.

In the equivalent circuit diagram shown in FIG. 5, alternating current (frequency signal) of the switching frequency fs is input to the primary side of the insulating converter transformer PIT. In particular, the switching output of the primary side switching converter (switching elements Q1 and Q2) is input to the primary side of the insulating converter transformer PIT.

On the primary side of the insulating converter transformer PIT, the alternating current input of the switching frequency fs is supplied to the primary side series resonance circuit. The primary side series resonance circuit can be regarded as a circuit wherein the series circuit of the primary side series resonance capacitor C1 and the leakage inductance L1$l$ is connected in series to the primary winding N1 and the exciting inductance L1$e$ is connected in parallel to the primary winding N1.

Also, the secondary side series resonance circuit of the insulating converter transformer PIT similarly can be regarded as a circuit wherein the series circuit of the secondary side series resonance capacitor C2 and the leakage inductance L2$l$ is connected in series to the secondary winding N2 and the exciting inductance L2$e$ is connected in parallel to the secondary winding N2. Further, in FIG. 5, the output of the secondary side series resonance circuit is output to a load RL. The load RL includes circuits and a load which are connected following the secondary side full wave rectification circuit.

In the equivalent circuit of FIG. 5 having such a connection scheme as described above, where the coupling coefficient of the insulating converter transformer PIT is represented by k and the self inductance of the primary winding N1 is represented by L1, the leakage inductance L1*l* of the primary winding N1 can be represented by $$L1l = (1-k^2)L1 \qquad (1)$$

Meanwhile, the exciting inductance L1*e* of the primary winding N1 can be represented by $$L1e = k^2 \times L1 \qquad (2)$$

Similarly, where the self inductance of the secondary winding N2 is represented by L2, the leakage inductance L2*l* and the exciting inductance L2*e* are represented respectively by $$L2l = (1-k^2)L2 \qquad (3)$$

$$L2e = k^2 \times L2 \qquad (4)$$

It is shown in FIG. 5 that the equivalent circuit includes a primary side series resonance circuit on the primary side and a secondary side series resonance circuit on the secondary side through electromagnetic induction of the insulating converter transformer PIT. Accordingly, the circuit shown in FIG. 5 can be considered such that it forms a coupling type resonance circuit by electromagnetic coupling. Therefore, the constant voltage control characteristic for the secondary side DC output voltage Eo in the power supply circuit shown in FIG. 1 varies depending upon the coupling degree (coupling coefficient k) of the insulating converter transformer PIT. This is described more particularly with reference to FIG. 6.

Figure 6:
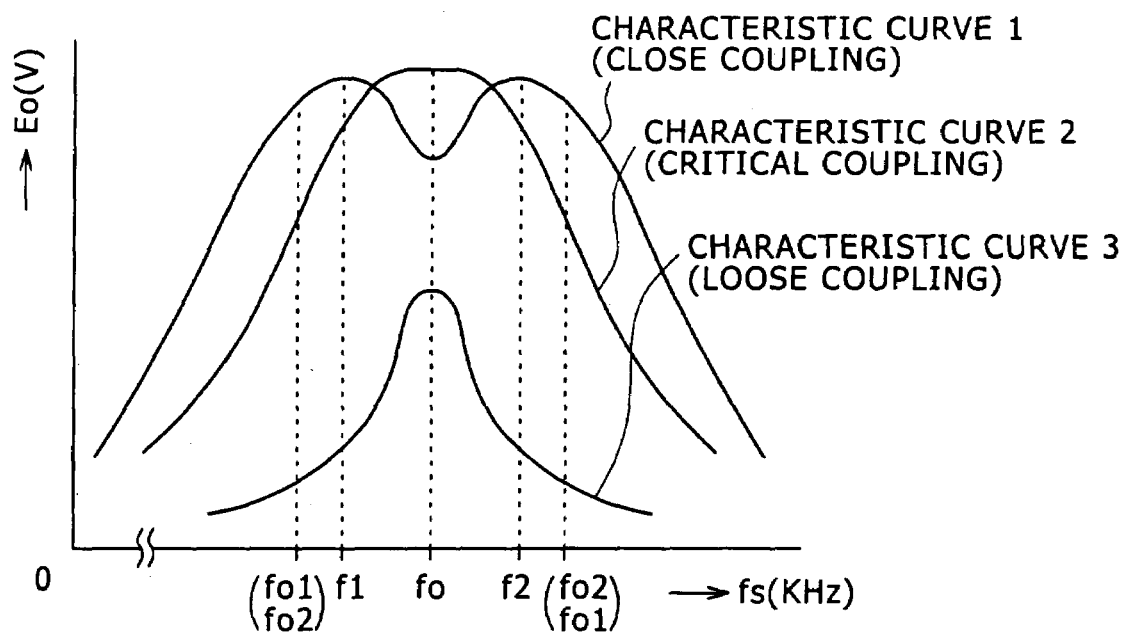
FIG. 6 is a waveform diagram illustrating a constant voltage controlling characteristic of the power supply circuit of the first embodiment.

FIG. 6 illustrates an output characteristic of the equivalent circuit of FIG. 5 with respect to an input (switching frequency signal) thereto. In other words, FIG. 6 illustrates the control characteristic of the secondary side DC output voltage Eo in relation to the switching frequency fs. In FIG. 6, the abscissa indicates the switching frequency, and the ordinate indicates the level of the secondary side DC output voltage Eo.

As described hereinabove with reference to FIG. 1, in the present embodiment, the resonance frequency fo1 of the primary side series resonance circuit and the resonance frequency fo2 of the secondary side series resonance circuit have the relationship of fo1>fo2. While, in FIG. 6, the resonance frequencies fo1 and fo2 are illustrated with respect to the abscissa indicating the switching frequency fs, where fo1>fo2 as in the case of the circuit of FIG. 1, it is illustrated that the resonance frequency fo2 is lower than the resonance frequency fo1. On the other hand, if fo1<fo2, then it is illustrated that the resonance frequency fo2 is higher than the resonance frequency fo1.

It is assumed here that the coupling degree of the insulating converter transformer PIT is set to a close coupling state wherein the coupling coefficient k is k=1. In this instance, the leakage inductance L1*l* of the primary winding N1 and the leakage inductance L2*l* of the secondary winding N2 are represented, by substituting k=1 into the expressions (1) and (3) given hereinabove, as $$L1l = L2l = 0 \qquad (5)$$

This indicates that the primary winding N1 and the secondary winding N2 have no leakage inductance because the insulating converter transformer PIT has a close coupling.

Where the primary side and the secondary side of the insulating converter transformer PIT are coupled in a close coupling state in this manner, the constant voltage control characteristic is bimodal. The secondary side DC output voltage Eo has peaks at frequencies f1 and f2 different from the resonance frequency fo1 and the resonance frequency fo2 as seen from the characteristic curve 1 in FIG. 6.

Here, the frequency f1 is represented by $$f1 = fo/\sqrt{1+k} \qquad (6)$$

and the frequency f2 is represented by $$f2 = fo/\sqrt{1-k} \qquad (7)$$

In the expressions (6) and (7), fo, which is one of the terms, is an intermediate frequency between the resonance frequency fo1 of the primary side series resonance circuit and the resonance frequency fo2 of the secondary side series resonance circuit and depends upon the impedance of the primary side, the impedance of the secondary side, and the impedance (mutual coupling inductance M) common to the primary side and the secondary side.

The mutual coupling inductance M is given by $$M = k\sqrt{L1 \times L2} \qquad (8)$$

If it is assumed that the coupling coefficient k described hereinabove is gradually decreased from k=1, that is, if the coupling state of the primary side and the secondary side of the insulating converter transformer PIT is gradually changed from a close coupling state to a loose coupling state, then the characteristic curve 1 illustrated in FIG. 6 gradually loses its bimodal characteristic and becomes flattened in the proximity of the intermediate resonance frequency fo thereof. Then, when the coupling coefficient k decreases to a certain level, a critical coupling state is reached. In the critical coupling state, the tendency of the bimodal characteristic is not found as seen from another characteristic curve 2, but the characteristic has a flattened curved shape centered at the intermediate resonance frequency fo.

If the coupling coefficient k is further decreased from that of the critical coupling state to increase the degree of loose coupling, then a unimodal characteristic is obtained as seen from the further characteristic curve 3 in FIG. 6. The unimodal characteristic indicates that the secondary side DC output voltage Eo has a peak only at the intermediate resonance frequency fo. If the characteristic curve 3 is compared with the characteristic curves 1 and 2, then it can be recognized that the peak level itself of the characteristic curve 3 is lower than those of the characteristic curves 1 and 2. However, the characteristic curve 3 has a steeper inclination as a curved shape like a quadratic function.

The insulating converter transformer PIT in the present embodiment has a loose coupling setting wherein the coupling coefficient k is k≦0.65. According to the setting of the coupling coefficient k, the secondary side DC output voltage Eo operates with the unimodal characteristic indicated by the characteristic curve 3.

Here, the unimodal characteristic illustrated in FIG. 6 and the constant voltage control characteristic of the composite resonance type converter of the power supply circuit in the related art (FIG. 44 or 45) described hereinabove with reference to FIG. 48 may be compared with each other. It can be seen that, when compared with the characteristic illustrated in FIG. 6, the characteristic illustrated in FIG. 48 exhibits a considerably moderate inclination as a quadratic function.

Figure 44:
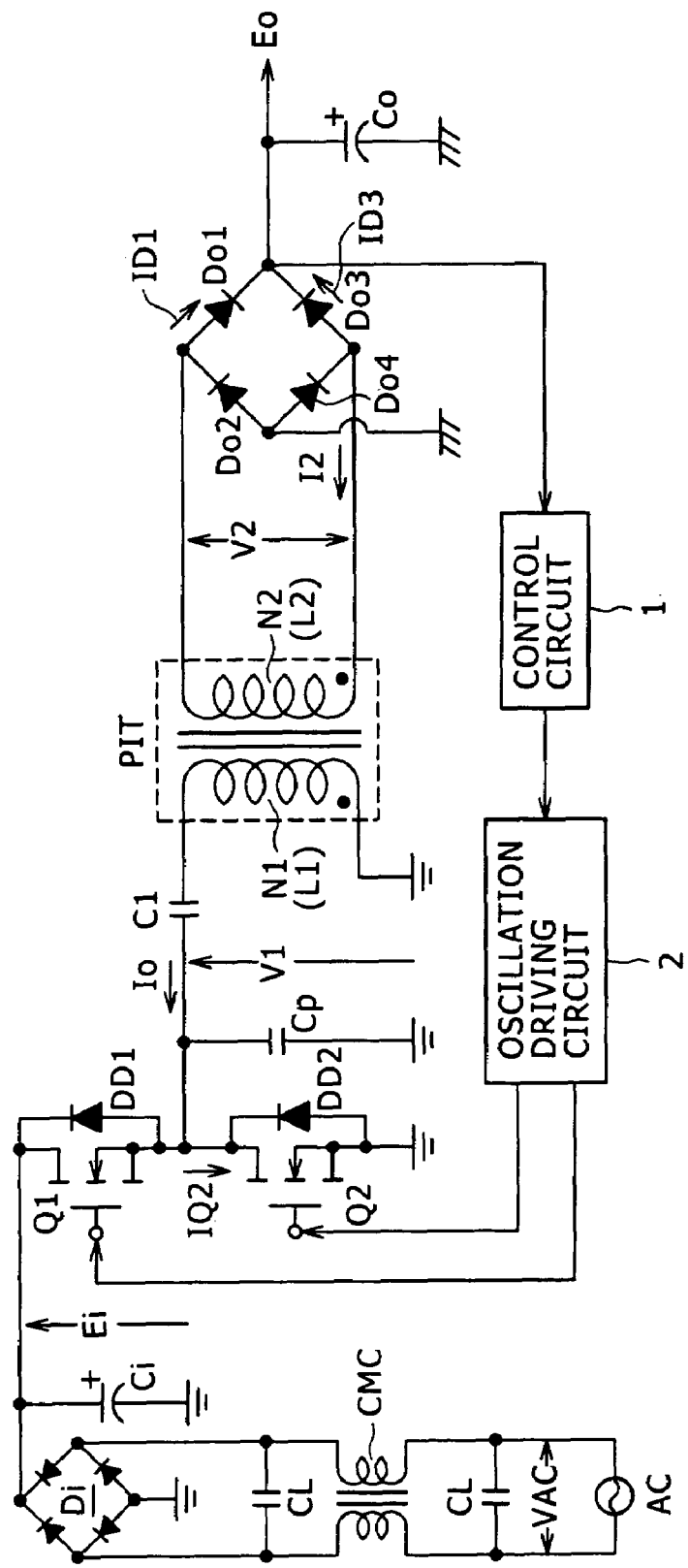
FIGS. 44 and 45 are circuit diagrams showing different examples of the configuration of a power supply circuit in the related art.
Figure 45:
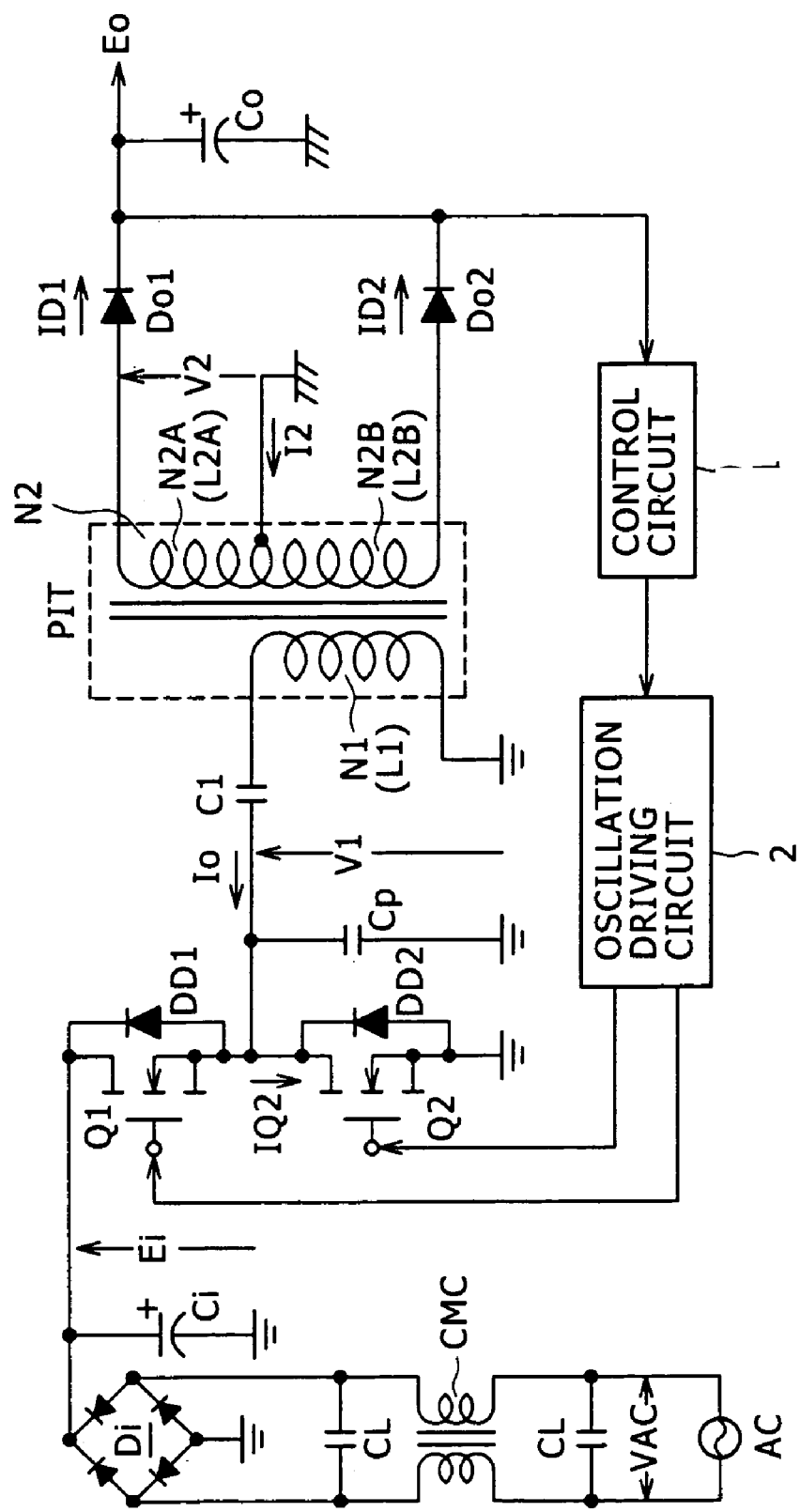
Figure 46:
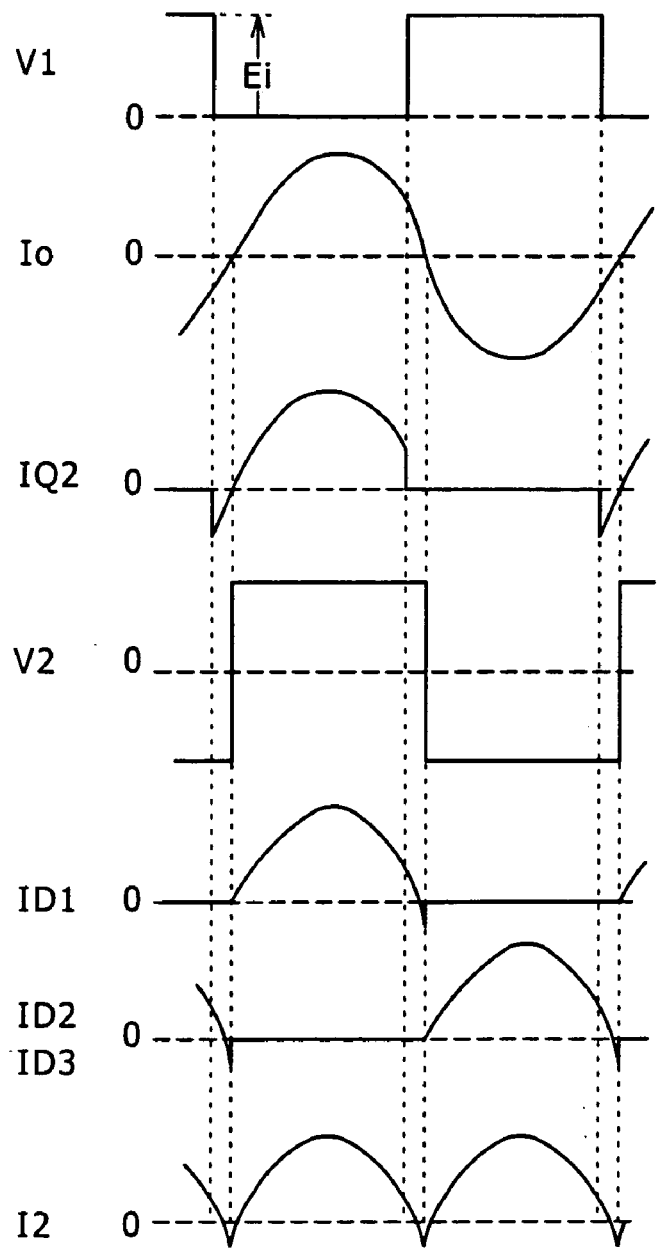
FIG. 46 is a waveform diagram illustrating the operation of several components of the power supply circuit shown in FIG. 44 or 45.
Figure 46:
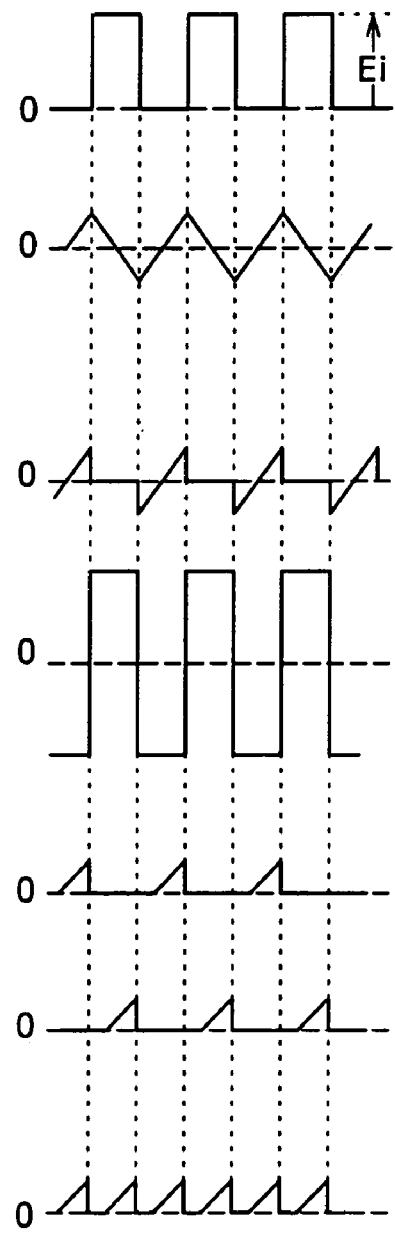
Figure 47:
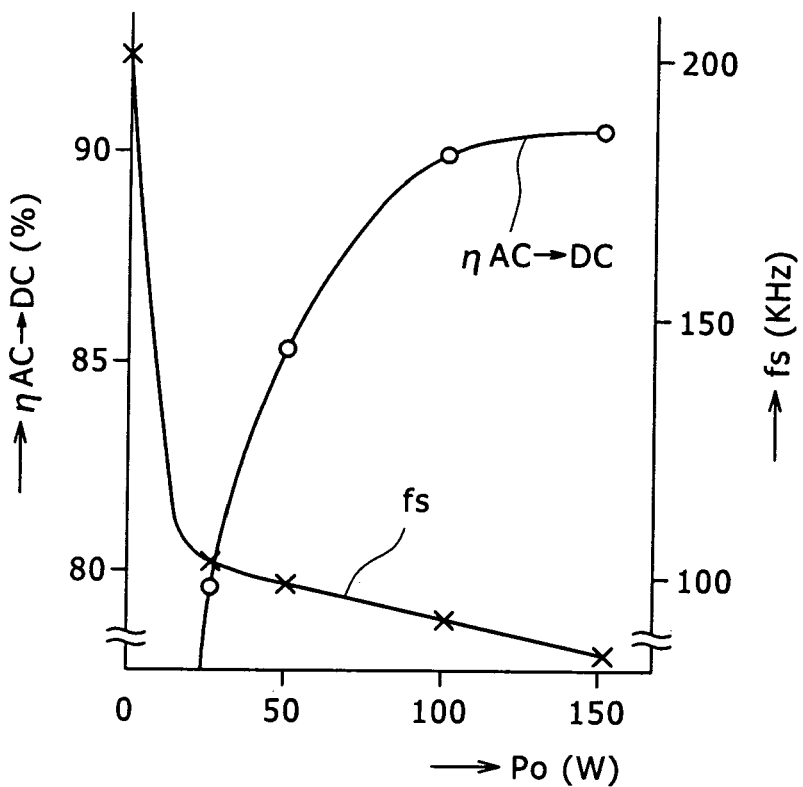
FIG. 47 is a graph showing the characteristics of switching frequency and AC→DC power conversion efficiency with respect to the load variation regarding the power supply circuit shown in FIG. 44 or 45.
Figure 48:
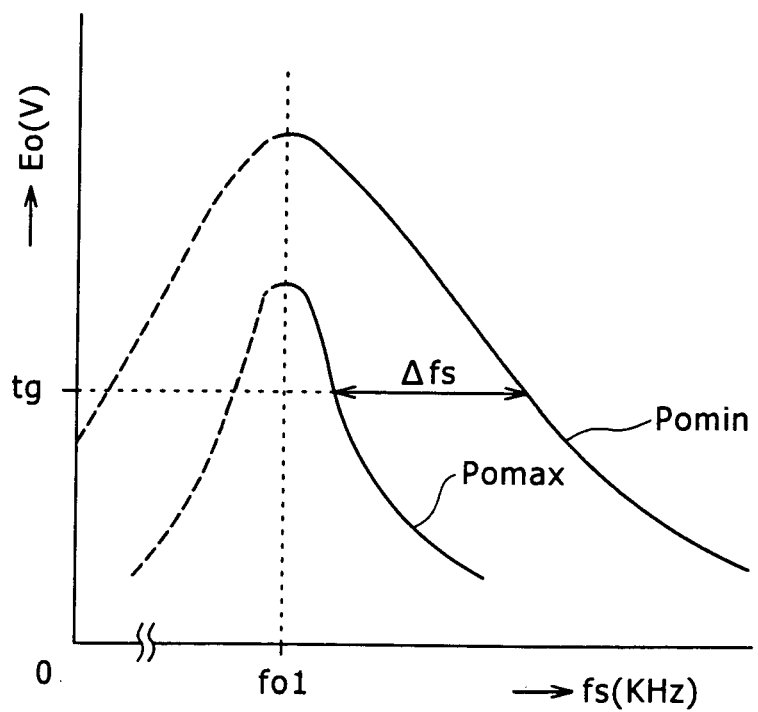
FIG. 48 is a graph illustrating a constant voltage controlling characteristic of the power supply circuit shown in FIG. 44 or 45.

Since, with the power supply circuit shown in FIG. 44 or 45, the characteristic illustrated in FIG. 48 is moderate as a curve as described above, the necessary control range of the switching frequency for performing constant voltage control of the secondary side DC output voltage Eo is, for example, even in a condition wherein the secondary side DC output voltage Eo is ready for a single range, fs=80 to 200 kHz or more while Δ fs=120 kHz or more. Therefore, it is very difficult to make the secondary side DC output voltage Eo ready for a wide range only by constant voltage control by the switching frequency control as described hereinabove.

Figure 7:
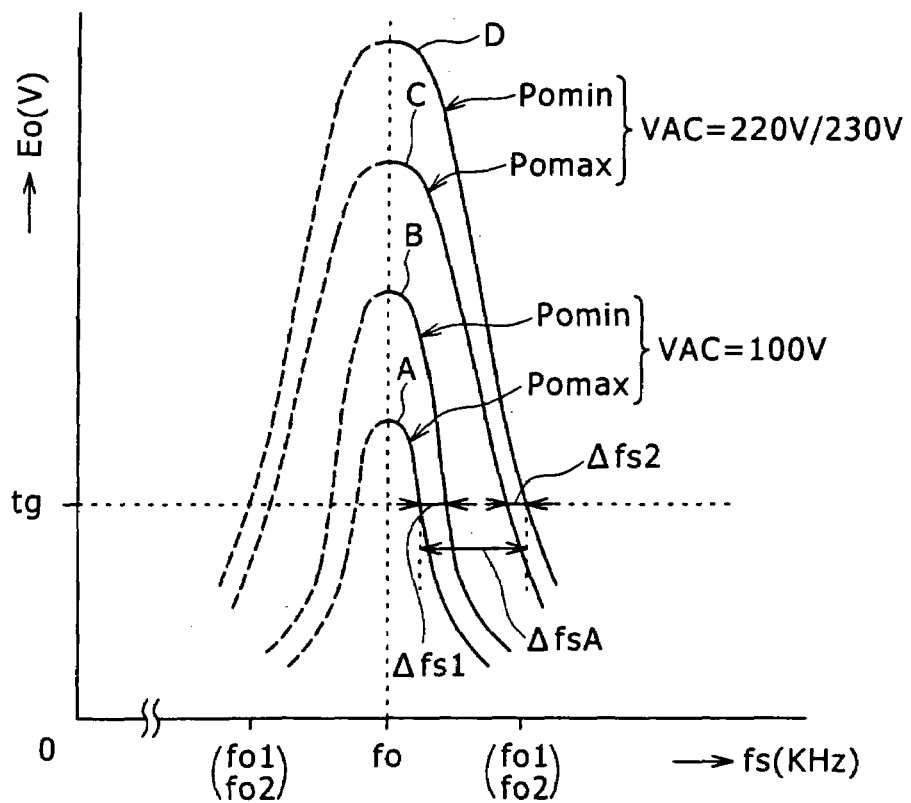
FIG. 7 is a waveform diagram illustrating a switching frequency control range or necessary control range with respect to an AC input voltage condition and a load variation as a constant voltage controlling operation of the power supply circuit of the first embodiment.

In contrast, the constant voltage control characteristic of the present embodiment is such as illustrated in FIG. 7 because it has a unimodal characteristic indicated by the characteristic curve 3 in FIG. 6.

In FIG. 7, four characteristic curves are illustrated including characteristic curves A, B, C, and D. The curves A and B are of the power supply circuit of the present embodiment shown in FIG. 1 at the maximum load power Pomax and the minimum load power Pomin when the AC input voltage VAC is VAC=100 V (AC 100 V type). The curves C and D are at the maximum load power Pomax and the minimum load power Pomin when the AC input voltage VAC is VAC=220 V (AC 200 V type).

As can be seen from FIG. 7, the variation control range (necessary control range) of the switching frequency necessary to stabilize the secondary side DC output voltage Eo at a required rated level tg when the AC input voltage VAC corresponding to an input of the AC 100 V type is VAC=100 V is represented by Δ fs1. In particular, the variation control range Δ fs1 is the frequency range from the switching frequency fs at which the characteristic curve A exhibits the level tg to the switching frequency fs at which the characteristic curve B exhibits the level tg.

On the other hand, the variation control range (necessary control range) of the switching frequency necessary to stabilize the secondary side DC output voltage Eo at the required rated level tg when the AC input voltage VAC corresponding to an input of the AC 200 V type is VAC=220 V is represented by Δ fs2. In particular, the variation control range Δ fs2 is the frequency range from the switching frequency fs at which the characteristic curve C exhibits the level tg to the switching frequency fs at which the characteristic curve D exhibits the level tg.

As described hereinabove, the unimodal characteristic, which is a control characteristic of the secondary side DC output voltage Eo in the present embodiment, is considerably steep as a curve of a quadratic function when compared with the control characteristic described hereinabove with reference to FIG. 48. Therefore, the necessary control ranges Δ fs1 and Δ fs2 when the AC input voltage VAC is VAC=100 V and when the AC input voltage VAC is VAC=220 V as described above, respectively, are reduced considerably when compared with the necessary control range Δ fs described hereinabove with reference to FIG. 48.

As a result, the frequency variation range (Δ fsA) from the lowest switching frequency (switching frequency fs at which the characteristic curve D exhibits the level tg) of the variation control range Δ fs1 to the highest switching frequency (switching frequency fs at which the characteristic curve D exhibits the level tg) of the variation control range Δ fs2 becomes narrower correspondingly.

Then, the actual frequency variation range Δ fsA of the power supply circuit of the present embodiment shown in FIG. 1 sufficiently falls within the variation range of the switching frequency for which a switching driving IC (oscillation driving circuit 2) at present can be ready. In other words, the power supply circuit of FIG. 1 can variably control the switching frequency with the frequency variation range Δ fsA. This signifies that the power supply circuit shown in FIG. 1 can be ready for a commercial AC power supply input of both the AC 100 V type and the AC 200 V type to stabilize the secondary side DC output voltage Eo. In other words, the power supply circuit shown in FIG. 1 can be ready for a wide range only by switching frequency control.

Incidentally, a coupling type resonance circuit by electromagnetic coupling is already known as a technique for expanding the amplification bandwidth of an amplification circuit by transistors in communication techniques such as, for example, an intermediate frequency transformer amplifier. However, in such a field, a bimodal characteristic by a close coupling or a flat characteristic by a critical coupling is used, and a unimodal characteristic by a loose coupling is not used. It can be said that the present embodiment utilizes a unimodal characteristic by a loose coupling, which has not been adopted in the field of communication techniques, with regard to a technique of such a coupling type resonance circuit as described above by an electromagnetic coupling positively in the field of resonance type switching converters. This makes it possible to reduce the variation range (necessary control range) of the switching frequency necessary for the stabilization of the secondary side DC output voltage Eo to thereby make it possible to make the switching power supply circuit ready for a wide range only by constant voltage control in the switching frequency control.

Figure 8:
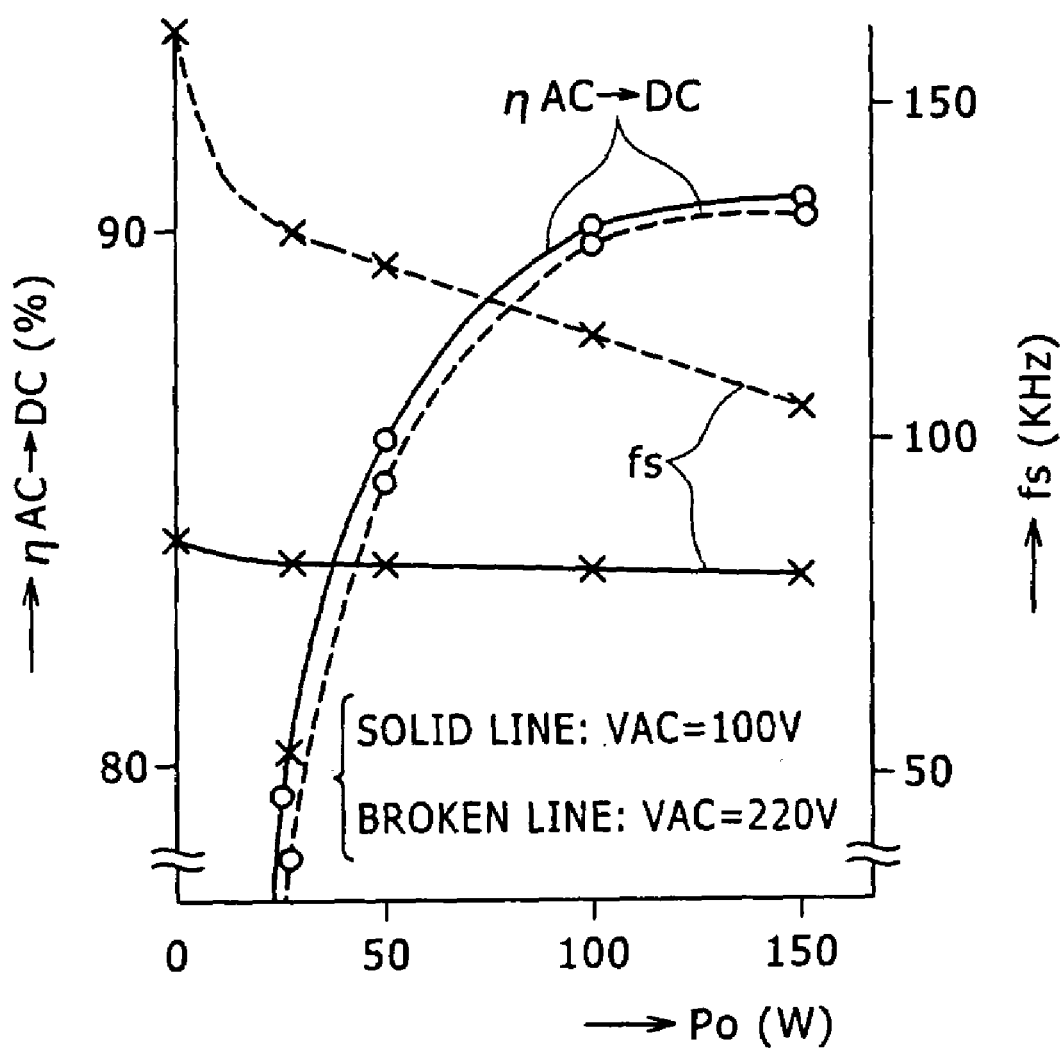
FIG. 8 is a graph illustrating the characteristics of switching frequency and AC→DC power conversion efficiency with respect to the load variation of the power supply circuit of the first embodiment.

FIG. 8 illustrates the characteristics of the power supply circuit shown in FIG. 1 and particularly illustrates the AC→DC power conversion efficiency and the switching frequency control characteristic with respect to a load variation.

It is to be noted that, in FIG. 8, each characteristic is indicated by a solid line where it is a result of an experiment conducted with the AC input voltage VAC of VAC=100 V and by a broken line where it is a result of another experiment conducted with the AC input voltage VAC of VAC=220 V. Further, the characteristics were obtained under similar part conditions as those when the waveforms of FIGS. 3 and 4 were obtained.

First, as regards the AC→DC power conversion efficiency, a characteristic that it rises as the load power Po rises is obtained with both the AC input voltage VAC=100 V and 220 V.

Then, when the AC input voltage VAC is VAC=100 V, the AC→DC power conversion efficiency obtained exhibits its maximum at the load power Po=150 W and is ηAC→DC=90.8%.

Also, when the AC input voltage VAC is VAC=220 V, a high AC→DC power conversion efficiency of ηAC→DC=90% or more is obtained at the load power Po=150 W.

Since the circuit in the related art described hereinabove with reference to FIG. 44 or 45 exhibits an AC→DC power conversion efficiency of ηAC→DC=approximately 91.0% at the AC input voltage VAC=100 V and the load power Po=150 W, a power conversion efficiency substantially equal to that of the circuit in the related art is obtained by the present embodiment.

From this, it can be understood that, where the present embodiment is viewed from the point of view of power conversion efficiency, it can implement a configuration ready for a wide range by switching frequency control such that it is sufficient for practical use.

Further, it can be seen from FIG. 8 that the characteristic of the switching frequency fs exhibits a variation reduced from that of the circuit in the related art described hereinabove with reference to FIG. 44 or 45. In the case of the configuration in the related art described hereinabove with reference to FIG. 44 or 45, the switching frequency fs exhibits a characteristic that it rises steeply with respect to a variation of the load power Po within a range from a low load condition of the load power Po=25 W to a no load condition of Po=0 W. In contrast, the variation of the switching frequency fs with respect to a variation of the load power Po within a range from a light load condition to a no load condition is suppressed significantly in the present embodiment. Particularly at the AC input voltage VAC=100 V, the switching frequency fs has a characteristic that it is substantially flat with respect to variations of the load power Po between the maximum load power condition in which the load power Po=150 W and the no load condition in which the load power Po=0 W.

According to an experiment, when the AC input voltage VAC was VAC=100 V, a result of the switching frequency fs=80 to 83.6 kHz was obtained with respect to variations of the load power Po=150 W to 0 W. In other words, the necessary control range $\Delta$ fs1 of the switching frequency at the AC input voltage VAC=100 V is 3.6 kHz which is approximately 1/30 that of the power supply circuit of the related art in FIG. 44 or 45.

On the other hand, at the AC input voltage VAC=220 V, a result was obtained that the switching frequency fs was 105 to 160 kHz with respect to variations of the load power Po=150 to 0 W and the necessary control range $\Delta$ fs2 in this instance was 55 kHz.

From the results described above, it can be recognized that the necessary control range $\Delta$ fsA over the range of the commercial AC power supply of the AC 100 V type to the AC 200 V type is approximately 80 to 160 kHz. This sufficiently remains within the frequency variation range (approximately 50 to 200 kHz) of the switching driving IC (oscillation driving circuit 2) at present described hereinabove, and from this, it can be understood that an existing IC can be used as is for the implementation of the configuration ready for a wide range according to the present embodiment.

Here, it is described for confirmation that the reason why the variation characteristic of the switching frequency fs with respect to the load variation is significantly flat with respect to that of the switching power supply circuit in the related art as seen from FIG. 8 is that the gap of the insulating converter transformer PIT is expanded to make the coupling between the primary side and the secondary side looser than that of the switching power supply circuit in the related art.

In other words, while the gap length G of the switching power supply circuit in the related art is G=approximately 1.5 mm, that of the present embodiment is set to G=2.8 mm, which is approximately twice as large. Consequently, a rise of the switching frequency fs within the range of the load power Po=25 to 0 W is suppressed and the necessary control range $\Delta$ fs at the AC input voltage VAC=100 V can be reduced to approximately 1/30 that of the power supply circuit in the related art.

Generally, however, as the degree of the loose coupling between the primary side and the secondary side of the insulating converter transformer PIT is increased, the power loss by the insulating converter transformer PIT is inclined to increase, and the power conversion efficiency drops. However, according to the present embodiment, a characteristic of the power conversion efficiency, which is sufficient for practical use, is obtained as described below. This arises from the fact that a series resonance circuit is also formed on the secondary side (secondary side series resonance circuit).

In particular, where a secondary side series resonance circuit is provided, power of the secondary side DC output voltage Eo can be supplied including an increased amount of energy obtained by the resonance operation of the secondary side series resonance circuit, and this compensates for the drop in efficiency caused by employment of the loose coupling. Furthermore, the formation of a secondary side partial voltage resonance circuit on the secondary side decreases the switching loss of the rectification diodes on the secondary side, and this also contributes very much to suppress a drop in and enhance the power conversion efficiency.

As can be recognized from the foregoing description, the power supply circuit of the present embodiment shown in FIG. 1 makes it possible to be ready for a wide range only by switching frequency control. This eliminates, for example, the necessity to adopt a configuration for changing over the rectification operation between rectification circuit systems for production of the rectification smoothed voltage Ei or for changing over the form of a switching converter between the half bridge coupling scheme and the full bridge coupling scheme in response to the rated level of the commercial AC power supply in order to make the power supply circuit ready for a wide range.

Where such a configuration for the circuit changeover as just described is made unnecessary, for example, it is possible to use only one smoothing capacitor Ci, and the number of switching elements can be reduced to two, which are required at least for half bridge coupling. Consequently, a reduction in the number of circuit components, a reduction in the circuit scale, a reduction in switching noise, and so forth can be realized.

Further, where the configuration for circuit changeover is not required, there is no need for the provision of a special configuration for the prevention of a malfunction caused by the changeover, and also in this regard, suppression of an increase in the number of parts and the cost can be anticipated. Further, since a standby power supply for the prevention of a malfunction is not essentially required, the range of apparatus in which the power supply circuit can be incorporated can be expanded.

In order to achieve the effects of the present embodiment described above, it is necessary for only one part of a secondary side series resonance capacity to be added as a necessary but minimum part to the configuration of current resonance type converters in the related art which include a series resonance circuit only on the primary side. In other words, a power supply circuit ready for a wide range can be implemented by the addition of a much smaller number of parts than that of a configuration in the related art according to a circuit changeover system.

Further, where the necessary control range $\Delta$ fs of the switching frequency is reduced as described above, the response of constant voltage control is enhanced significantly irrespective of whether the power supply circuit is ready for a wide range or for a single range.

In particular, some electronic apparatus perform an operation called a switching load operation. The load power Po varies in such a manner as to switch or change over at a comparatively high speed between a maximum load condition and a no load condition. For example, printers and plasma display apparatus, which are peripheral apparatus of personal computers, are listed as apparatus performing such a switching load operation. Incidentally, the power supply circuit of the first embodiment is configured intending that it can be incorporated as a power supply for a printer.

Where a power supply circuit whose necessary control range $\Delta$ fs is comparatively wide, such as that shown in FIG. 44 or 45, is incorporated in an apparatus performing such a switching load operation as described above, variation control of the switching frequency fs by a corresponding great variation amount is performed following up the steep variation of the load power as described hereinabove. Therefore, it is difficult to obtain a high speed response of constant voltage control in the related art.

In contrast, according to the present embodiment, since the necessary control range $\Delta$ fs is reduced significantly, particularly within a region for a single range, it is possible to stabilize the secondary side DC output voltage Eo at a high speed in response to a steep variation of the load power Po between a maximum load condition and a no load condition. In short, the responding performance of constant voltage control for a switching load is improved significantly.

Figure 9:
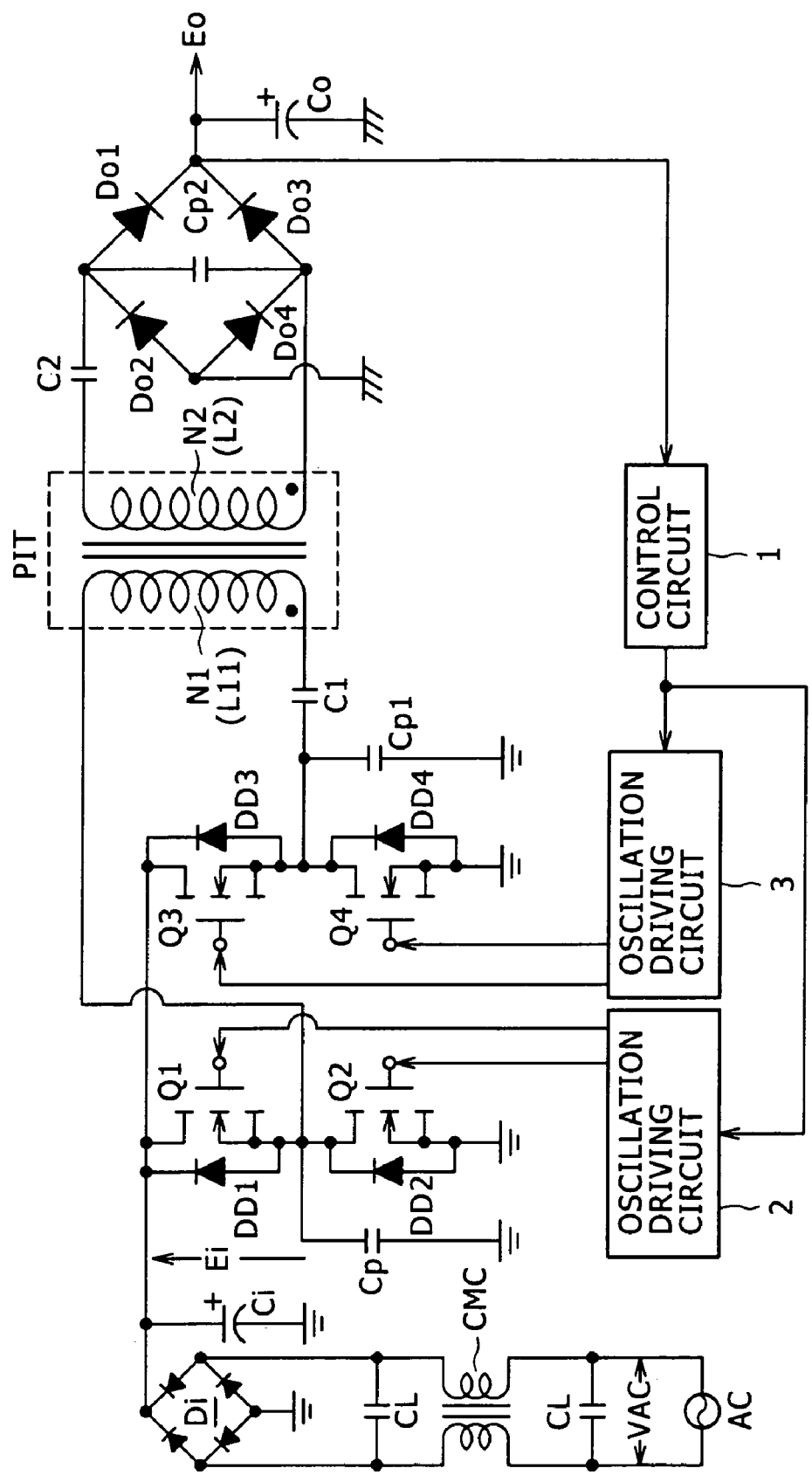
FIG. 9 is a circuit diagram showing an example of the configuration of a power supply circuit according to a first modification of the first embodiment.

FIG. 9 shows an example of the configuration of a power supply circuit according to a first modification of the first embodiment described above. The modified power supply circuit shown in FIG. 9 naturally has a basic configuration similar to that of the first embodiment and includes principal components selectively set similar to those of the power supply circuit of FIG. 1. Consequently, in the modified power supply circuit, the coupling coefficient k of the insulating converter transformer PIT and the resonance frequencies fo1 and fo2 are set similar to those in the power supply circuit of the first embodiment. In addition, the power supply circuit of FIG. 9 has a configuration ready for a heavier load condition.

Referring to FIG. 9, in order to be ready for a heavy load condition, the power supply circuit shown includes a primary side current resonance type converter including four switching elements Q1 to Q4 connected in a full bridge connection.

In the full bridge connection, a half bridge connection of the switching elements Q1 and Q2 and another half bridge connection of the switching elements Q3 and Q4 are connected in parallel to each other.

Also, damper diodes DD3 and DD4, each in the form of a body diode, are connected in parallel between the drain-source of the switching elements Q3 and Q4, respectively, similarly to the switching elements Q1 and Q2.

Further, in this instance, the primary side series resonance circuit formed from a series connection of the primary winding N1 of the insulating converter transformer PIT and the primary side series resonance capacitor C1 is connected in the following manner.

First, one end (winding ending end portion) of the primary winding N1, which is one of the end portions of the primary side series resonance circuit, is connected to a node between the source of the switching element Q1 and the drain of the switching element Q2. The node between the source of the switching element Q1 and the drain of the switching element Q2 is set as one of the switching output points of the switching circuit system of the full bridge connection.

At the other end portion of the primary side series resonance circuit, the other end portion (winding starting end portion) of the primary winding N1 is connected to a node between the source of the switching element Q3 and the drain of the switching element Q4, which is set as the other switching output point, through a series connection with the primary side series resonance capacitor C1.

Further, in this instance, the primary side partial resonance capacitor Cp1 is connected in parallel between the source-drain of the switching element Q4. The capacitance of the primary side partial resonance capacitor Cp1 cooperates with the leakage inductance L1 of the primary winding N1 (and the inductance of a high frequency inductor L11) to form a parallel resonance circuit (partial voltage resonance circuit). The capacitor Cp1 obtains a partial voltage resonance operation in which voltage resonates only upon turning off of the switching elements Q3 and Q4.

In this instance, two oscillation driving circuits 2 and 3 are provided. The oscillation driving circuit 2 drives the switching elements Q1 and Q2 so as to turn on/off alternately, while the oscillation driving circuit 3 drives the switching elements Q3 and Q4 so as to turn on/off alternately. Further, the oscillation driving circuits 2 and 3 generally perform switching driving such that the set of the switching elements [Q1, Q4] and the set of the switching elements [Q3, Q4] turn on/off alternately.

For example, if the load condition is inclined to become a heavy load condition, then the current flowing to the switching converter increases and this not only increases the burden on the circuit components but also decreases the power loss. Therefore, if such a full bridge connection as in the present modification is applied, then since the necessary load current is supplied from the four switching elements, the burden on each component is reduced and also the power loss is reduced, for example, when compared with an alternative half bridge connection including two switching elements. This is advantageous for a heavy load condition.

Where the configuration of a full bridge connection scheme as described above is adopted based on the configuration of FIG. 1, the power supply circuit can be ready for a heavy load of, for example, the maximum load power Pomax=200 W or more. In other words, the maximum load condition for which the power supply circuit can be ready can be increased.

Figure 10:
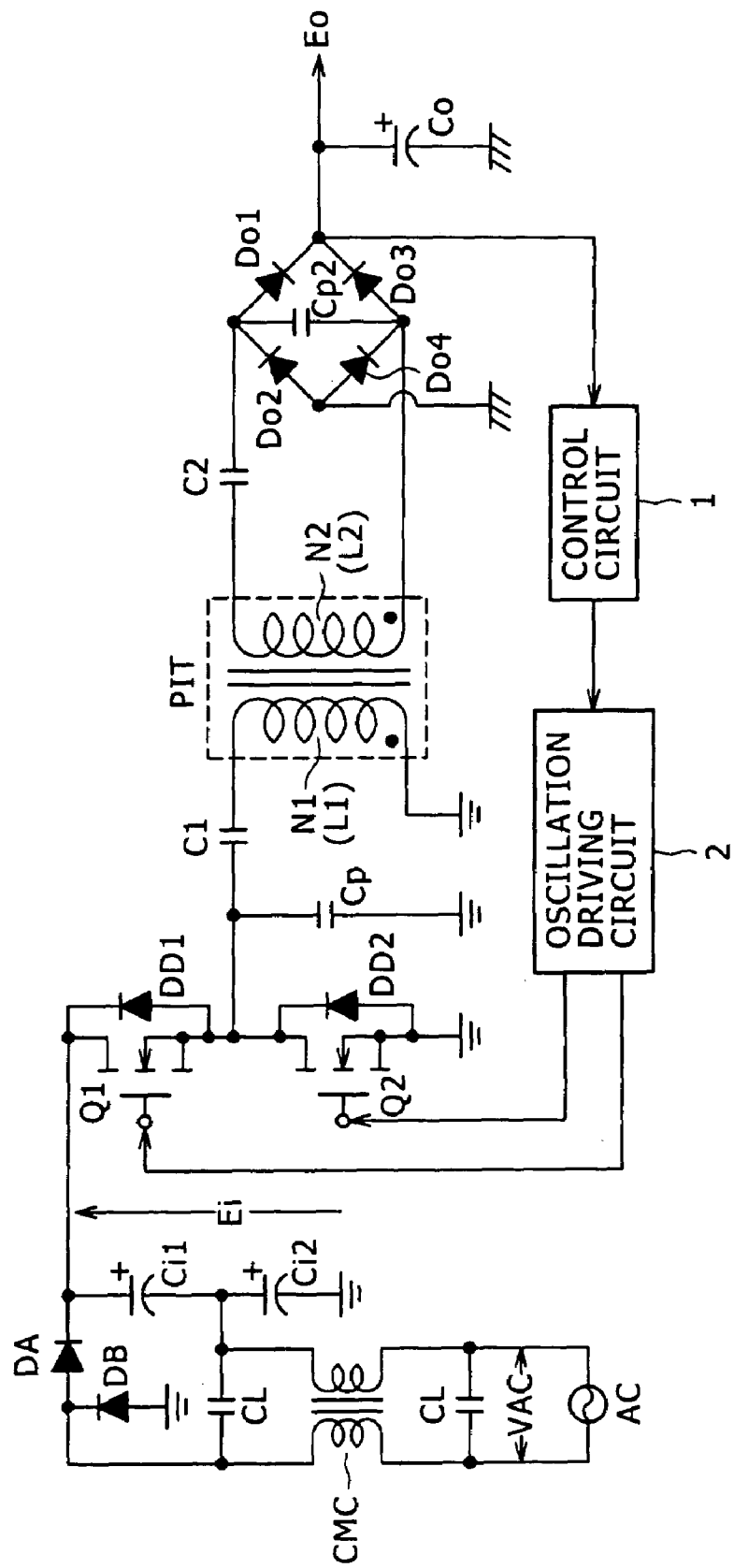
FIG. 10 is a circuit diagram showing an example of the configuration of a power supply circuit according to a second modification of the first embodiment.

FIG. 10 shows an example of the configuration of a power supply circuit according to a second modification of the first embodiment described above. Also, the modified power supply circuit shown in FIG. 10 naturally has a basic configuration similar to that of the first embodiment and has a configuration ready for a heavier load condition.

Referring to FIG. 10, as a configuration ready for a heavy load, the modified power supply circuit includes, as a rectification current circuit system for receiving a commercial AC power supply AC (AC input voltage VAC) as an input thereto to produce a rectification smoothed voltage Ei (DC input voltage), a voltage doubler rectification circuit for producing a rectification smoothed voltage Ei of a level equal to twice that of the AC input voltage VAC.

The voltage doubler rectification circuit includes two rectification diodes DA and DB and two smoothing capacitors Ci1 and Ci2.

The anode of the rectification diode DA and the cathode of the rectification diode DB are connected to a positive line of the commercial AC power supply AC at a stage following the common mode noise filter (CMC, CL, CL). The cathode of the rectification diode DA is connected to the positive terminal of the smoothing capacitor Ci1 while the anode of the rectification diode DB is connected to the primary side ground.

The smoothing capacitors Ci1 and Ci2 are connected in series. The negative terminal of the smoothing capacitor Ci1 and the positive terminal of the smoothing capacitor Ci2 are connected to one another. The positive terminal of the smoothing capacitor Ci1 is connected to the cathode of the rectification diode DA as described above. The negative terminal of the smoothing capacitor Ci2 is connected to the primary side ground. Further, a node between the smoothing capacitors Ci1 and Ci2 is connected to a negative line of the commercial AC power supply AC at the stage following the common mode noise filter (CMC, CL, CL).

The voltage doubler rectification circuit formed in this manner generally operates such that, within the period of a half wave that the commercial AC power supply AC (AC input voltage VAC) has a positive polarity, the rectification diode DA conducts to thereby charge rectification current into the smoothing capacitor Ci1. Consequently, a DC voltage (rectification smoothed voltage) of a level equal to that of the commercial AC power supply AC (AC input voltage VAC) is obtained as a voltage across the smoothing capacitor Ci1.

On the other hand, within the period of the other half wave that the AC input voltage VAC has a negative polarity, the rectification diode DB conducts to thereby charge rectification current into the smoothing capacitor Ci2. Consequently, a DC voltage (rectification smoothed voltage) of a level equal to that of the commercial AC power supply AC (AC input voltage VAC) is also obtained as a voltage across the smoothing capacitor Ci2.

As a result, a rectification smoothed voltage Ei equal to twice the voltage of the commercial AC power supply AC is obtained as a voltage across the series connection circuit of the smoothing capacitors Ci1 and Ci2. In other words, a voltage doubler rectification operation is performed by the voltage doubler rectification circuit. Then, the switching converter at the following stage receives the rectification smoothed voltage Ei produced in this manner as an input of a DC input voltage to perform a switching operation.

In the switching power supply circuit, as the heavy load tendency proceeds, the current flowing to the switching converter tends to increase and the power loss tends to increase. However, where the voltage doubler rectification circuit is used to obtain a rectification smoothed voltage Ei (DC input voltage) of a high level, the amount of current to flow to the switching converter can be reduced with respect to the same load condition. This suppresses an increase in the power loss by the tendency toward a heavier load condition. In other words, when compared with the alternative case in which a rectification circuit system for producing the rectification smoothed voltage Ei (DC input voltage) from the commercial AC power supply AC is formed as an ordinary full wave rectification circuit, a power supply circuit ready for a heavier load condition can be obtained. Where the configuration of the second modification of the first embodiment is applied, the power supply circuit can be ready for a heavy load condition of the maximum load power Pomax=approximately 200 W or more.

It is to be noted that the rectification circuit system for producing the DC input voltage (rectification smoothed voltage Ei) is formed as a voltage doubler rectification circuit as described above. Such a configuration is ready only for the single range of the AC 100 V type. However, the advantage that the responding performance of constant voltage control, for example, to a switching load or the like is enhanced by reduction of the necessary control range Δ fs for the switching frequency control is achieved in a manner similar to the power supply circuit of FIG. 1.

Figure 11:
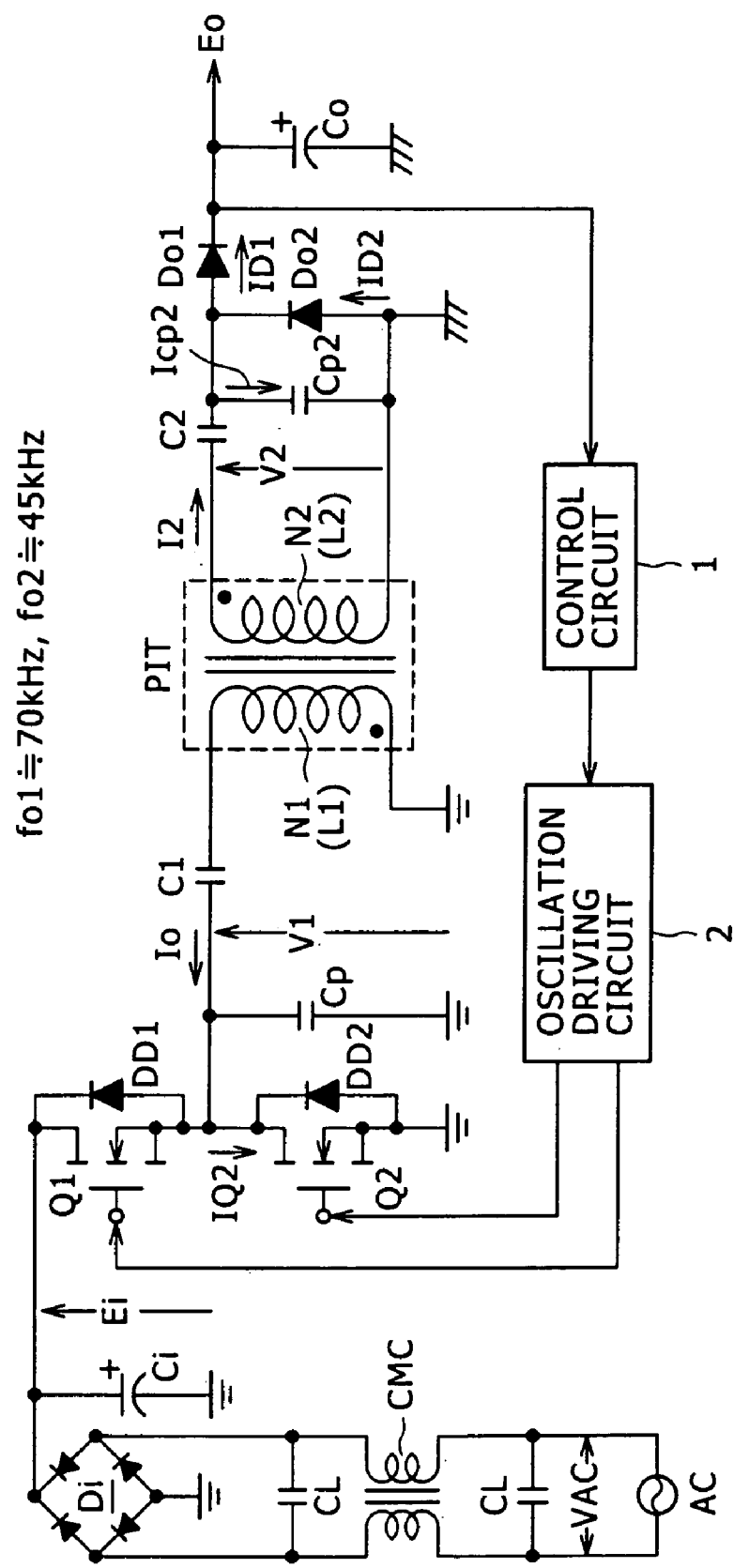
FIG. 11 is a circuit diagram showing an example of the configuration of a power supply circuit according to a second embodiment of the present invention.

FIG. 11 shows an example of the configuration of a power supply circuit according to a second embodiment of the present invention.

The power supply circuit shown in FIG. 11 has a basic configuration as a multiple composite resonance type converter including a bridge full wave rectification circuit (Di, Ci) as a rectification circuit system for producing a rectification smoothed voltage Ei (DC input voltage) and adopts a half bridge coupling system for a primary side current resonance type converter similar to the power supply circuit described hereinabove with reference to FIG. 1.

Further, in order to set the coupling coefficient k to k=approximately 0.65 or less, a gap length of approximately 2.8 mm is set for the gap G formed in the inner magnetic leg of an insulating converter transformer PIT having the structure, for example, shown in FIG. 2, in a manner similar to the power supply circuit of the first embodiment shown in FIG. 1.

Further, it is supposed that the present power supply circuit is incorporated as a power supply in, for example, a plasma display apparatus, and therefore has a configuration for producing a secondary side DC output voltage (Eo) of 200 V or more and ready for a load power Po within a range from 150 W to 0 W.

Furthermore, the power supply circuit of the second embodiment includes a voltage doubler half wave rectification circuit as a rectification circuit connected to the secondary winding N2.

In the voltage doubler half wave rectification circuit in this instance, the rectification diode Do1 is connected at the anode thereof to one end portion (winding starting end portion) of the secondary winding N2 through a series connection with a secondary side series resonance capacitor C2. The rectification diode Do1 is connected at the cathode thereof to the positive terminal of the smoothing capacitor Co. The smoothing capacitor Co is connected at the negative terminal thereof to the secondary side ground.

Further, the secondary winding N2 is grounded at the other end portion (winding ending end portion) thereof to the secondary side ground and is also connected to the anode of the rectification diode Do2. The rectification diode Do2 is connected at the cathode thereof to a node between the anode of the rectification diode Do1 and the secondary side series resonance capacitor C2.

Also in this instance, a secondary side partial resonance capacitor Cp2 is connected in parallel to the series connection circuit of the secondary winding N2 and the secondary side series resonance capacitor C2 cooperatively forming a secondary side series resonance circuit. The capacitor Cp2 cooperates with a leakage inductance L2 of the secondary winding N2 to form a secondary side partial voltage resonance circuit.

The voltage doubler half wave rectification circuit formed in such a manner as described above operates in the following manner.

First, within a half period of an alternating voltage induced in the secondary winding N2, rectification current flows along a path formed by the secondary winding N2—rectification diode Do2—secondary side series resonance capacitor C2 to thereby charge the rectification current into the secondary side series resonance capacitor C2. By the rectification operation at this time, a voltage of a level equal to that of the alternating voltage induced in the secondary winding N2 is produced across the secondary side series resonance capacitor C2.

Within the other half period of the alternating voltage induced in the secondary winding N2, rectification current flows along another path formed by the secondary winding N2—secondary side series resonance capacitor C2—rectification diode Do1—smoothing capacitor Co. At this time, the smoothing capacitor Co is charged with the induced voltage of the secondary winding N2 on which is superimposed the voltage across the secondary side series resonance capacitor C2 obtained by the rectification operation within the preceding half period of the alternating voltage of the secondary winding N2. Consequently, a secondary side DC output voltage Eo of a level equal to twice that of the alternating voltage level of the secondary winding N2 is produced as a voltage across the smoothing capacitor Co. In other words, a voltage doubler rectification operation is obtained.

Further, while in the voltage doubler half wave rectification operation described above, current flows in directions determined by the opposite positive and negative polarities to the secondary side series resonance capacitor C2 for individual half periods, the first secondary side series resonance circuit performs a rectification operation in response to the current.

Further, in response to the rectification operation of the voltage doubler half wave rectification circuit, a partial voltage resonance operation by the secondary side partial voltage resonance circuit including a secondary side partial resonance capacitor Cp2A is obtained at timings at which the rectification diodes Do1 and Do2 turn off.

As described hereinabove, in the power supply circuit of FIG. 11, the voltage doubler half wave rectification circuit is formed as a rectification smoothing circuit for producing the secondary side DC output voltage Eo so as to obtain a secondary side DC output voltage Eo of a level equal to twice the alternating voltage level obtained in the secondary winding N2.

Consequently, when trying to obtain a secondary side DC output voltage Eo of an equal level, the number of turns of the secondary winding N2 can be reduced to ½ as compared with an alternative configuration producing a voltage of a level equal to that of the alternating voltage described above as in the case of, for example, a bridge full wave rectification circuit.

Further, where such a bridge full wave rectification circuit as shown in FIG. 44 and such a full wave rectification circuit as shown in FIG. 45 as secondary side rectification circuits are compared with each other, if trying to obtain a secondary side DC output voltage Eo of an equal level, then the full wave rectification circuit requires a number of turns equal to twice that of the bridge full wave rectification circuit.

From this, where the circuit of FIG. 11 and the circuit of FIG. 45 are compared with each other with regard to the number of turns of the secondary winding N2, the number of turns of the secondary winding N2 in the circuit of FIG. 11 can be reduced to approximately ¼ that of the circuit of FIG. 45.

Actually, in order to obtain a secondary side DC output voltage Eo of an equal level, the secondary winding N2 in the circuit of FIG. 45 requires a number of turns equal to the secondary winding section N2A+secondary winding section N2B=50 T+50 T=100 T. The secondary winding N2 in the first modification is set to 25 T as hereinafter described.

Since the number of turns of the secondary winding N2 can be reduced in this manner, miniaturization of the insulating converter transformer PIT can be realized and simplification of the winding step of the secondary winding N2 can be realized.

Figure 12:
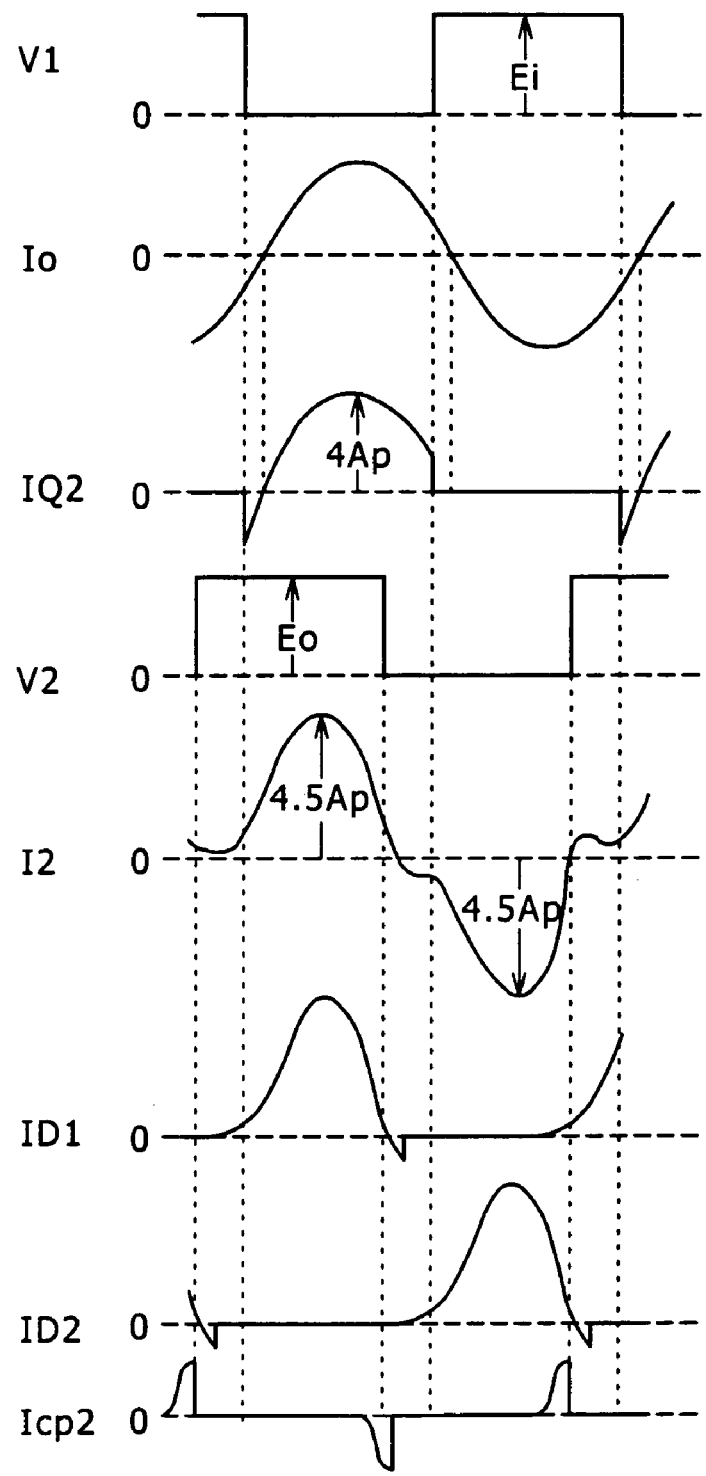
FIG. 12 is a waveform diagram illustrating the operation, in a maximum load power condition, of several components of the power supply circuit of the second embodiment.
Figure 13:
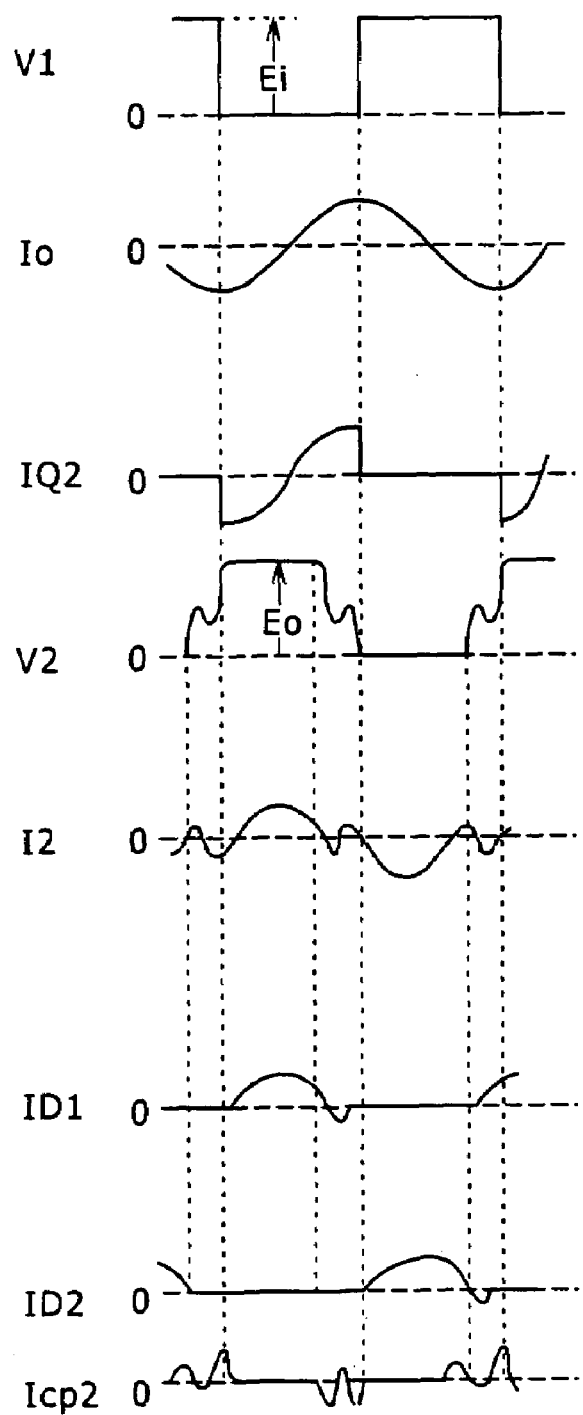
FIG. 13 is a waveform diagram illustrating the operation, in a light load condition, of several components of the power supply circuit of the second embodiment.

FIGS. 12 and 13 illustrate operation waveforms of several components of the power supply circuit shown in FIG.

In particular, FIG. 12 illustrates the operation waveforms when the load power Po is Po=150 W (maximum load power) while FIG. 13 illustrates the operation waveforms when the load power Po is Po=25 W. It is to be noted that FIGS. 12 and 13 illustrate the results of experiments conducted under the condition of a fixed AC input voltage VAC=100 V.

Further, in order to obtain the experimental results illustrated in FIGS. 12 and 13, the components shown in FIG. 11 were set as mentioned just below.

Insulating converter transformer PIT (EER-35 type ferrite core, gap length=2.8 mm, coupling coefficient k=0.63)

Primary winding N1=45 T (turns)=225 μH, leakage inductance L1=133 μH

Secondary winding N2=25 T=62 μH, leakage inductance L2=38 μH

Primary side series resonance capacitor C1=0.039 μF

Secondary side series resonance capacitor C2=0.33 μF

Primary side partial resonance capacitor Cp1=330 pF

Secondary side partial resonance capacitor Cp2=1,000 pF

In this instance, the resonance frequency fo1 of the primary side series resonance circuit is set to fo1≈70 kHz from the leakage inductance L1=133 μH of the primary winding N1 and the primary side series resonance capacitor C1=0.039 μF. Meanwhile, the resonance frequency fo2 is set to fo2≈45 kHz from the leakage inductance L2=148 μH of the secondary winding N2 and the secondary side series resonance capacitor C2=0.33 μF. Also in this instance, the resonance frequency fo2 is set so as to have a value lower than that of the resonance frequency fo1 so that the relationship of fo1>fo2 is obtained as in the first embodiment.

Referring to FIGS. 12 and 13, the voltage V1 is a voltage across the switching element Q2 and indicates on/off timings of the switching element Q2. In particular, within the period that the voltage V1 has a zero level, the switching current IQ2 of the switching element Q2 illustrated in FIGS. 12 and 13 flows and the switching element Q2 exhibits an on state. On the other hand, within another period that the voltage V1 is clamped at the level of the rectification smoothed voltage Ei as shown in the figure, the switching current IQ2 has a zero level and the switching element Q2 exhibits an off state.

Further, though not shown, the voltage across the switching element Q1 has a waveform shifted by 180 degrees from that of the voltage V1. Similarly, the switching current IQ1 of the switching element Q1 has a waveform shifted by 180 degrees in phase from that of the switching current IQ2. In other words, the switching element Q1 and the switching element Q2 are switched on and off alternately.

The primary side series resonance current Io flowing through the primary side series resonance circuit has the waveform seen in FIGS. 12 and 13, which is a composite waveform of the switching current IQ1 and the switching current IQ2.

Where the waveforms of the voltages V1 and the switching currents IQ2 illustrated in FIGS. 12 and 13 are actually compared with each other, the switching period of the waveforms of FIG. 13 in the case of a light load condition is shorter than that of the waveforms of FIG. 12 in the case of a heavy load. Thus, the stabilization control is performed such that, where the load becomes heavier and the level of the secondary side DC output voltage Eo decreases, the switching frequency decreases, but where the load becomes lighter and the level of the secondary side DC output voltage Eo increases, the switching frequency increases.

When the load becomes heavier and the switching frequency is controlled so as to decrease, a result was obtained in which the peak level of the switching current IQ2 became 4 Ap when the load power Po illustrated in FIG. 12 was Po=150 W.

When the primary side series resonance current Io described above flows, an alternating voltage is excited in the secondary winding N2 of the insulating converter transformer PIT. Then, in response to the alternating voltage obtained in this manner, the secondary winding current I2 of the waveform illustrated in FIG. 12 flows through the secondary winding N2. It is to be noted that the secondary winding current I2 exhibits a peak level (positive and negative absolute values) of 4.5 Ap when the load condition is heavy, as seen in FIG. 12.

Further, when the alternating voltage is excited in the secondary winding N2, the rectification diodes Do1 and Do2 on the secondary side are rendered conducting so that rectification current flows on the secondary side.

In this instance, it can be seen that, when the rectification diode Do1 conducts, the rectification current ID1 flows within the period that the alternating voltage excited in the secondary winding N2 has a positive polarity. On the other hand, when the rectification diode Do2 conducts, the rectification current ID2 flows within another period that the alternating voltage has a negative polarity.

As described hereinabove, by the rectification operation of the rectification diodes Do1 and Do2, a secondary side DC output voltage Eo of a level equal to twice that of the alternating voltage produced in the secondary winding N2 is produced as a voltage across the smoothing capacitor Co.

In this instance, a voltage V2 appearing between the node of the secondary side series resonance capacitor C2 and the anode of the rectification diode Do1 and the winding starting end portion of the secondary winding N2 has a waveform as follows. A peak level equal to the level of the secondary side DC output voltage Eo on the positive side is obtained within a period that the rectification diode Do1 conducts (within a half period in which the alternating voltage excited in the secondary winding N2 has a positive polarity). The zero level is obtained within another period that the rectification diode Do2 conducts (within the other half period in which the alternating voltage excited in the secondary winding N2 has a negative polarity), as seen in FIG. 12.

It also can be recognized from the waveform of the voltage V2 as just described that the circuit shown in FIG. 11 operates as a voltage doubler half wave rectification circuit. The circuit performs charging of the smoothing capacitor Co only within the half period of the alternating voltage obtained from the secondary winding N2 to obtain a secondary side DC output voltage Eo of a level equal to twice that of the alternating voltage across the smoothing capacitor Co.

FIGS. 12 and 13 further illustrate the current Icp2 flowing to the secondary side partial resonance capacitor Cp2 provided on the secondary side. As seen in FIGS. 12 and 13, the current Icp2 flows at timings at which the rectification diode Do1 and the rectification diode Do2 turn off (turn on). The waveform of the current Icp2 indicates a partial voltage resonance operation obtained at turning-off (turning-on) timings of the rectification diodes Do1 and Do2. Further, the waveform of the current Icp2 indicates that a reverse current flows upon turning off the rectification diodes Do1 and Do2, and reduction of the power loss (switching loss) by the rectification diodes Do1 and Do2 can be achieved thereby as described hereinabove.

Figure 14:
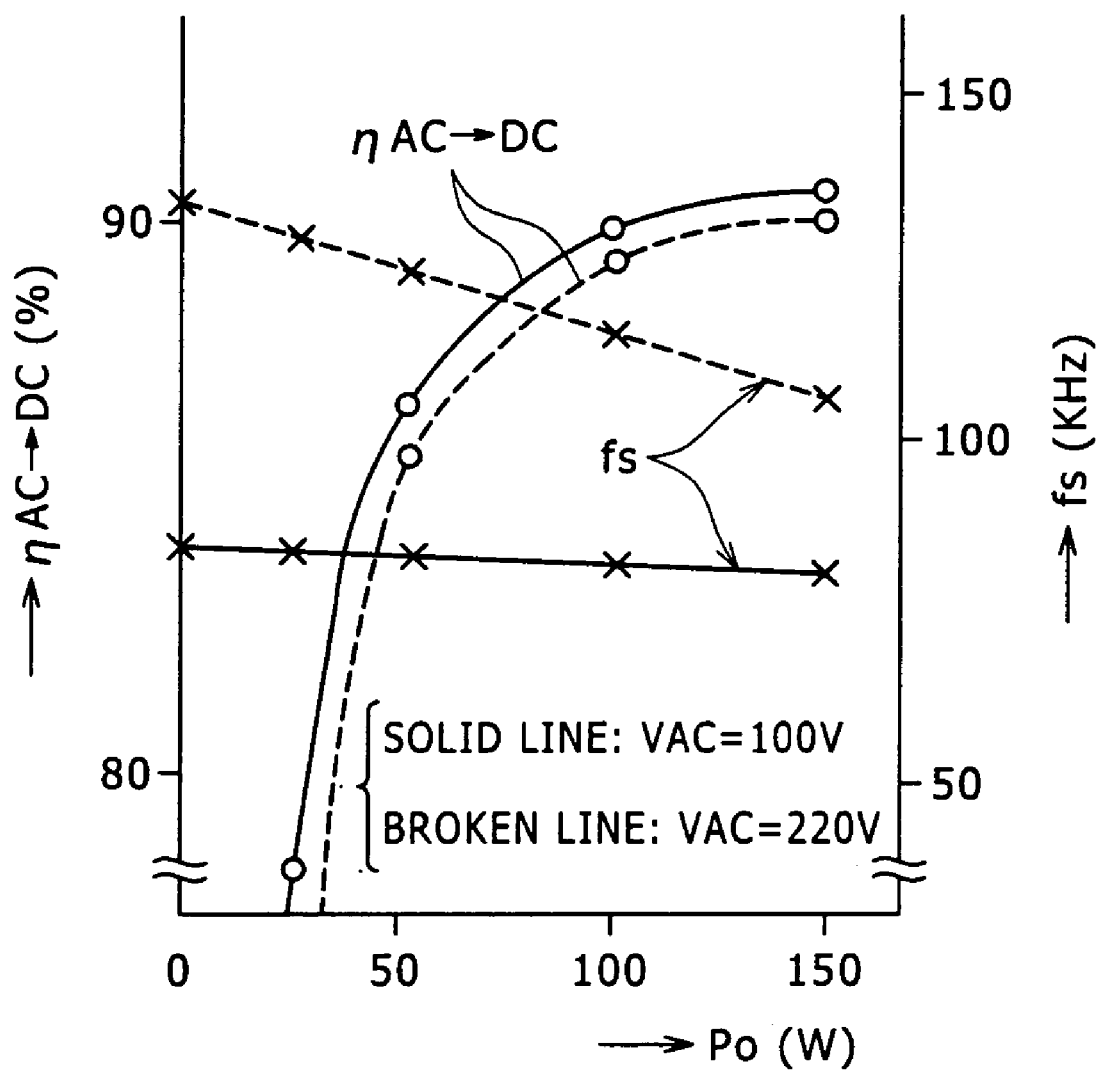
FIG. 14 is a graph illustrating the characteristics of switching frequency and AC→DC power conversion efficiency with respect to the load variation of the power supply circuit of the second embodiment.

FIG. 14 illustrates the characteristics of the power supply circuit shown in FIG. 11 obtained by an experiment conducted with the power supply circuit and particularly illustrates the AC→DC power conversion efficiency and the switching frequency control characteristic with respect to a load variation.

It is to be noted that, in FIG. 14, each characteristic is indicated by a solid line where it is a result of an experiment conducted with the AC input voltage VAC of VAC=100 V and by a broken line where it is a result of an experiment conducted with the AC input voltage VAC of VAC=220 V.

First, as regards the AC→DC power conversion efficiency, a characteristic that it rises as the load power Po rises is obtained with both the AC input voltage VAC=100 V and 220 V.

When the AC input voltage VAC is VAC=100 V, the AC→DC power conversion efficiency obtained exhibits its maximum at the load power Po=150 W and is η AC→DC=90.5%. When the AC input voltage VAC is VAC=220 V, a high AC→DC power conversion efficiency of η AC→DC=90% or more is obtained at the load power Po=150 W. In this manner, the power supply circuit of the second embodiment also achieves a power conversion efficiency substantially equal to that of the circuit in the related art shown in FIG. 44 or 45.

Also, the switching frequency fs exhibits the characteristic that the variation thereof is suppressed when compared with that of the circuit in the related art. That is, a steep variation of the switching frequency fs with respect to the variation within the range from a light load condition to a no load condition is effectively suppressed in the present embodiment. Particularly where the AC input voltage VAC is VAC=100 V, the switching frequency fs exhibits a characteristic that it is substantially flat with respect to variations of the load power Po between the maximum load power of Po=150 W and the no load condition of Po=0 W.

In particular, at the AC input voltage VAC=100 V, a result was obtained in which the switching frequency fs varied within a range of fs=80 to 83.6 kHz with respect to variations of the load power Po of Po=150 to 0 W. In other words, the necessary control range Δ fs1 of the switching frequency at the AC input voltage VAC=100 V is 3.6 kHz which is approximately ⅓₀ that of the power supply circuit in the related art. On the other hand, at the AC input voltage VAC=220 V, a result was obtained that the switching frequency fs was 105 to 132 kHz with respect to variations of the load power Po=150 to 0 W and the necessary control range Δ fs2 in this instance was 27 kHz. As a result, the necessary control range Δ fsA over the range of the commercial AC power supply of the AC 100 V type to the AC 200 V type is approximately 80 to 130 kHz. This sufficiently remains within the frequency variation range (approximately 50 to 200 kHz) of the switching driving IC (oscillation driving circuit 2). In short, an existing switching driving IC can be used as is for the implementation of the configuration ready for a wide range similar to the first embodiment.

Figure 15:
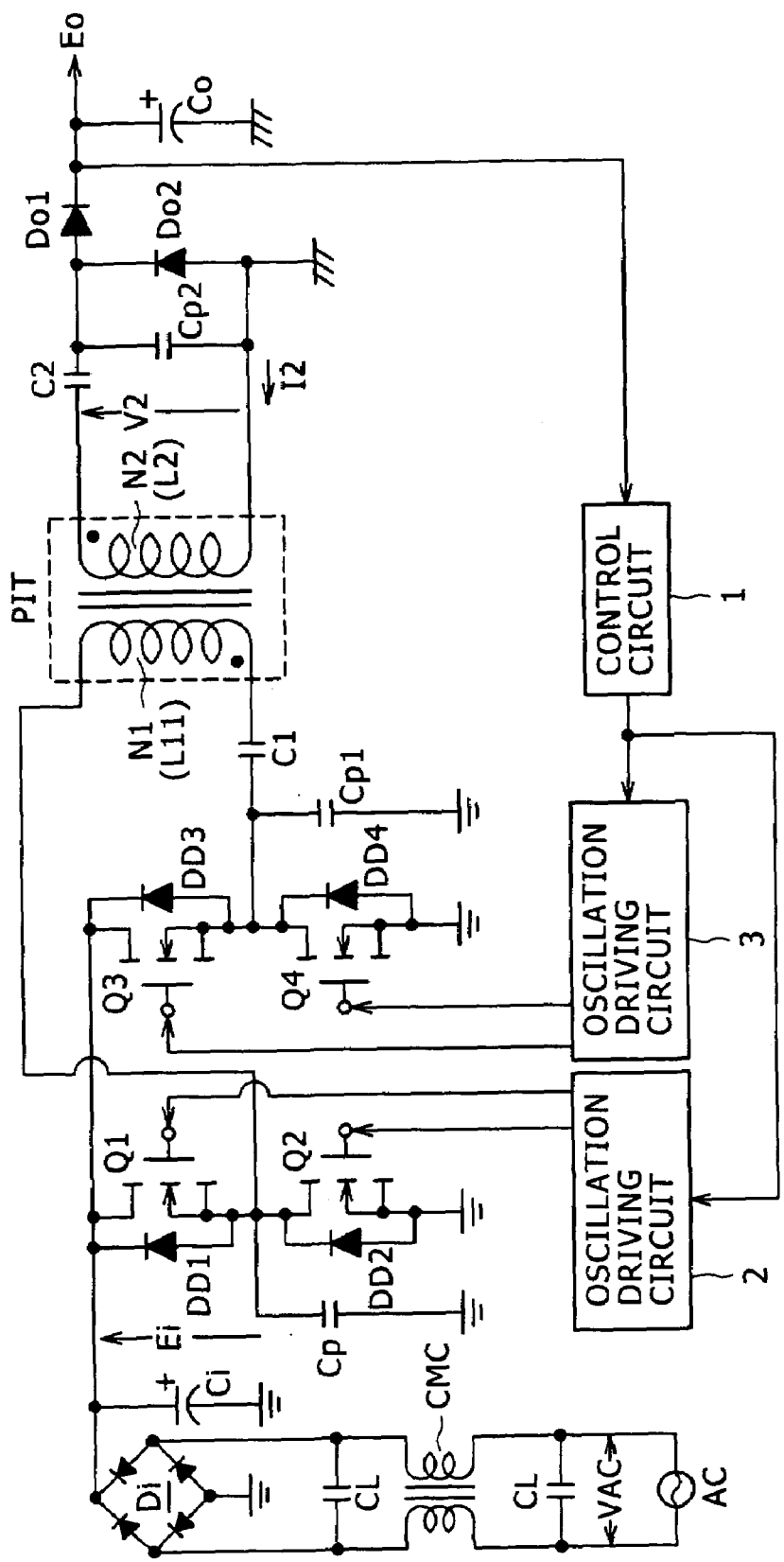
FIG. 15 is a circuit diagram showing an example of the configuration of a power supply circuit according to a first modification of the second embodiment.

FIG. 15 shows an example of the configuration of a power supply circuit according to a first modification of the second embodiment described above. The modified power supply circuit shown in FIG. 15 naturally has a basic configuration similar to that of the second embodiment and includes principal components selectively set similar to those of the power supply circuit of FIG. 11. Consequently, in the modified power supply circuit, the coupling coefficient k of the insulating converter transformer PIT and the resonance frequencies fo1 and fo2 are set similar to those in the power supply circuit of FIG. 11. In addition, the power supply circuit of FIG. 15 has a configuration ready for a heavier load condition.

Referring to FIG. 15, in order to be ready for a heavy load condition, the power supply circuit shown includes a primary side current resonance type converter including four switching elements Q1 to Q4 connected in a full bridge connection. Where the configuration just described is adopted, the maximum load condition for which the power supply circuit can be ready can be increased to the maximum load power Pomax=approximately 300 to 400 W.

Figure 16:
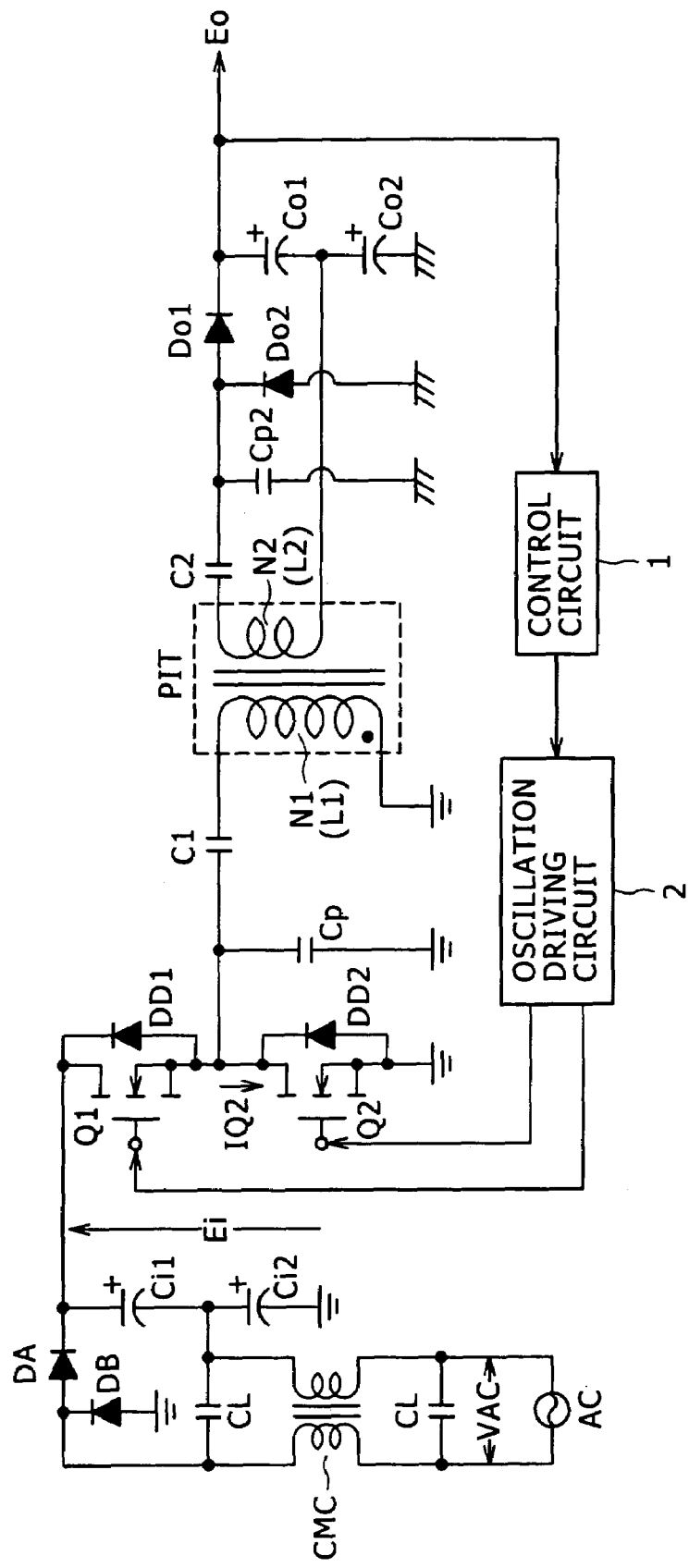
FIG. 16 is a circuit diagram showing an example of the configuration of a power supply circuit according to a second modification of the second embodiment.

FIG. 16 shows an example of the configuration of a power supply circuit according to a second modification of the second embodiment described above. Also, the modified power supply circuit shown in FIG. 16 naturally has a basic configuration similar to that of the second embodiment and has a configuration ready for a heavier load condition.

Referring to FIG. 16, as a configuration ready for a heavy load, the modified power supply circuit includes, as a rectification current circuit system for receiving a commercial AC power supply AC (AC input voltage VAC) as an input thereto to produce a rectification smoothed voltage Ei (DC input voltage), a voltage doubler rectification circuit having a configuration similar to that of FIG. 10. Where the configuration just described is adopted, the maximum load condition for which the power supply circuit can be ready can be increased to the maximum load power Pomax=approximately 300 to 400 W.

In the circuit shown in FIG. 16, the secondary side voltage doubler half wave rectification circuit has a configuration different from those of FIGS. 11 and 15.

Also in the circuit of FIG. 16, the secondary side series resonance capacitor C2 is connected in series to one end portion of the secondary winding N2, and the anode of the rectification diode Do1 is connected to the secondary side series resonance capacitor C2. In this instance, however, a series connection circuit of a smoothing capacitor Co1 (first secondary side smoothing capacitor) and another smoothing capacitor Co2 (second secondary side smoothing capacitor) is connected as the secondary side smoothing capacitor for producing the secondary side DC output voltage Eo as seen in FIG. 16.

The smoothing capacitor Co1 is connected at the positive terminal thereof to the cathode of the rectification diode Do1, and the negative terminal of the smoothing capacitor Co1 and the positive terminal of the smoothing capacitor Co2 are connected to each other. The negative terminal of the smoothing capacitor Co2 is connected to the secondary side ground.

Further, a node between the smoothing capacitor Co1 and the smoothing capacitor Co2 is connected to the other end portion of the secondary winding N2.

Further, the rectification diode Do2 is connected at the cathode thereof to a node between the secondary side series resonance capacitor C2 and the anode of the rectification diode Do1 and at the anode thereof to the secondary side ground.

It is to be noted that the secondary side partial resonance capacitor Cp2 is interposed between a node between the secondary side series resonance capacitor C2 and the cathode of the rectification diode Do2 and the secondary side ground such that it may have a parallel relationship to the series connection circuit of the secondary winding N2 and the secondary side series resonance capacitor C2. Consequently, a partial voltage (parallel) resonance circuit is formed from the secondary side partial resonance capacitor Cp2 and the leakage inductance L2 of the secondary winding N2.

According to the connection scheme described above, within the half period of an alternating voltage induced in the secondary winding N2, rectification current flows along a path of the rectification diode Do1—smoothing capacitor Co1, and consequently, a voltage of a level equal to that of the alternating voltage is produced across the smoothing capacitor Co1. Within the other half period of the alternating voltage, rectification current flows along another path of the smoothing capacitor Co2—rectification diode Do2. Consequently, a voltage of a level equal to that of the alternating voltage is produced across the smoothing capacitor Co2.

As a result, a secondary side DC output voltage Eo of a level equal to twice that of the alternating voltage level is produced as a voltage across the series connection circuit of the smoothing capacitors Co1 and Co2.

As can be recognized from the foregoing description, since each of the smoothing capacitors Co1 and Co2 provided on the secondary side in this instance is charged only within the half period of the alternating voltage, a half wave rectification operation is obtained as the rectification operation. In other words, an operation as a voltage doubler half wave rectification circuit is also obtained on the secondary side of the circuit shown in FIG. 16.

Also, the circuit shown in FIG. 16 is applicable for a single voltage range because the rectification circuit system for producing the rectification smoothed voltage Ei is formed as a voltage doubler rectification circuit. However, the circuit achieves a good responding performance of constant voltage control to a steep variation within a wide load variation range such as a switching load.

It is to be noted that the modifications shown in FIGS. 15 and 16 may be further modified such that, for example, the secondary side of FIG. 16 has the configuration of the half bridge coupling of the primary side shown in FIG. 1. Also, it is possible to apply the configuration of the secondary side of FIG. 16 to the full bridge configuration of the primary side shown in FIG. 15 or to conversely apply the configuration of the secondary side shown in FIG. 15 to the configuration of the voltage doubler rectification circuit of the primary side shown in FIG. 16. In other words, the configurations of the primary side and the secondary side may be combined as desired. This also applies to the various embodiments hereinafter described.

Figure 17:
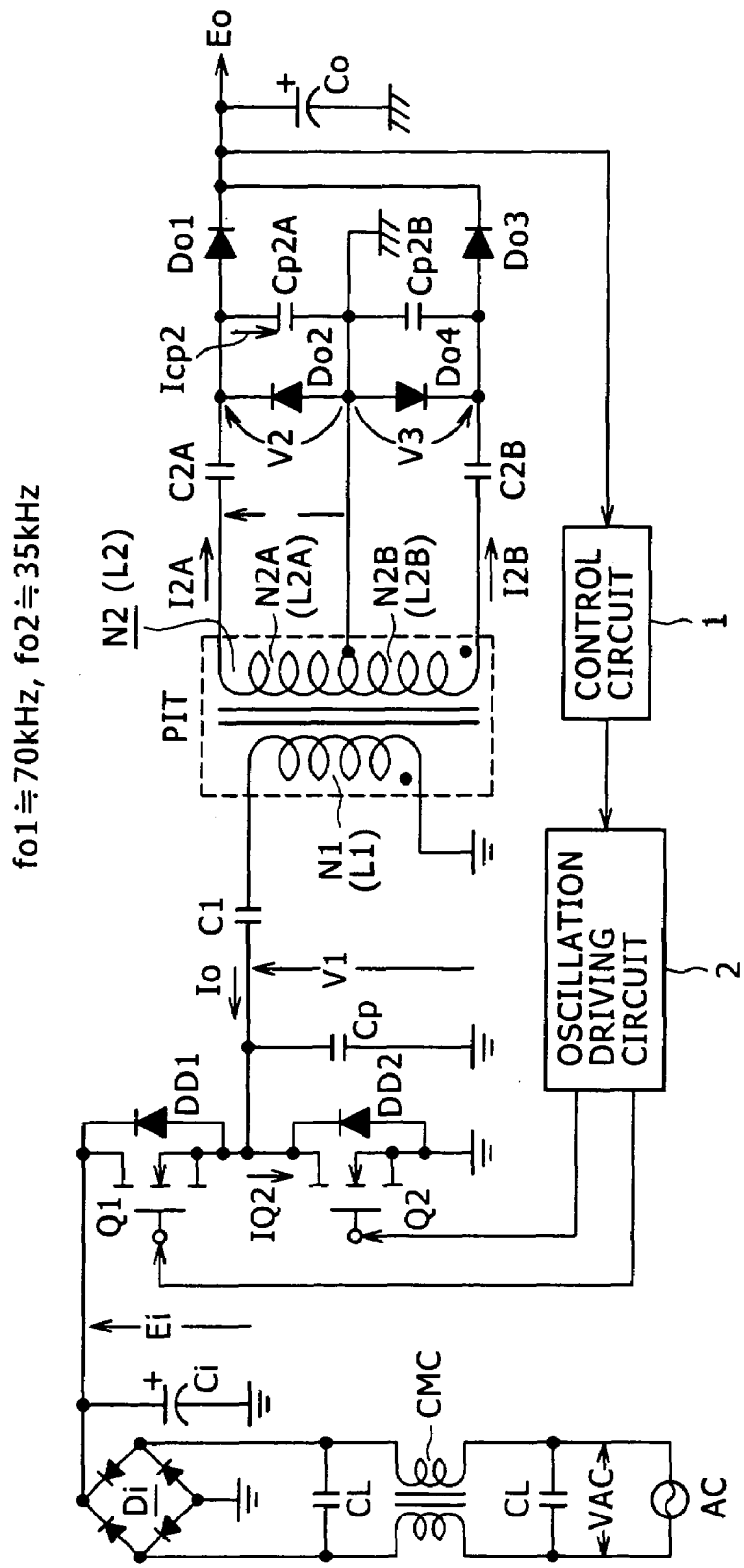
FIG. 17 is a circuit diagram showing an example of the configuration of a power supply circuit according to a third embodiment of the present invention.

FIG. 17 shows an example of the configuration of a power supply circuit according to a third embodiment of the present invention.

The power supply circuit shown in FIG. 17 has a basic configuration as a multiple composite resonance type converter. The converter includes a bridge full wave rectification circuit (Di, Ci) as a rectification circuit system for producing a rectification smoothed voltage Ei (DC input voltage) and adopts a half bridge coupling system for a primary side current resonance type converter similar to the power supply circuits described hereinabove with reference to FIGS. 1 and 11.

Further, in order to set the coupling coefficient k to k=approximately 0.65 or less, a gap length of approximately 2.8 mm is set for the gap G formed in the inner magnetic leg of an insulating converter transformer PIT having the structure, for example, shown in FIG. 2.

Further, it is supposed that the present power supply circuit is incorporated as a power supply in, for example, a plasma display apparatus, and therefore has a configuration for producing a secondary side DC output voltage Eo of 200 V or more and ready for a load power Po within a range from 150 to 0 W.

Furthermore, the power supply circuit shown in FIG. 17 includes a voltage doubler full wave rectification circuit as a secondary side rectification circuit. The secondary winding N2 in the voltage doubler full wave rectification circuit has a center tap provided thereon such that the secondary winding N2 is divided into two secondary winding sections N2A and N2B. In this instance, the center tap of the secondary winding N2 is grounded to the secondary side ground.

An end portion of the secondary winding section N2A is a winding ending portion of the secondary winding N2. The end portion of the secondary winding section N2A is connected to a node between the anode of the rectification diode Do1 and the cathode of the rectification diode Do2 through a series connection of a secondary side series resonance capacitor C2A.

Meanwhile, an end portion of the secondary winding section N2B is a winding starting portion of the secondary winding N2. The end portion of the secondary winding section N2B is connected to a node between the anode of a rectification diode Do3 and the cathode of a rectification diode Do4 through a series connection of a secondary side series resonance capacitor C2B.

Further, a node between the rectification diodes Do2 and Do4 is connected to the secondary side ground. A node between the rectification diode Do1 and the rectification diode Do3 is connected to the positive terminal of the smoothing capacitor Co. The negative terminal of the smoothing capacitor Co is connected to the secondary side ground.

Further, in this instance, two secondary side partial resonance capacitors Cp2A and Cp2B are provided. In particular, the secondary side partial resonance capacitor Cp2A is inserted between a node between the anode of the rectification diode Do1 and the cathode of the rectification diode Do2 and the secondary side ground.

Meanwhile, the secondary side partial resonance capacitor Cp2B is inserted between a node between the anode of the rectification diode Do3 and the cathode of the rectification diode Do4 and the secondary side ground.

The voltage doubler full wave rectification circuit formed in such a connection scheme as described above performs a rectification operation as described below.

In particular, the voltage doubler full wave rectification circuit can be divided into first and second voltage doubler half wave rectification circuits. The first voltage doubler half wave rectification circuit is formed from the secondary winding section N2A, secondary side series resonance capacitor C2A, rectification diodes Do1 and Do2, and secondary side partial resonance capacitor Cp2A. The second voltage doubler half wave rectification circuit is formed from the secondary winding section N2B, secondary side series resonance capacitor C2B, rectification diodes Do3 and Do4, and secondary side partial resonance capacitor Cp2B.

In the first voltage doubler half wave rectification circuit, since the series connection circuit of the secondary winding section N2A—secondary side series resonance capacitor C2A is formed, a first secondary side series resonance circuit is formed from the leakage inductance component (L2A) of the secondary winding section N2A and the capacitance of the secondary side series resonance capacitor C2A.

Similarly, in the second voltage doubler half wave rectification circuit, since the series connection circuit of the secondary winding section N2B—secondary side series resonance capacitor C2B is formed, a second secondary side series resonance circuit is formed from the leakage inductance component (L2B) of the secondary winding section N2B and the capacitance of the secondary side series resonance capacitor C2B.

Further, the secondary side partial resonance capacitor Cp2A inserted in such a manner as described hereinabove is connected in parallel to the series connection of the secondary winding section N2A—secondary side series resonance capacitor C2A. Accordingly, a secondary side partial voltage resonance circuit corresponding to the first voltage doubler half wave rectification circuit is formed from the capacitance of the secondary side partial resonance capacitor Cp2A itself and the leakage inductance L2A of the secondary winding section N2A. Similarly, the secondary side partial resonance capacitor Cp2B is connected in parallel to the series connection of the secondary winding section N2B—secondary side series resonance capacitor C2B. Accordingly, another secondary side partial voltage resonance circuit corresponding to the second voltage doubler half wave rectification circuit is formed from the capacitance of the secondary side partial resonance capacitor Cp2B itself and the leakage inductance L2B of the secondary winding section N2B.

The first voltage doubler half wave rectification circuit performs a rectification operation in the following manner.

First, within the half period of an alternating voltage induced in the secondary winding N2, rectification current flows along a path of the secondary winding section N2A—rectification diode Do2—secondary side series resonance capacitor C2A to thereby charge the rectification current into the secondary side series resonance capacitor C2A. By the rectification operation at this time, a voltage of a level equal to that of the alternating voltage induced in the secondary winding section N2A is produced across the secondary side series resonance capacitor C2A.

Within the other succeeding half period of the alternating voltage of the secondary winding N2, rectification current flows along another path of the secondary winding section N2A—secondary side series resonance capacitor C2A—rectification diode Do1—smoothing capacitor Co. At this time, the smoothing capacitor Co is charged with an induced voltage of the secondary winding section N2A on which is superimposed the voltage across the secondary side series resonance capacitor C2A obtained by the rectification operation within the preceding half period of the alternating voltage of the secondary winding section N2A. Consequently, a secondary side DC output voltage Eo of a level equal to twice that of the alternating voltage level of the secondary winding section N2A is produced as the voltage across the smoothing capacitor Co.

In short, the first voltage doubler half wave rectification circuit performs a voltage doubler rectification operation. The voltage doubler rectification operation produces a voltage across the secondary side series resonance capacitor C2A that has a level equal to that of the alternating voltage of the secondary winding section N2A within the half period of the alternating voltage of the secondary winding section N2A, and charges the smoothing capacitor Co with a voltage of a superposed level of the alternating voltage of the secondary winding section N2A and the voltage across the secondary side series resonance capacitor C2A within the other half period of the alternating voltage of the secondary winding section N2A. Thus, the first voltage doubler half wave rectification circuit obtains a voltage of a level equal to twice that of the alternating voltage of the secondary winding section N2A as the voltage across the smoothing capacitor Co.

Further, while in the voltage doubler half wave rectification operation described above, current flows in the directions in the opposite positive and negative polarities to the secondary side series resonance capacitor C2A for individual half periods, the first secondary side series resonance circuit performs a rectification operation in response to the current.

Further, in response to the rectification operation of the first voltage doubler half wave rectification circuit, a partial voltage resonance operation by the secondary side partial voltage resonance circuit including the secondary side partial resonance capacitor Cp2A is obtained at timings at which the rectification diodes Do1 and Do2 turn off.

Meanwhile, in the second voltage doubler half wave rectification circuit, a voltage doubler half wave rectification operation similar to that of the first voltage doubler half wave rectification circuit is executed at periodic timings shifted by a half period from those by the rectification operation of the first voltage doubler half wave rectification circuit described hereinabove. Further, as a result of the rectification operation, the second secondary side series resonance circuit performs a rectification operation. Furthermore, at timings at which the rectification diodes Do3 and Do4 turn off in such rectification operation, the secondary side partial voltage resonance circuit including the secondary side partial resonance capacitor Cp2B performs a partial voltage resonance operation.

Since such rectification operation is performed, charging by the first voltage doubler half wave rectification circuit and charging by the second voltage doubler half wave rectification circuit are repetitively executed to the smoothing capacitor Co for every half period of the alternating voltage of the secondary winding N2. In short, the entire rectification circuit connected to the secondary winding N2 performs a voltage doubler full wave rectification operation. The voltage doubler full wave rectification operation charges the smoothing capacitor Co with a charging potential equal to twice the alternating voltage induced in the secondary winding sections N2A and N2B within every period of a half wave in which the alternating voltage of the secondary winding N2 is in the positive/negative. By the rectification operation, the smoothing capacitor Co obtains the secondary side DC output voltage Eo. The secondary side DC output voltage Eo is a rectification smoothed voltage equal to twice the alternating voltage induced in the secondary winding sections N2A and N2B.

Figure 18:
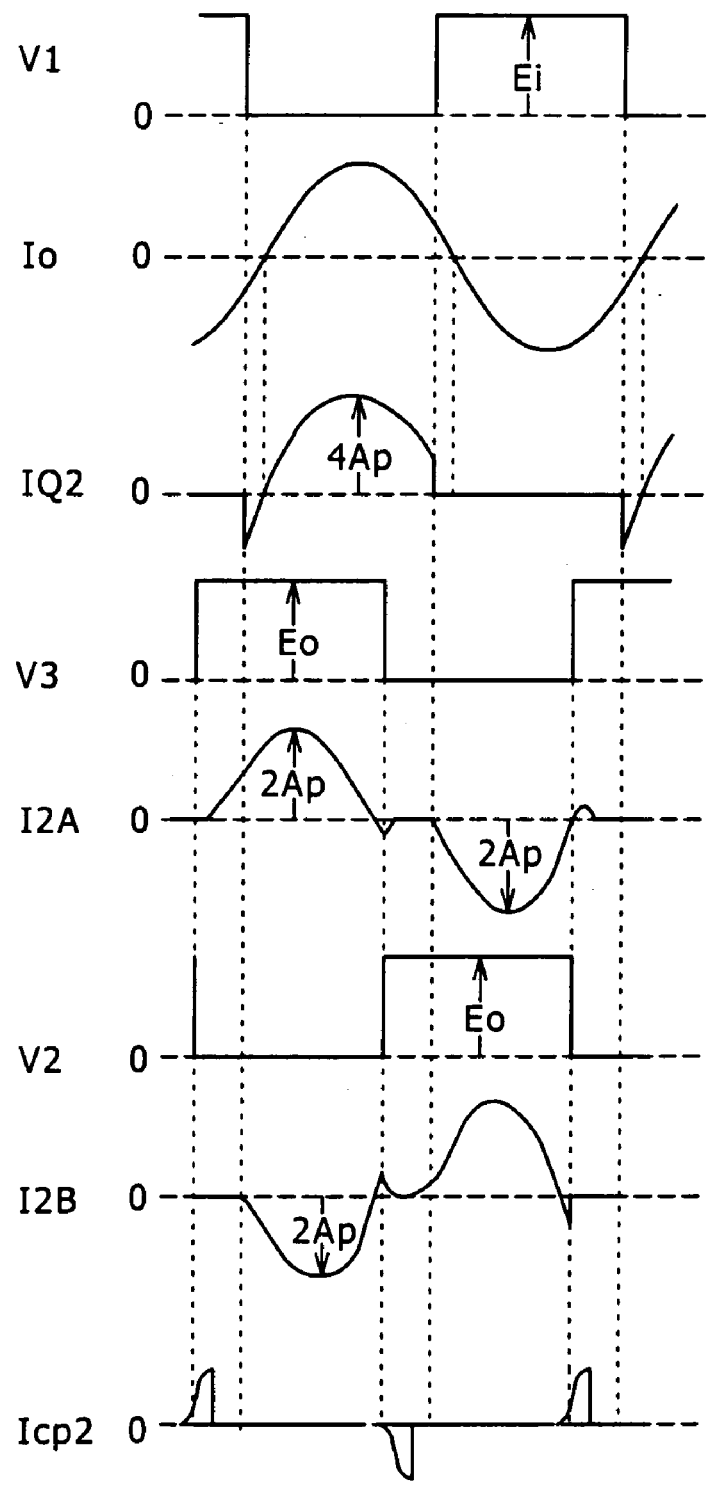
FIG. 18 is a waveform diagram illustrating the operation, in a maximum load power condition, of several components of the power supply circuit of the third embodiment.
Figure 19:
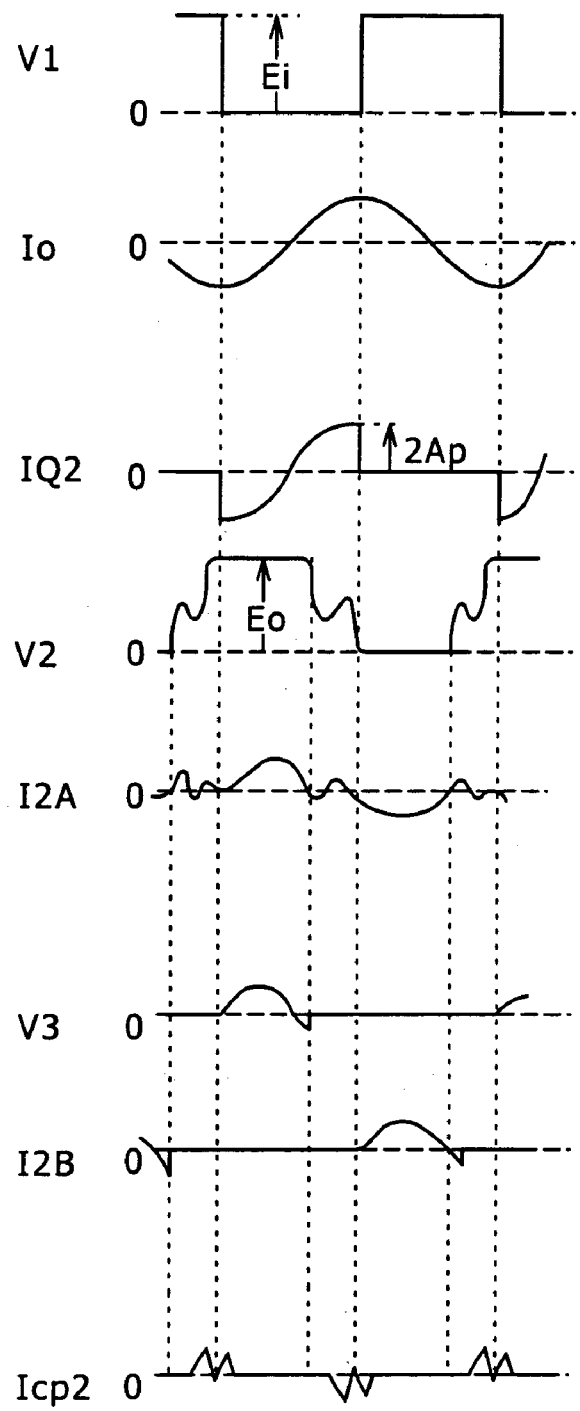
FIG. 19 is a waveform diagram illustrating the operation, in a light load condition, of several components of the power supply circuit of the third embodiment.

FIGS. 18 and 19 illustrate operation waveforms of several components of the power supply circuit shown in FIG. 17.

In particular, FIG. 18 illustrates the operation waveforms when the load power Po is Po=150 W (maximum load power) while FIG. 19 illustrates the operation waveforms when the load power Po is Po=25 W. It is to be noted that FIGS. 18 and 19 illustrate the results of experiments conducted under the condition of a fixed AC input voltage VAC=100 V.

Further, in order to obtain the experimental results illustrated in FIGS. 18 and 19, the components shown in FIG. 17 were set as mentioned just below.
Insulating converter transformer PIT (EER-35 type ferrite core, gap length=2.8 mm, coupling coefficient k=0.63)

Primary winding N1=45 T (turns)=225 µH, leakage inductance L1=133 µH

Secondary winding N2=secondary winding section N2A+ secondary winding section N2B=25 T+25 T=50 T, secondary winding section N2A=secondary winding section N2B=62 µH, leakage inductance L2=38 µH
Primary side series resonance capacitor C1=0.039 µF
Secondary side series resonance capacitor C2A=secondary side series resonance capacitor C2B=0.15 µF
Primary side partial resonance capacitor Cp1=330 pF
Secondary side partial resonance capacitor Cp2A=secondary side partial resonance capacitor Cp2B=1000 pF In this instance, the resonance frequency fo1 of the primary side series resonance circuit is set to fo1≈70 kHz from the leakage inductance L1=133 µH of the primary winding N1 and the primary side series resonance capacitor C1=0.039 µF. Meanwhile, the secondary side series resonance frequency fo2 is set to fo2≈35 kHz from the leakage inductance L2=38 µH of the secondary winding N2 and the secondary side series resonance capacitor C2A=C2B=0.15 µF. Consequently, the relationship of fo1>fo2 is obtained as in the first and second embodiments.

Also, FIGS. 18 and 19 illustrate the voltage V1 across the switching element Q2 and further illustrate on/off timings of the switching element Q2. Also in this instance, the voltage across the switching element Q1 has a waveform shifted by 180 degrees from that of the voltage V1. Similarly, the switching current IQ1 of the switching element Q1 has a waveform shifted by 180 degrees in phase from that of the switching current IQ2. In other words, the switching element Q1 and the switching element Q2 are switched on and off alternately.

Also in this instance, the primary side series resonance current Io flowing through the primary side series resonance circuit has the waveform seen in FIGS. 18 and 19, which is a composite waveform of the switching current IQ1 and the switching current IQ2.

Where the waveforms of the voltages V1 and the switching currents IQ2 illustrated in FIGS. 18 and 19 are actually compared with each other, the switching period of the waveforms of FIG. 19 is shorter than that of the waveforms of FIG. 18. Thus, the stabilization control according to the switching frequency control method is performed such that the switching frequency increases as the level of the secondary side DC output voltage Eo increases similar to the first and second embodiments.

Also in this instance, a result was obtained in which the peak level of the switching current IQ2 became 4 Ap when the maximum load power condition was established and the switching frequency was controlled so as to decrease.

When the primary side series resonance current Io described above flows, an alternating voltage is excited in the secondary winding N2 of the insulating converter transformer PIT. Then, in response to the alternating voltage obtained in this manner, the secondary winding current flows through the secondary winding section N2A and the secondary winding section N2B. In this instance, the secondary winding current I2A flowing from the secondary winding section N2A to the secondary side series resonance capacitor C2A side and the secondary winding current I2B flowing from the secondary winding section N2B to the secondary side series resonance capacitor C2B side exhibit waveforms having opposite positive and negative polarities to each other as seen in FIGS. 18 and 19.

It is to be noted that the secondary winding currents I2A and I2B exhibit a peak level (positive and negative absolute values) of 2 Ap at the maximum load power, as seen in FIG. 18.

In the first voltage doubler half wave rectification circuit formed on the secondary winding section N2A side, the potential V2 appearing between the node of the secondary side series resonance capacitor C2A and the anode of the rectification diode Do1 and the winding starting portion of the secondary winding section N2A has a waveform as follows. A peak level equal to that of the secondary side DC output voltage Eo is obtained on the positive side within the half period of the alternating voltage excited in the secondary winding N2. The zero level is obtained within the other half period of the alternating voltage excited in the secondary winding N2.

On the other hand, in the second voltage doubler half wave rectification circuit formed on the secondary winding section N2B side, the voltage V3 appearing between the node of the secondary side series resonance capacitor C2B and the anode of the rectification diode Do3 and the winding starting portion of the secondary winding section N2B (that is, the center tap of the secondary winding N2) has a waveform as follows. A peak level equal to that of the secondary side DC output voltage Eo is obtained on the positive side within the other half period of the alternating voltage excited in the secondary winding N2. The zero level is obtained within the one half period of the alternating voltage excited in the secondary winding N2.

Also, from the waveforms of the voltages V2 and V3, it can be recognized that the circuit shown in FIG. 17 operates as a voltage doubler full wave rectification circuit. The circuit charges the smoothing capacitor Co within each half period of the alternating voltage induced in the secondary winding N2 to thereby obtain a secondary side DC output voltage Eo of a level equal to twice the level of the alternating voltage obtained in the secondary winding N2 across the smoothing capacitor Co.

FIGS. 18 and 19 further illustrate the current Icp2 flowing to the secondary side partial resonance capacitor Cp2A provided on the secondary side. Also in this instance, the current Icp2 flows at timings at which the rectification diode Do1 and the rectification diode Do2 turn off, and it is illustrated that a reverse current flows upon turning off the rectification diodes Do1 and Do2.

Further, the current (not shown) flowing to the secondary side partial resonance capacitor Cp2B provided in the second voltage doubler half wave rectification circuit has a waveform shifted by 180 degrees from that of the current Icp2. Consequently, for the rectification diode Do3 and the rectification diode Do4, a path is formed allowing a reverse current to flow upon turning off, and as a result, reduction of the switching loss by the rectification diodes Do provided on the secondary side can be achieved.

Figure 20:
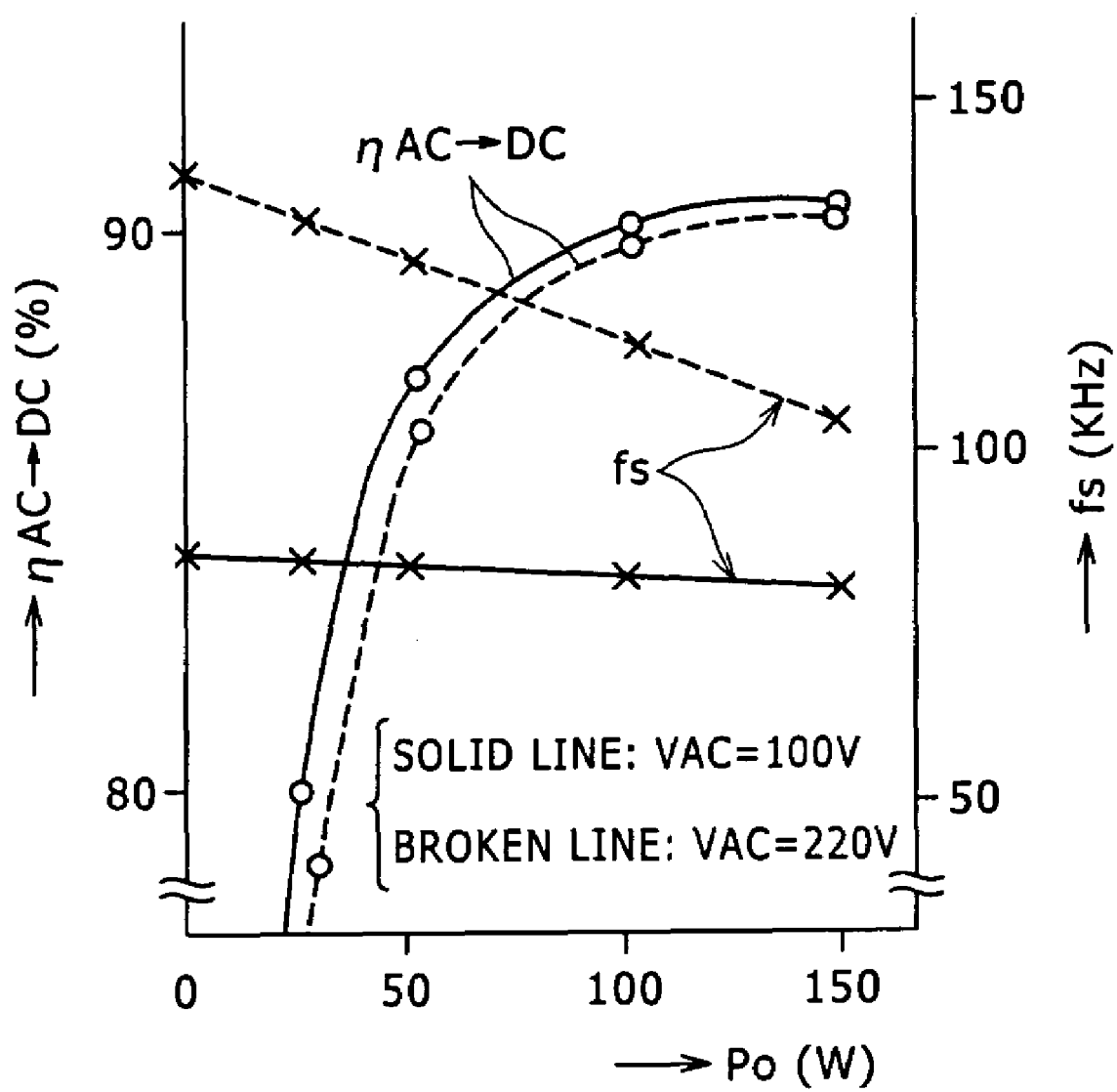
FIG. 20 is a graph illustrating the characteristics of switching frequency and AC→DC power conversion efficiency with respect to the load variation of the power supply circuit of the third embodiment.

FIG. 20 illustrates the characteristics of the power supply circuit shown in FIG. 17 and particularly illustrates the AC→DC power conversion efficiency and the switching frequency control characteristic with respect to a load variation.

It is to be noted that, in FIG. 20, each characteristic is indicated by a solid line where it is a result of an experiment conducted with the AC input voltage VAC of VAC=100 V and by a broken line where it is a result of an experiment conducted with the AC input voltage VAC of VAC=220 V.

First, as regards the AC→DC power conversion efficiency, the circuit shown in FIG. 17 achieves a characteristic that it rises as the load power Po rises with both the AC input voltage VAC=100 V and 220 V.

When the AC input voltage VAC is VAC=100 V, the AC→DC power conversion efficiency obtained exhibits its maximum at the load power Po=150 W and is η AC→DC=91.0%. When the AC input voltage VAC is VAC=220 V, a high AC→DC power conversion efficiency of η AC→DC=90% or more is obtained at the load power Po=150 W. In this manner, the power supply circuit of the third embodiment also achieves a power conversion efficiency substantially equal to that of the circuit in the related art shown in FIG. 44 or 45.

Further, while, according to the characteristics described above, the power supply circuit of the third embodiment achieves a power conversion efficiency having a value a little higher than that of the power supply circuit of the second embodiment described hereinabove, this arises from the fact that the secondary side voltage doubler rectification operation is changed over from the half wave rectification operation to the full wave rectification operation.

Further, where the power supply circuit of the third embodiment and the circuit of FIG. 45 are configured in accordance with the same settings with regard to the AC input voltage condition, the load condition and the level of the secondary side DC output voltage Eo, the secondary winding N2 in the present embodiment including the voltage doubler rectification circuit can be formed with a reduced number of turns.

For example, the number of turns in the secondary winding N2 in the circuit of FIG. 45 is the secondary winding section N2A+secondary winding section N2B=50 T+50 T=100 T as described hereinabove. In contrast, in the present embodiment, the number of turns in the secondary winding N2 of the present embodiment is the secondary winding section N2A+secondary winding section N2B=25 T+25 T=50 T, and therefore is reduced to one half.

Also, the switching frequency fs in this instance exhibits the characteristic that the variation thereof is suppressed when compared with that of the circuit in the related art. That is, a steep variation of the switching frequency fs with respect to the variation within the range from a light load condition to a no load condition is effectively suppressed in the present embodiment. Particularly where the AC input voltage VAC is VAC=100 V, the switching frequency fs exhibits a characteristic that it is substantially flat with respect to variations of the load power Po between the maximum load power of Po=150 W and the no load condition of Po=0 W.

In particular, at the AC input voltage VAC=100 V, a result was obtained in which the switching frequency fs varied within a range of fs=80 to 84.4 kHz with respect to variations of the load power Po of Po=150 to 0 W. In other words, the necessary control range Δ fs1 of the switching frequency at the AC input voltage VAC=100 V is 4.4 kHz which is approximately ⅓₀ that of the power supply circuit in the related art. On the other hand, at the AC input voltage VAC=220 V, a result was obtained that the switching frequency fs was 105 to 138 kHz with respect to variations of the load power Po=150 to 0 W and the necessary control range Δ fs2 in this instance was 33 kHz. As a result, the necessary control range Δ fsA over the range of the commercial AC power supply of the AC 100 V type to the AC 200 V type is approximately 80 to 140 kHz. This sufficiently remains within the frequency variation range (approximately 50 to 200 kHz) of the switching driving IC (oscillation driving circuit 2). In short, an existing switching driving IC can be used as is for the implementation of the configuration ready for a wide range similar to the first and second embodiments.

Figure 21:
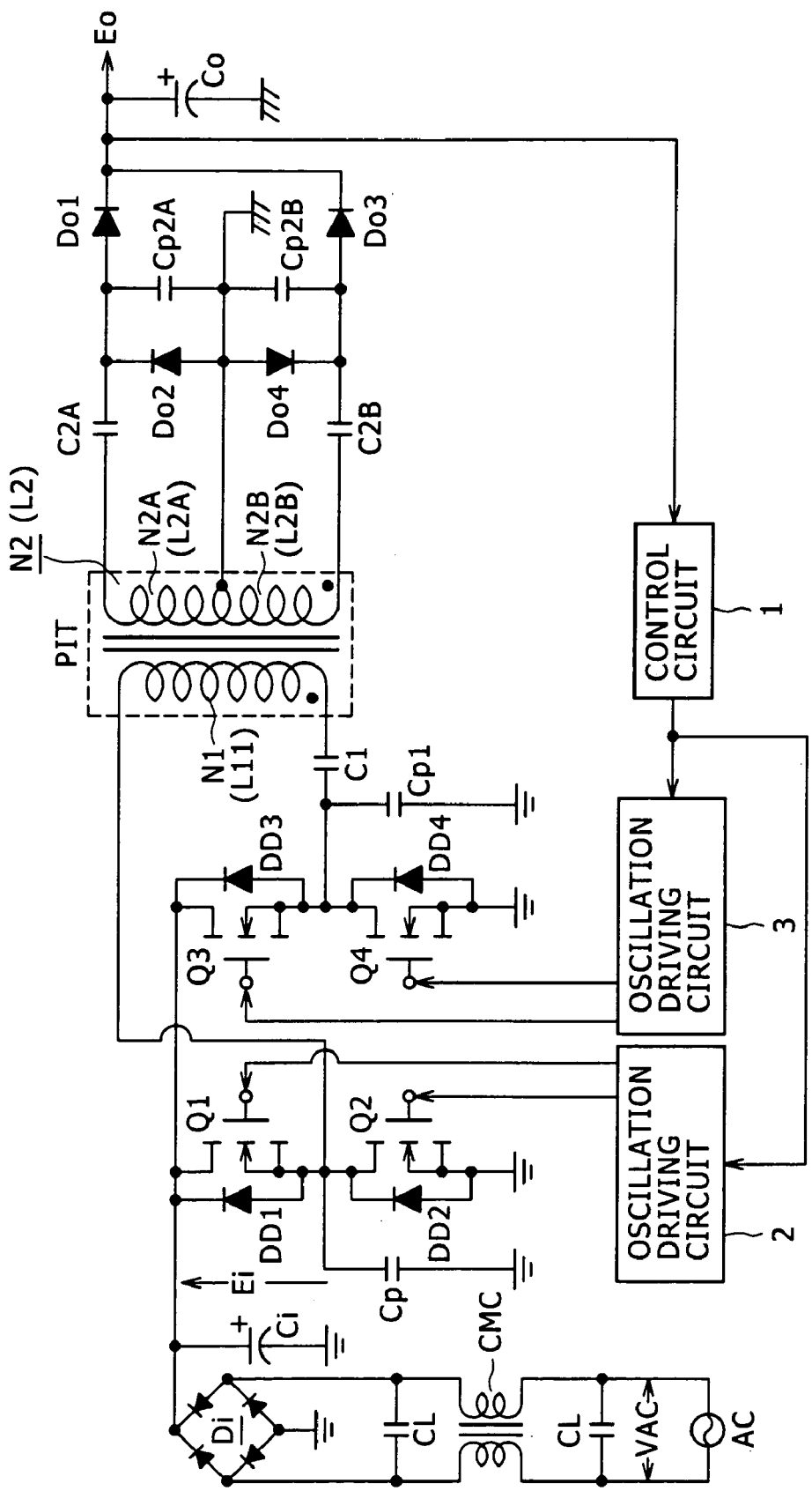
FIG. 21 is a circuit diagram showing an example of the configuration of a power supply circuit according to a first modification of the third embodiment.

FIG. 21 shows an example of the configuration of a power supply circuit according to a first modification of the third embodiment described above. The modified power supply circuit shown in FIG. 21 naturally has a basic configuration similar to that of the third embodiment and includes principal components selectively set similarly to those of the power supply circuit of FIG. 17. Consequently, in the modified power supply circuit, the coupling coefficient k of the insulating converter transformer PIT and the resonance frequencies fo1 and fo2 are set similarly to those in the power supply circuit of FIG. 1. In addition, the power supply circuit of FIG. 21 has a configuration ready for a heavier load condition.

Referring to FIG. 21, in order to be ready for a heavy load condition, the power supply circuit shown includes a primary side current resonance type converter including four switching elements Q1 to Q4 connected in a full bridge connection.

Where the configuration just described is adopted, the maximum load condition for which the power supply circuit can be ready can be increased to the maximum load power Pomax=approximately 300 to 400 W.

Figure 22:
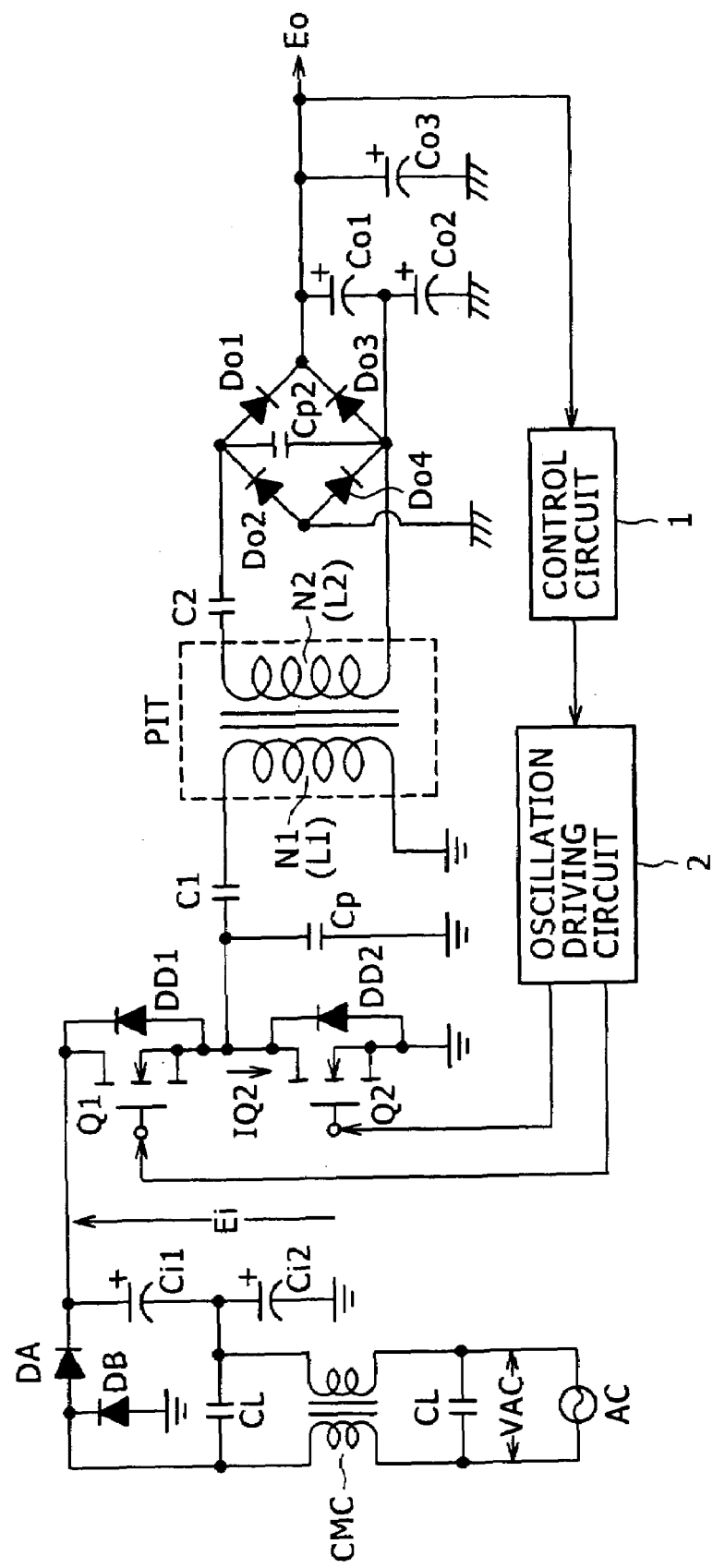
FIG. 22 is a circuit diagram showing an example of the configuration of a power supply circuit according to a second modification of the third embodiment.

FIG. 22 shows an example of the configuration of a power supply circuit according to a second modification of the third embodiment described above. The modified power supply circuit shown in FIG. 22 also has a basic configuration similar to that of the third embodiment and has a configuration ready for a heavier load condition.

Referring to FIG. 22, as a configuration ready for a heavy load, the modified power supply circuit includes, as the rectification current circuit system for receiving a commercial AC power supply AC (AC input voltage VAC) as an input thereto to produce the rectification smoothed voltage Ei (DC input voltage), a voltage doubler rectification circuit having a configuration similar to that of FIG. 10.

Where the configuration just described is adopted, the maximum load condition for which the power supply circuit can be ready can be increased to the maximum load power Pomax=approximately 300 to 400 W.

In the circuit shown in FIG. 22, the secondary side voltage doubler full wave rectification circuit has a different circuit configuration from that of FIG. 17.

First, in the circuit shown in FIG. 22, the secondary winding N2 is not divided by the provision of a center tap, and a bridge rectification circuit formed from rectification diodes Do1 to Do4 connected in a bridge connection is provided as the rectification circuit on the secondary side.

Furthermore, the smoothing capacitor Co for producing the secondary side DC output voltage Eo is formed from a series connection circuit of a smoothing capacitor Co1 (second secondary side smoothing capacitor) and another smoothing capacitor Co2 (third secondary side smoothing capacitor) and a smoothing capacitor Co3 (first secondary side smoothing capacitor) connected in parallel to the series connection circuit.

In this instance, the negative terminal of the smoothing capacitor Co2 and the negative terminal of the smoothing capacitor Co3 are connected to the secondary side ground.

In the following description of the bridge rectification circuit described above, the node between the rectification diode Do1 and the rectification diode Do2 is referred to as a first terminal; the node between the rectification diode Do1 and the rectification diode Do3 is referred to as a second terminal; the node between the rectification diode Do3 and the rectification diode Do4 is referred to as a third terminal; and the node between the rectification diode Do4 and the rectification diode Do2 is referred to as a fourth terminal. In this instance, the first terminal is connected to one end portion of the secondary winding N2 through a series connection of the secondary side series resonance capacitor C2.

The second terminal is connected to a node between the positive terminal of the smoothing capacitor Co1 and the positive terminal of the smoothing capacitor Co3.

The third terminal is connected to the other end portion of the secondary winding N2, and is connected, at the node thereof, to a node between the smoothing capacitor Co1 and the smoothing capacitor Co2.

The fourth terminal is connected to the secondary side ground.

According to the connection scheme described above, within one of two half periods of an alternating voltage excited in the secondary winding N2, rectification current flows along a path of the secondary side series resonance capacitor C2→rectification diode Do1→smoothing capacitor Co3→rectification diode Do4. Further, within the period, the rectification current is divided and also flows through the rectification diode Do1→smoothing capacitor Co1.

Within the other half period of the alternating voltage of the secondary winding N2, rectification current flows along another path of the rectification diode Do3→smoothing capacitor Co3→rectification diode Do2→secondary side series resonance capacitor C2. The rectification current is divided within this period and also flows through the smoothing capacitor Co2→rectification diode Do3.

It can be recognized that such rectification current paths charge rectification current into the smoothing capacitor Co3 within each half period of the alternating voltage excited in the secondary winding N2. In other words, a voltage doubler full rectification operation is obtained as the rectification operation.

Further, since the rectification current is divided and flows in such a manner as described above, the rectification current is charged into the smoothing capacitor Co1 within one of two half periods of the alternating voltage, and within this period, a voltage of a level equal to that of the alternating voltage is produced across the smoothing capacitor Co1.

Similarly, within the other half period of the alternating voltage, the rectification current is also charged into the smoothing capacitor Co2, and within this period, a voltage of a level equal to that of the alternating voltage is produced across the smoothing capacitor Co2.

Consequently, a level equal to twice that of the alternating voltage is obtained as the voltage across the series connection circuit of the smoothing capacitors Co1 and Co2.

Then, in this instance, since the series connection circuit of the smoothing capacitors Co1 and Co2 and the smoothing capacitor Co3 are connected in parallel to each other as described hereinabove, a level equal to twice that of the alternating voltage excited in the secondary winding N2 is obtained as the voltage across the smoothing capacitor Co3. Thus, the secondary side DC output voltage Eo is obtained as the voltage across the parallel connection circuit of the series connection circuit of the smoothing capacitors Co1 and Co2 and the smoothing capacitor Co3.

In this manner, the secondary side of the circuit shown in FIG. 22 operates as a voltage doubler full wave rectification circuit which performs the operation of charging rectification current into the secondary side smoothing capacitor within each one half period of the alternating voltage excited in the secondary winding N2 to produce a secondary side DC output voltage Eo of a level equal to twice that of the alternating voltage across the secondary side smoothing capacitor.

According to the circuit configuration of FIG. 14 which includes a bridge rectification circuit and three secondary side smoothing capacitors as the secondary side voltage doubler full wave rectification circuit in this manner, the number of turns of the secondary winding N2 can be set to 25 T equal to that of FIG. 17. In particular, in this instance, both the advantage that miniaturization of a transformer and simplification of a winding step similar to those where the configuration of a voltage doubler half wave rectification circuit is adopted and the advantage of reduction of the power loss arising from the employment of full-wave rectification can be achieved.

It is to be noted that, in the circuit shown in FIG. 22, the secondary side partial resonance capacitor Cp2 is inserted between the first terminal (node of D1 and D2: positive input terminal) and the third terminal (node of D3 and D4: negative input terminal) of the bridge rectification circuit described hereinabove such that the secondary side partial resonance capacitor Cp2 is connected in parallel to the series connection circuit of the secondary winding N2 and the secondary side series resonance capacitor C2. Consequently, the capacitance of the secondary side partial resonance capacitor Cp2 and the leakage inductance L2 of the secondary winding N2 cooperate with each other to form a partial voltage resonance circuit which performs a voltage resonance operation only at timings at which the rectification diodes Do1, Do2, Do3 and Do4 turn off.

Further, although the circuit shown in FIG. 22 is used for an application ready for a single range, in this instance, the advantage that a high speed response of constant voltage control can be anticipated is achieved.

In addition, the modifications shown in FIGS. 21 and 22 can be further modified such that the primary side has the configuration shown in FIG. 17 or the configurations of the primary side are switched with each other.

Figure 23:
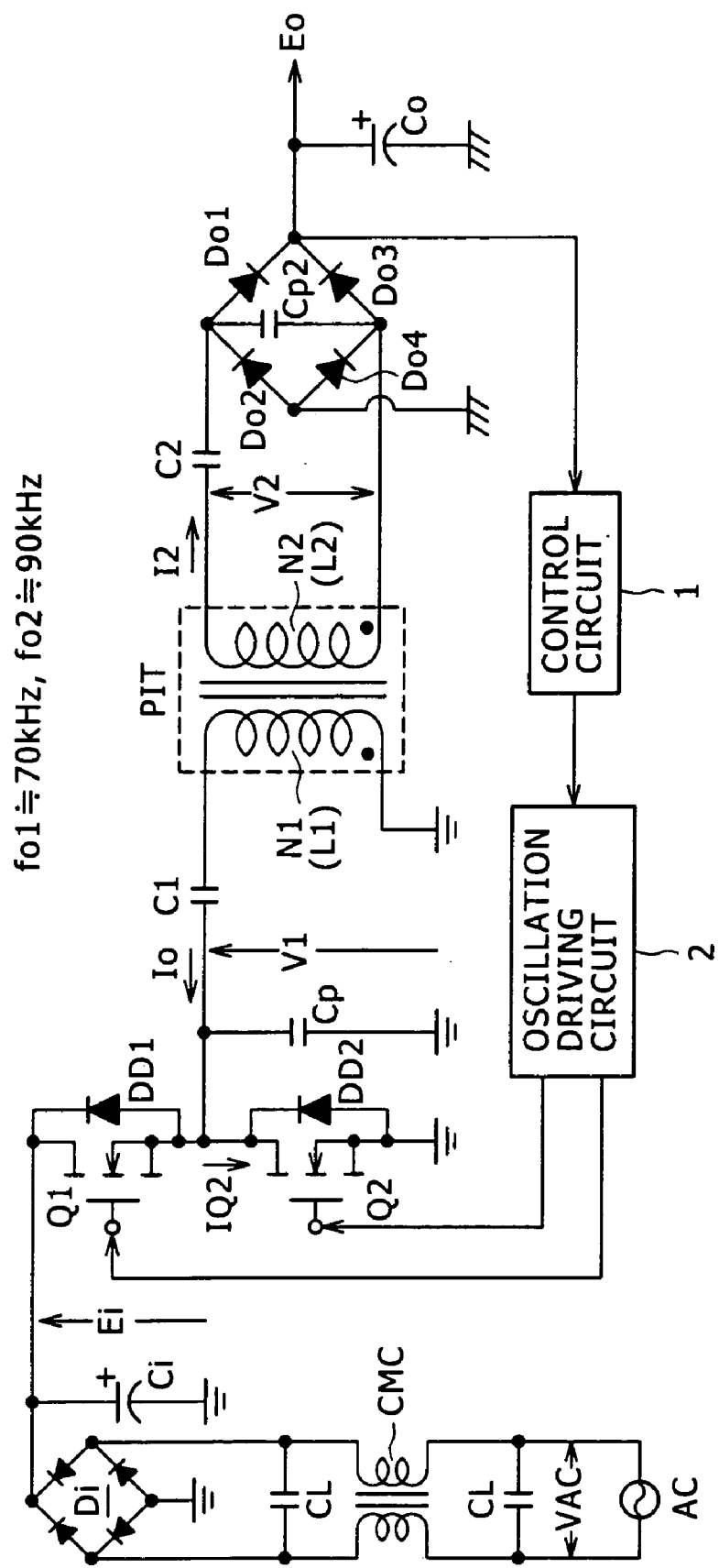
FIG. 23 is a circuit diagram showing an example of the configuration of a power supply circuit according to a fourth embodiment of the present invention.

FIG. 23 shows an example of the configuration of a switching power supply circuit according to a fourth embodiment of the present invention.

Also, the power supply circuit of the fourth embodiment has a configuration ready for a wide range wherein it operates in response to commercial AC power supplies of both the AC 100 V type and the AC 200 V type. Further, the power supply circuit is ready for a range of variation of the load power Po, for example, from Po=approximately 200 W to Po=0 W (no load).

The circuit configuration itself of the power supply circuit shown in FIG. 23 is a multiple (composite) resonance type converter similar to that shown in FIG. 1. In particular, the primary side includes a combination of a partial voltage resonance circuit with a separately excited current resonance type converter according to the half bridge coupling system. Meanwhile, the secondary side includes a secondary side series resonance capacitor C2 connected in series with a secondary winding N2 to form a secondary side series resonance circuit, and includes a bridge full wave rectification circuit as a secondary side rectification circuit. The secondary side also includes a secondary side partial resonance capacitor Cp2 which forms a secondary side partial voltage resonance circuit.

Also, the insulating converter transformer PIT has the structure described hereinabove with reference to FIG. 2, and the gap length of the gap G is set to approximately 2.8 mm. Consequently, the coupling coefficient k between the primary side and the secondary side is set to, for example, k=0.65 or less which indicates a loose coupling state. Actually, the coupling coefficient k was set to k=0.65.

Here, in the present embodiment, the resonance frequency fo1 of the primary side series resonance circuit and the resonance frequency fo2 of the secondary side series resonance circuit are set so as to satisfy a relationship represented by fo1<fo2

Actually, the resonance frequency fo2 of the secondary side series resonance circuit is set so as to be within approximately 1.5 times that of the resonance frequency fo1. However, in the actual power supply circuit shown in FIG. 23, the resonance frequency fo2 of the secondary side series resonance circuit is set within a range from approximately 1.4 times to approximately 1.3 times the resonance frequency fo1 of the primary side series resonance circuit. More particularly, the resonance frequency fo1 is set to a predetermined value of fo1≈70 kHz, and the resonance frequency fo2 is set to another predetermined value of fo2≈90 kHz.

Figure 24:
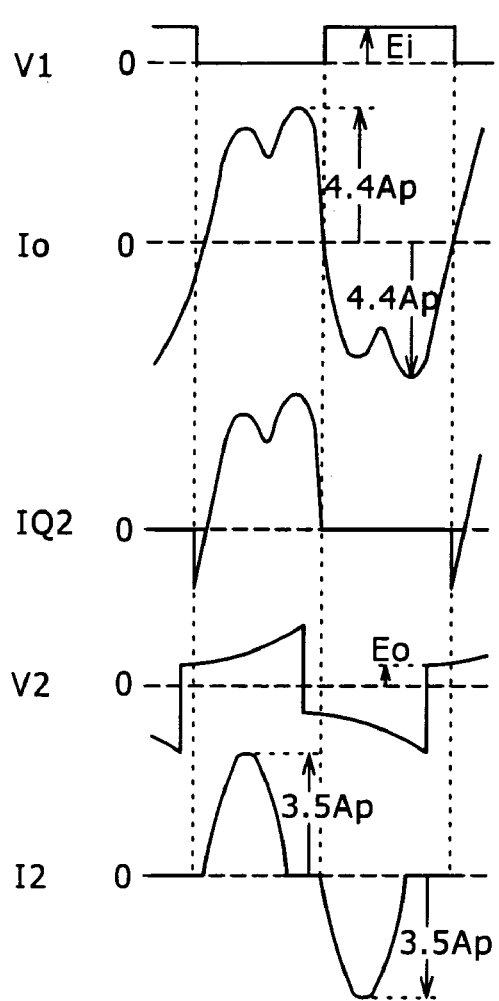
FIG. 24 is a waveform diagram illustrating the operation of several components of the power supply circuit of the fourth embodiment.
Figure 24:
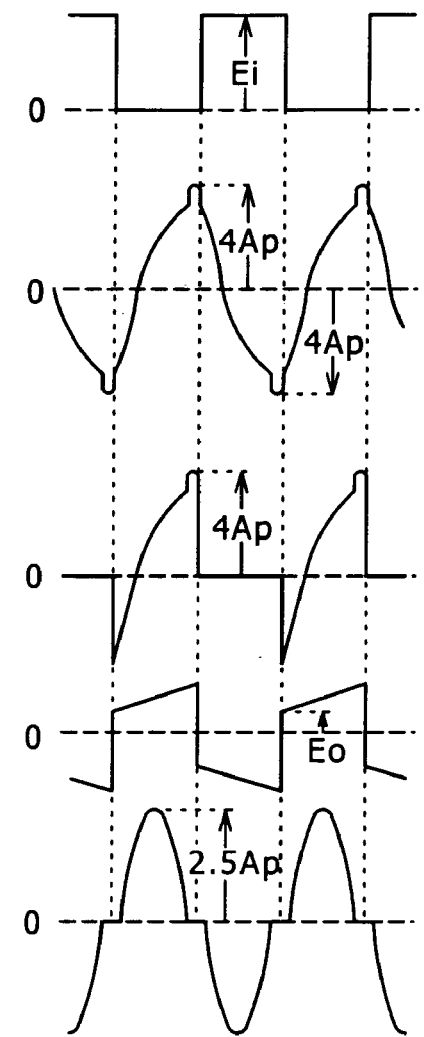
Figure 24:
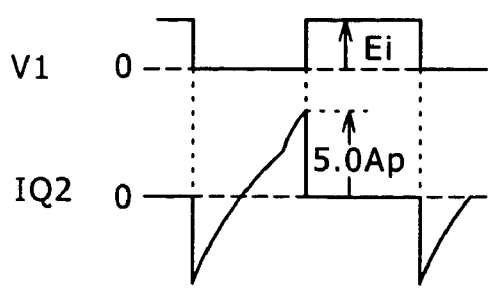
Figure 24:
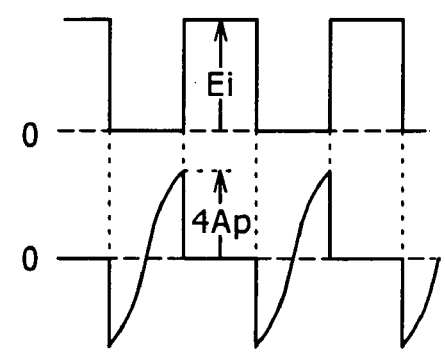
Figure 25:
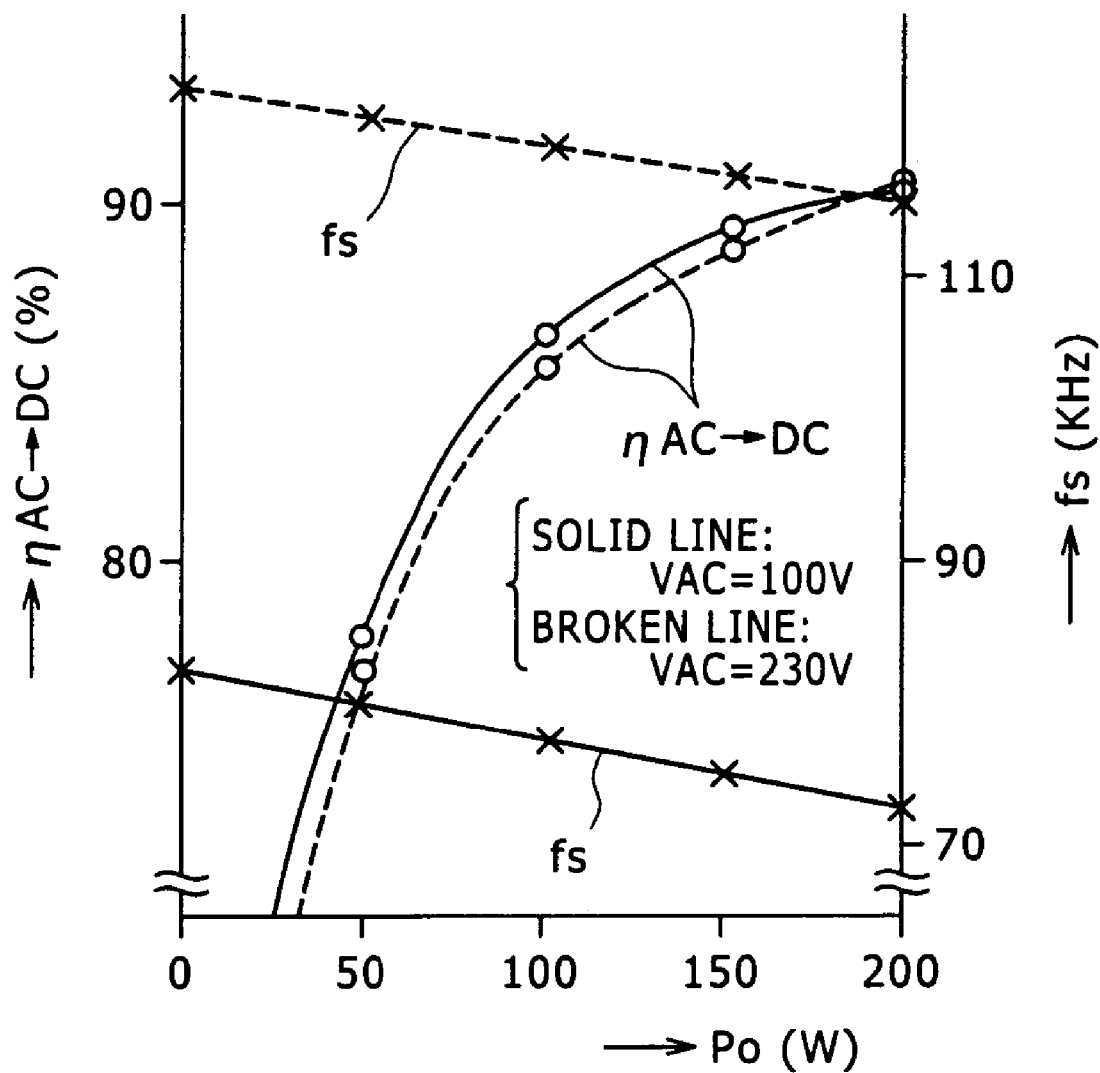
FIG. 25 is a graph illustrating the characteristics of switching frequency and AC→DC power conversion efficiency with respect to the load variation regarding the power supply circuit of the fourth embodiment.

Results of experiments conducted with the power supply circuit having the configuration described above with reference to FIG. 23 are illustrated in FIGS. 24 and 25. In the experiments, the components of the power supply circuit were set as mentioned just below.

First, as regards the insulating converter transformer PIT, the gap length of the gap G of the EER-40 type core was set to 2.8 mm, and the number of turns of the primary winding N1 and the secondary winding N2 were set to N1=30 T and N2=24 T, respectively. By the structure just described, k=0.65 was obtained as the coupling coefficient k of the insulating converter transformer PIT itself.

Further, the resonance capacitors for forming the primary side series resonance circuit, secondary side series resonance circuit, primary side partial voltage resonance circuit and secondary side partial voltage resonance circuit were selectively set in the following manner:

Primary side series resonance capacitor C1=0.047 μF
Secondary side series resonance capacitor C2=0.068 μF
(Primary side) partial resonance capacitor Cp=1,000 pF
(Secondary side) partial resonance capacitor Cp2=1,000 pF Further, the secondary side DC output voltage Eo was set to a rated level of 135 V.

The resonance frequency fo1 of the primary side series resonance circuit of fo1≈70 kHz is set from the leakage inductance L1 of the primary winding N1 obtained from the structure of the insulating converter transformer PIT described above and the capacitance of the primary side series resonance capacitor C1. On the other hand, the resonance frequency fo2 of the secondary side series resonance circuit of fo2≈90 kHz is set from the leakage inductance L2 of the secondary winding N2 obtained from the structure of the insulating converter transformer PIT described above and the capacitance of the secondary side series resonance capacitor C2.

Also, under the relationship of the resonance frequencies fo1 and fo2 described above, where the primary side series resonance circuit and the secondary side series resonance circuit are provided, a steep unimodal characteristic is obtained as a constant voltage control characteristic as described hereinabove with reference to FIGS. 5 to 7. As a result, a configuration ready for a wide range only by switching frequency control is achieved similar to the embodiments described hereinabove.

FIG. 24 illustrates the operation of several components of the power supply circuit of FIG. 23 having the configuration for a wide range described above. More particularly, FIG. 24 illustrates waveforms where the AC input voltage VAC condition/load condition are VAC=100 V (AC 100 V type)/Pomax (maximum load power)=200 W, VAC=100 V (AC 100 V type)/Pomin (minimum load power: no load)=0 W, VAC=230 V (AC 200 V type)/Pomax (maximum load power)=200 V, and VAC=230 V (AC 200 V type)/Pomin (minimum load power: no load)=0 W.

The voltage V1 of a rectangular waveform is the voltage across the switching element Q2 and indicates on/off timings of the switching element Q2.

The voltage V1 has a waveform in which it exhibits the 0 level within an on period that the switching element Q2 is conducting and is in an on state, but is clamped at the level of the rectification smoothed voltage Ei within an off period that the switching element Q2 is not conducting.

Within an on period of the switching element Q2, switching current IQ2 having the waveform illustrated in FIG. 24 flows in a switching circuit system formed from the switching element Q2 and a clamp diode DD2. Further, the switching current IQ2 exhibits the 0 level within an off period of the switching element Q2.

Further, though not shown, the voltage across the other switching element Q1 and the switching current flowing to the switching circuit (Q1, DD1) have waveforms displaced by 180° in phase from those of the voltage V1 and the switching current IQ2, respectively. In other words, the switching element Q1 and the switching element Q2 perform switching operations at the same periodic timings such that they are turned on/off alternately.

Further, the primary side series resonance current Io flowing to the primary side series resonance circuit (L1–C1) has the waveform seen in FIG. 24 because it is formed by the combination of the switching currents flowing through the switching circuits (Q1, DD1) and (Q2, DD2).

Here, although the voltage V1 indicates switching timings as described above, when the waveforms thereof when the AC input voltage VAC is 100 V and 230 V are compared with each other in the same load condition, the waveform in which the AC input voltage VAC is VAC=100 V has a longer period than that in which the AC input voltage VAC is 230 V. This indicates that the switching frequency of the primary side decreases in response to the decreasing variation of the secondary side DC output voltage Eo as the input level of the AC input voltage VAC drops, but increases in response to the increasing variation of the secondary side DC output voltage Eo as the input level of the AC input voltage VAC rises.

Further, where the voltages V1 at the maximum load power Pomax=200 W and the minimum load power Pomin=0 W in the same level condition of the AC input voltage VAC are compared with each other, the voltage V1 at the maximum load power Pomax=200 W has a period longer than that of the voltage V1 at the minimum load power Pomin=0 W. In other words, the voltage V1 indicates a variation that, when the load becomes heavier and the level of the secondary side DC output voltage Eo drops, the switching frequency becomes lower, but when the load becomes lighter and the level of the secondary side DC output voltage Eo rises, the switching frequency becomes higher.

This indicates that constant control operation according to the switching frequency control system (upper side control) is performed as the constant voltage control operation of the secondary side DC voltage against the load variation and the variation of the commercial AC power supply input level.

Further, in response to the operation (V1, IQ2, Io) of the primary side described above, an alternating voltage V2 of the waveform illustrated in FIG. 24 is induced in the secondary winding N2 of the insulating converter transformer PIT. The length of one period of the alternating voltage V2 corresponds to the switching period of the primary side.

Then, within one of two half periods of the alternating voltage V2, the rectification diodes [Do1, Do4] of the secondary side conduct and rectification current flows, but within the other of the half periods of the alternating voltage V2, the rectification diodes [Do2, Do3] of the secondary side conduct and rectification current flows. Further, the secondary winding current I2 flowing through the secondary winding N2 is obtained by the combination of the rectification currents flowing for every one half period of the alternating voltage V2, and the waveform shown in FIG. 24 is obtained.

FIG. 25 illustrates the characteristics of the power supply circuit shown in FIG. 23 and particularly illustrates the switching frequency fs and the AC→DC power conversion efficiency (ηAC→DC) with respect to the load variation from the maximum load power Pomax=200 W to the minimum load power Pomin=0 W (no load). Further, in FIG. 25, each characteristic is indicated by a solid line where it is a characteristic at the AC input voltage VAC=100 V corresponding to the AC 100 V type and by a broken line where it is a characteristic at the AC input voltage VAC=230 V corresponding to the AC 200 V type.

First, the switching frequency fs has a tendency in which it decreases as the load becomes heavier from the load power Po=0 W (minimum load power: no load) to Po=200 W (maximum load power) in both conditions of the AC input voltage VAC=100 V and the AC input voltage VAC=230 V.

Further, the variation range of the switching frequency fs with respect to the load power Po=0 to 200 W is higher at the AC input voltage VAC=230 V than at the AC input voltage VAC=100 V. In other words, from FIG. 25 it can be seen that constant voltage control against the AC input voltage variation and the load variation is performed by the switching frequency control method (upper side control).

Further, in the present embodiment, the switching frequency fs indicates a linear variation within the range of the load power Po=0 to 200 W and does not exhibit a sudden variation within the load power range lower than a fixed level as in the case of the power supply circuit of the prior art.

Then, as particular values of the switching frequency fs, it was measured that, with respect to the load power Po varied within the range of the load power Po=0 to 200 W, at the AC input voltage VAC=100 V, the switching frequency varies (necessary control range) within the range of 82.6 to 73.5 kHz, and the variation control range (necessary control range) $\Delta$ fs1 illustrated in FIG. 7 was $\Delta$ fs1=9.1 kHz (82.6–73.5 kHz). On the other hand, at the AC input voltage VAC=230 V, the necessary control range of the switching frequency fs is 123.5 to 114.9 kHz, and the variation control range (necessary control range) $\Delta$ fs2 illustrated in FIG. 7 is $\Delta$ fs2=8.6 kHz (123.5 kHz–114.9 kHz). In this manner, the necessary control ranges of the switching frequency fs for the ranges where the AC input voltage VAC is the AC 100 V type and the AC 200 V type are substantially lower than 10 kHz and are reduced significantly when compared with those of the power supply circuits in the related art (FIGS. 44 and 45). Also, the frequency difference between 123.5 kHz (VAC=230 V/Pomin=0 W), which is the maximum value of the switching frequency fs, and 73.5 kHz (VAC=100 V/Pomax=200 W), which is the minimum value of the switching frequency fs, is 50 kHz (123.5–73.5 kHz) Thus, it can be seen that, where the power supply circuit is regarded as a power supply circuit ready for a wide range, the necessary control range of the switching frequency fs is reduced significantly from that of the power supply circuits in the related art (FIGS. 44 and 45).

Further, as described hereinabove, the upper limit to the switching driving frequency of the switching element driving IC (oscillation driving circuit 2) at present is approximately 200 kHz. Accordingly, the range of the switching frequency fs from approximately 123.5 to 73.5 kHz given hereinabove can be sufficiently obtained by the switching driving IC at present. In short, the power supply circuit of the present embodiment can be ready for a wide range only by switching frequency control while the configuration of the switching driving circuit system at present is maintained because the necessary control range of the switching frequency fs is reduced to a comparatively low frequency region.

Further, while the AC→DC power conversion efficiency (ηAC→DC) has a tendency that it rises as the load becomes heavier, when the maximum load power Pomax is Pomax=200 W, the AC→DC power conversion efficiency (ηAC→DC) is 91.3% at the AC input voltage VAC=100 V and is 91.6% at the AC input voltage VAC=230 V. From this result, it can be recognized that, according to the present embodiment, a significant improvement of the AC→DC power conversion efficiency is achieved in a condition that the input level of the commercial AC power supply is high.

Further, in the present fourth embodiment, the relationship of the resonance frequency fo2 of the secondary side series resonance circuit and the resonance frequency fo1 of the primary side series resonance circuit is set such that the resonance frequency fo2 is higher. To this end, the secondary side series resonance capacitor C2 is set to a capacitance lower than a fixed level. In short, the capacitance of the secondary side series resonance capacitor C2 is set to a comparatively low value. Consequently, for example, a small part can be used as the secondary side series resonance capacitor C2, and this is advantageous in reducing the size and weight of the circuit.

However, according to FIG. 24, it can be seen that, when the AC input voltage VAC is VAC=100 V, the primary side series resonance current Io flowing to the primary side series resonance circuit sometimes exhibits a substantially M-shaped waveform in the proximity of a peak after every one half period. This arises from the fact that, since the secondary side series resonance capacitor C2 is set to a capacitance lower than a fixed level as described hereinabove, the resonance frequency fo2 of the secondary side series resonance circuit drops until the frequency difference between the resonance frequency fo1 of the primary side series resonance circuit and the resonance frequency fo2 of the secondary side series resonance circuit becomes within a fixed range.

The level of the M-shaped peak portion of the primary side series resonance current Io described hereinabove has a tendency that it increases as the capacitance of the secondary side series resonance capacitor C2 decreases (as the resonance frequency fo2 of the secondary side series resonance circuit is raised). Then, since the increase of the level of the M-shaped peak portion of the primary side series resonance current Io causes, for example, an increase of the switching loss at the switching elements Q1 and Q2, it gives rise to a drop of the power conversion efficiency. Further, since the M-shaped peak portion of the primary side series resonance current Io appears, for example, as a variation component of the secondary side DC output voltage Eo, the increase causes an expansion of the necessary control range (Δ fs) in the switching frequency control. Accordingly, the capacitance of the secondary side series resonance circuit (resonance frequency of the secondary side series resonance circuit) should be set taking into consideration that the reduction of the power conversion efficiency and the expansion of the necessary control range remain within a sufficiently permissible range for practical utilization.

Based on this, it is determined that, in the present embodiment, the resonance frequency fo2 of the secondary side series resonance circuit should remain within a range of approximately 1.5 times the resonance frequency fo1 of the primary side series resonance circuit.

Figure 26:
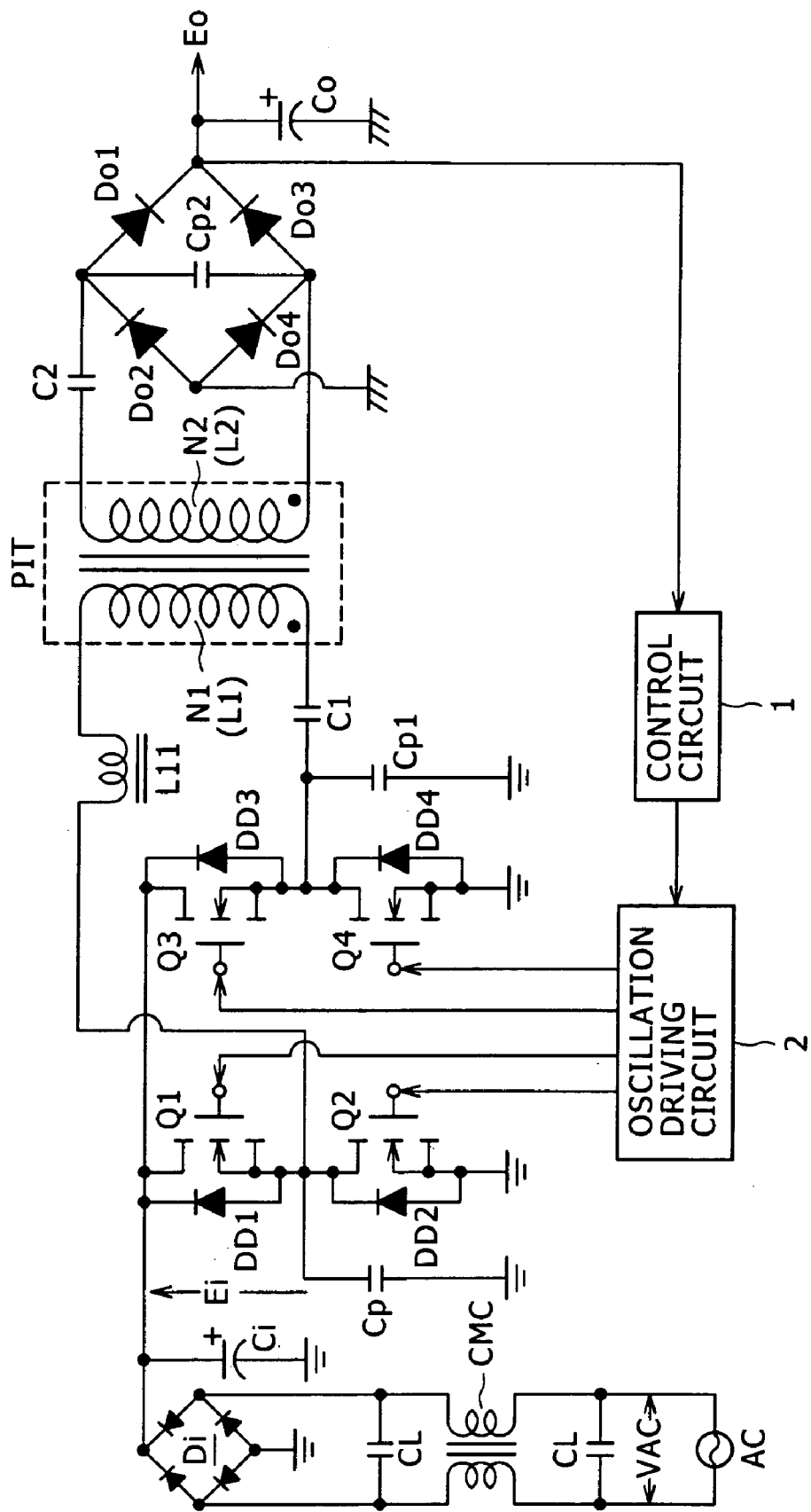
FIG. 26 is a circuit diagram showing an example of the configuration of a power supply circuit according to a first modification of the fourth and seventh embodiments.

FIG. 26 shows an example of the configuration of a power supply circuit according to a first modification of the fourth embodiment described above. The modified power supply circuit shown in FIG. 26 naturally has a basic configuration similar to that of the fourth embodiment and includes principal components selectively set similarly to those of the power supply circuit of FIG. 23. In addition, the power supply circuit of FIG. 26 has a configuration ready for a heavier load condition.

Referring to FIG. 26, in order to be ready for a heavy load condition, the power supply circuit shown includes a primary side current resonance type converter including four switching elements Q1 to Q4 connected in a full bridge connection.

In the power supply circuit of FIG. 26, the four switching elements Q1 to Q4 are driven by the oscillation driving circuit 2. The oscillation driving circuit 2 performs switching driving of the set of the switching elements [Q1, Q4] and the set of the switching elements [Q2, Q3] so as to turn on/off alternately.

In addition, in order to be ready for a heavy load condition, the power supply circuit of the present modification includes a high frequency inductor L11. The high frequency inductor L11 in this instance is inserted in series between the primary winding N1 of the insulating converter transformer PIT and the switching output point of the switching elements Q1 and Q2 as described hereinabove. In short, the high frequency inductor L11 is connected in series to the primary winding N1.

Since the high frequency inductor L11 is provided in this manner, a series connection circuit is formed from the primary winding N1, primary side series resonance capacitor C1 and high frequency inductor L11 on the primary side. Consequently, the inductance component which forms the primary side series resonance circuit is a combination of the inductance of the high frequency inductor L11 and the leakage inductance L1 of the primary winding N1, that is, L1+L11.

Further, since the high frequency inductor L11 is connected in series to the primary winding N1 in this manner, the inductance of the high frequency inductor L11 can be equivalently regarded as a leakage inductance component of the primary winding N1. Accordingly, the leakage inductance of the primary side of the insulating converter transformer PIT is given by L11+L1.

This signifies that the leakage inductance of the primary side apparently increases by the inductance component of the high frequency inductor L11. Accordingly, while the coupling coefficient of the insulating converter transformer PIT itself is represented by k, a value lower than the coupling coefficient k is obtained as a composite coupling coefficient kt of the insulating converter transformer PIT in the power supply circuit. In short, the coupling degree of the insulating converter transformer PIT in the power supply circuit is set lower than the coupling coefficient k by the structure of the insulating converter transformer PIT.

In the fourth embodiment shown in FIG. 23, the power supply circuit does not include an inductor connected in series to the primary winding N1. Therefore, the coupling coefficient of the insulating converter transformer PIT itself causes a loose coupling state of such a degree that a unimodal characteristic, as indicated by the characteristic curve 3 of FIG. 6, is obtained as the coupling degree between the primary side and the secondary side. More particularly, the coupling coefficient k of the insulating converter transformer PIT is set to a value of approximately 0.65.

In contrast, in the present embodiment, the composite coupling coefficient kt should be set to a value, for example, of 0.65 when a power supply circuit ready for a wide range with a unimodal characteristic described hereinabove is to be constructed.

Here, the composite coupling coefficient kt corresponds to the total primary side leakage inductance (L11+L1) obtained by combining the inductance of the high frequency inductor L11 and the leakage inductance L1 of the primary winding N1. Accordingly, in order to set the composite coupling coefficient kt to a value of approximately 0.65, the coupling coefficient k of the insulating converter transformer PIT itself is set to a value higher than 0.65.

In the present embodiment, when the composite coupling coefficient kt is to be set to approximately 0.65, the coupling coefficient k of the insulating converter transformer PIT itself is set to approximately 0.75. In addition, the leakage inductance for setting the composite coupling coefficient kt to approximately 0.65 is obtained from the inductance of the high frequency inductor L11.

Where the coupling coefficient k of the insulating converter transformer PIT itself is set to a value within approximately 0.65 as in the case of the fourth embodiment shown in FIG. 23, the gap G of the inner magnetic leg is set to a gap length of approximately 2.8 mm as described hereinabove with reference to FIG. 2. In contrast, where the coupling coefficient k is to be set to approximately 0.75 as in the case of the first modification to the fourth embodiment, the gap length of the gap G in a structure similar to that of FIG. 2 is set as short as, for example, approximately 1.6 mm.

Where the gap G is formed in the core of the insulating converter transformer PIT as shown in FIG. 2, eddy current is generated in the proximity of the gap G. As is well known in the art, eddy current gives rise to power loss and gives rise to a corresponding drop in the power conversion efficiency. It is known that the amount of eddy current arising from the gap G increases as the gap length increases.

Further, the dropping tendency of the AC→DC power conversion efficiency arising from the eddy current loss becomes conspicuous as the level of the AC input voltage rises. Accordingly, the power supply circuit ready for a wide range suffers from the problem that the AC→DC power conversion efficiency drops when it is used with a voltage of the AC 200 V type rather than when it is used with a voltage of the AC 100 V type.

It is to be noted, however, that the AC→DC power conversion efficiency, which includes a dropping factor by the eddy loss described above, remains within a permissible range where, for example, the maximum load power Pomax as the load condition is Pomax=150 to 200 W or less.

In the power supply circuit of the fourth embodiment described hereinabove with reference to FIG. 23, the load condition for which the power supply circuit is ready is the maximum load power Pomax=200 W. Therefore, while the power supply circuit is configured such that a loose coupling state wherein the coupling coefficient k is k=0.65 or less is set only by the insulating converter transformer PIT, the power supply circuit is sufficiently usable as a circuit ready for a wide range.

However, where the power supply circuit is to be ready for a heavier load condition of, for example, the maximum load power Pomax=200 W or more, the drop of the AC→DC power conversion efficiency becomes so conspicuous that it cannot be ignored. Therefore, it becomes difficult to set the coupling coefficient k of the insulating converter transformer PIT itself to k=0.65 or less so that the power supply circuit is a practically usable circuit ready for a wide range.

Therefore, in the first modification to the fourth embodiment, the high frequency inductor L11 is connected to the primary winding N1 so as to equivalently increase the leakage inductance of the primary winding N1 by the inductance of the high frequency inductor L11 to thereby set the composite coupling coefficient kt of the insulating converter transformer PIT in the power supply circuit to 0.65 or less.

In this instance, since the coupling coefficient k of the insulating converter transformer PIT itself can be set, for example, to k=approximately 0.75, equal to that of the power supply circuits in the related art described hereinabove, the gap length of the gap G also can be set to approximately 1.6 mm as described hereinabove. In other words, the gap length can be suppressed to a level at which the problem of an increase of the eddy current does not occur.

Consequently, with the modified power supply circuit, since the increase of the eddy current loss described hereinabove is eliminated, the drop of the AC→DC power conversion efficiency arising from the increase of the eddy current does not occur. Accordingly, where the power supply circuit is used in a heavy load condition or with a power supply of the AC 200 V type, a good AC→DC power conversion efficiency with which the power supply circuit can be used practically can be achieved.

Thus, according to the first modification of the fourth embodiment, where a configuration which includes the current resonance type converter according to the full bridge coupling system and the high frequency inductor L11 in combination is adopted, the power supply circuit can be practically ready, for example, for the maximum load power Pomax=approximately 400 W.

It is to be noted that the inductance of the high frequency inductor L11 is actually set to a predetermined value within a range such as, for example, approximately 30 μH. Further, since the inductance of the high frequency inductor L11 may be approximately several tens of μH in this manner, the high frequency inductor L11 can be formed in a small size, and the power loss by a resistance component of the high speed inductor L11 is so low that it can be almost ignored.

Figure 27:
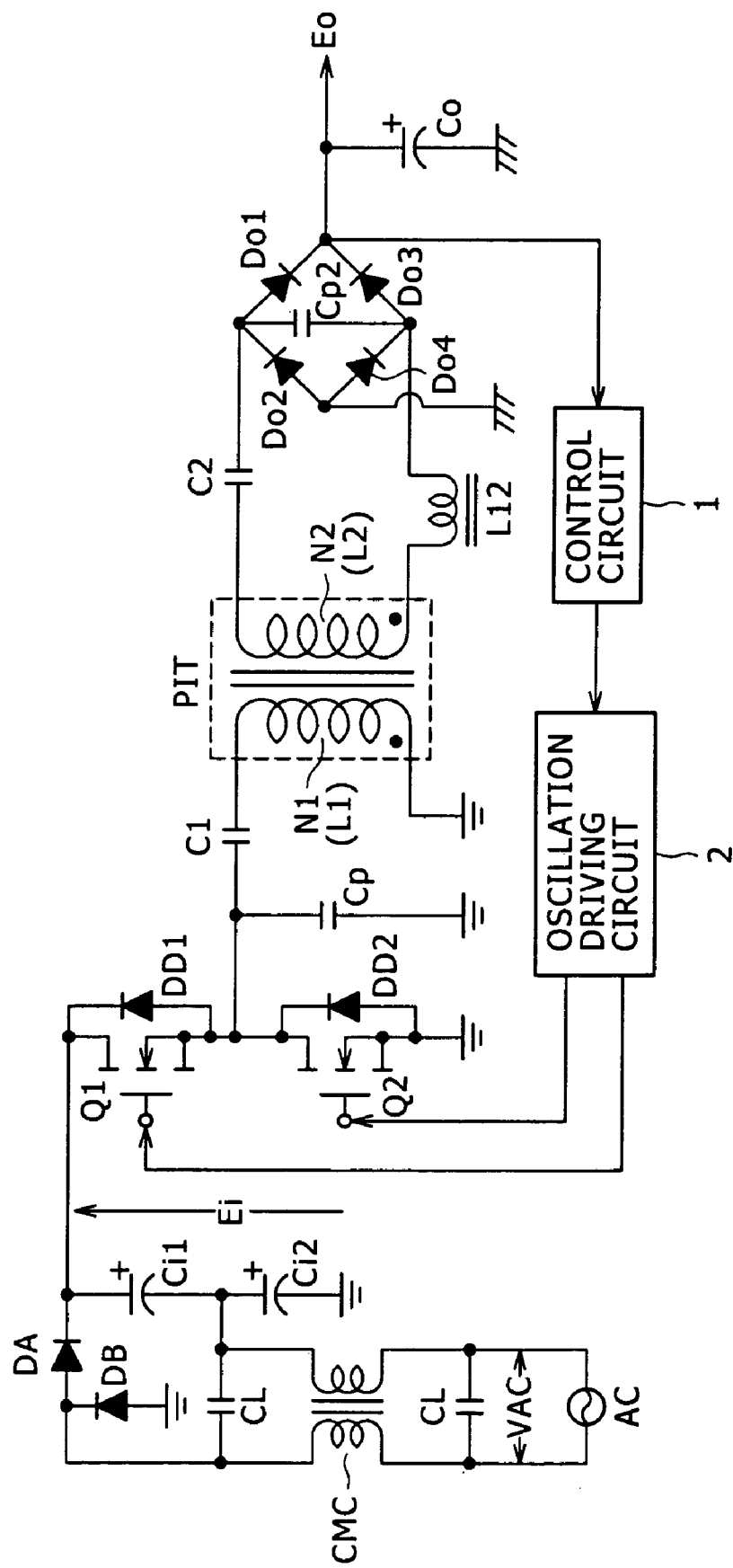
FIG. 27 is a circuit diagram showing an example of the configuration of a power supply circuit according to a second modification of the fourth and seventh embodiments.

FIG. 27 shows an example of the configuration of a power supply circuit according to a second modification to the fourth embodiment described above. The modified power supply circuit shown in FIG. 27 naturally has a basic configuration similar to that of the fourth embodiment and has a configuration ready for a heavier load condition.

Referring to FIG. 27, as a configuration ready for a heavy load, the modified power supply circuit includes, as a rectification current circuit system for receiving a commercial AC power supply AC (AC input voltage VAC) as an input thereto to produce a rectification smoothed voltage Ei (DC input voltage), a voltage doubler rectification circuit for producing a rectification smoothed voltage Ei of a level equal to twice that of the AC input voltage VAC.

While a configuration in which a rectification smoothing circuit system for producing the DC input voltage (rectification smoothed voltage Ei) is formed as a voltage doubler rectification circuit in this manner is a configuration ready for only the single range of the AC 100 V type, the advantage of enhancement of the responding performance of constant voltage control is obtained by use in the single range similar to the power supply circuits described hereinabove with reference to FIGS. 10, 16 and 22.

Further, in the power supply circuit of FIG. 27, the high frequency inductor L11 connected in series to the primary winding N1 in the first modification shown in FIG. 26 is omitted, and instead, a high frequency inductor L12 is connected in series to the secondary winding N2.

In this instance, the high frequency inductor L12 is inserted between one of the end portions of the secondary winding N2 and a node between the anode of the rectification diode Do3 and the cathode of the rectification diode Do4.

Where such a connection scheme as described above is adopted, the primary side series resonance circuit is formed from the leakage inductance L1 of the primary winding N1 and the capacitance of the primary side series resonance capacitor C1.

On the other hand, the secondary side series resonance circuit is formed from the leakage inductance L2 of the secondary winding N2, the inductance of the high frequency inductor L12 and the capacitance of the secondary side series resonance capacitor C2.

Where such a circuit configuration as described above is adopted, the apparent inductance of the secondary winding side of the insulating converter transformer PIT increases by the inductance of the high frequency inductor L12. Also, where the leakage inductance of the secondary side of the insulating converter transformer PIT increases in this manner, the composite coupling coefficient kt of the insulating converter transformer PIT decreases from the coupling coefficient k of the insulating converter transformer PIT itself.

Consequently, in order to set the composite coupling coefficient kt of the primary side and the secondary side to a value, for example, of approximately 0.65 to achieve a loose coupling state in which a unimodal characteristic as described hereinabove with reference to FIGS. 6 and 7 is obtained, the coupling coefficient k of the insulating converter transformer PIT itself may be set to k=approximately 0.75, similar to the case of, for example, the first modification of the fourth embodiment described hereinabove. In other words, the insulating converter transformer PIT itself can be set such that it has the basic structure, for example, shown in FIG. 2 and the gap length of the gap G of the inner magnetic leg is set to approximately 1.6 mm. As a result, the problem of an increase in the eddy current loss by a configuration ready for a heavy load is eliminated.

It is to be noted that, in order to obtain a configuration ready for a heavy load, the high frequency inductor L12 connected in series to the secondary winding N2 in the second modification of the fourth embodiment may be combined with the current resonance type converter of the full bridge coupling system in the second modification of the fourth embodiment. On the contrary, the high frequency inductor L11 connected in series to the primary winding N1 in the first modification of the fourth embodiment may be combined with the configuration of the primary side in the second modification of the fourth embodiment which includes a voltage doubler rectification circuit and a current resonance type converter of the half bridge coupling system.

This can be similarly applied to relationships between first and second modifications of the various embodiments hereinafter described.

Figure 28:
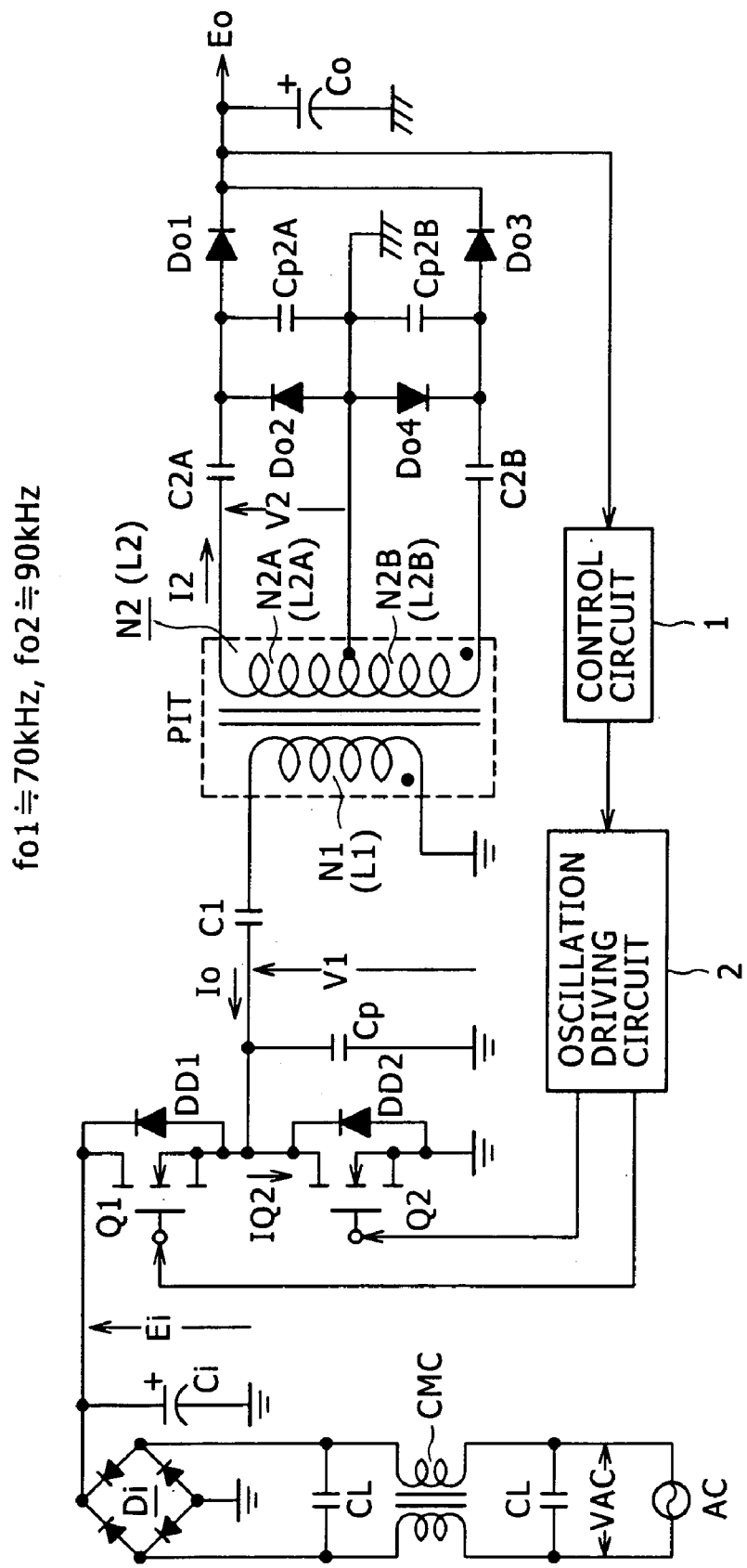
FIG. 28 is a circuit diagram showing an example of the configuration of a power supply circuit according to a fifth embodiment of the present invention.

FIG. 28 shows an example of the configuration of a power supply circuit according to a fifth embodiment of the present invention.

The power supply circuit of the fifth embodiment has a circuit configuration similar to that of FIG. 17. In particular, the power supply circuit includes a full wave rectification circuit (Di, Ci) as a rectification circuit system for producing a rectification smoothed voltage Ei (DC input voltage), and a primary side current resonance type converter which has a basic configuration as a multiple complicated resonance type converter which adopts the half bridge coupling system. Additionally, the power supply circuit includes a secondary side series resonance circuit formed from the secondary winding N2 and a secondary side resonance capacitor. Further, the power supply circuit includes a voltage doubler full wave rectification circuit as a rectification circuit connected to the secondary winding N2.

Further, in the fifth embodiment, the gap G formed in the inner magnetic leg of the core of the insulating converter transformer PIT having, for example, the structure shown in FIG. 2 is set to a gap length of approximately 2.8 mm, and the coupling coefficient k of the insulating converter transformer PIT itself is set to k=approximately 0.65 or less.

Since the power supply circuit of the fifth embodiment shown in FIG. 28 includes a voltage doubler full wave rectification circuit in this manner, where it is configured with the same specifications as those in the power supply circuit of the fourth embodiment shown in FIG. 23 in regard to the AC input voltage condition, load condition and level of the secondary side DC output voltage Eo, the number of turns of each of the secondary winding sections N2A and N2B can be set to 12 T which is ½ the number of turns of the secondary winding N2 of, for example, the power supply circuit of FIG. 23. The other components of the power supply circuit may be selectively set the same as those of the power supply circuit of the fourth embodiment with which the experimental results of FIGS. 24 and 25 were obtained.

By an appropriate component selection, the resonance frequency fo1 of the primary side series resonance circuit in the fifth embodiment is set to a predetermined value of fo1≈70 kHz and the resonance frequency fo2 of the secondary side series resonance circuit is set to another predetermined value of fo2≈90 kHz, similar to the power supply circuit of the fourth embodiment.

As a result of an experiment conducted with the power supply circuit of the fifth embodiment shown in FIG. 28, substantially similar operation waveforms to those of FIG. 24 were obtained.

Further, as a variation characteristic of the switching frequency fs with respect to the load variation, where the load power Po varies from Po=0 W to Po=200 W, the necessary control range when the AC input voltage VAC is VAC=100 is 82.3 to 74.2 kHz, and the necessary control range Δ fs1 illustrated in FIG. 7 is Δ fs1=8.1 kHz.

On the other hand, when the AC input voltage VAC is VAC=230 V, the necessary control range is 122.3 to 115.6 kHz, and the necessary control range Δ fs2 illustrated in FIG. 7 is Δ fs2=6.7 kHz. Also in the present embodiment, the necessary control range for the switching frequency fs for the individual ranges for power supplies of the AC 100 V type and the AC 200 V type is smaller than 9 kHz. Thus, the necessary control range remains sufficiently lower than 200 kHz, which is an upper limit to the switching driving frequency of a switching element driving IC (oscillation driving circuit 2) at present.

Further, as regards the AC→DC power conversion efficiency (ηAC→DC), results of ηAC→DC=91.5% at the AC input voltage VAC=100 V and ηAC→DC=91.8% at the AC input voltage VAC=230 V were obtained in the load condition of the maximum load power Pomax=200 W. From this result, it can be recognized that, with the present embodiment, an enhanced effect of the AC→DC power conversion efficiency in a condition that the input level of the commercial AC power supply is high is achieved sufficiently.

Figure 29:
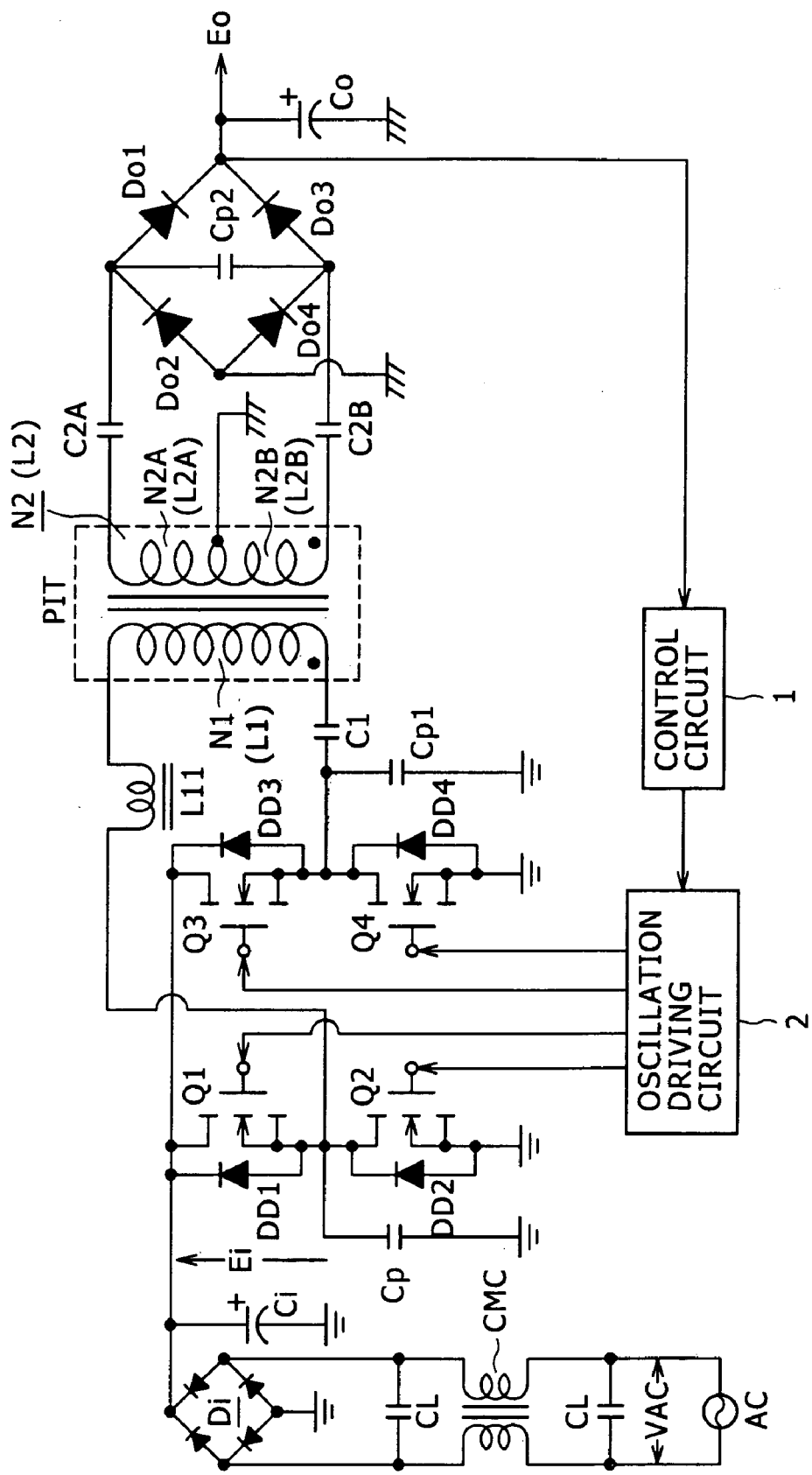
FIG. 29 is a circuit diagram showing an example of the configuration of a power supply circuit according to a first modification of the fifth and eighth embodiments.

FIG. 29 shows an example of the configuration of a power supply circuit according to a first modification of the fifth embodiment described above.

The modified power supply circuit adopts, as the configuration of the primary side and the insulating converter transformer PIT, a configuration ready for a heavy load similar to that of the power supply circuit of the first modification of the fourth embodiment described hereinabove with reference to FIG. 26. In particular, the primary side current resonance type converter has the configuration of a full bridge coupling system.

The insulating converter transformer PIT itself is configured such that, for example, the gap length of the gap G of the inner magnetic leg in the structure shown in FIG. 2 is set to approximately 1.6 mm to set the coupling coefficient k to k=approximately 0.75. Further, a high frequency inductor L11 having a predetermined inductance is inserted in a series connection with the primary winding N1 of the insulating converter transformer PIT so that the composite coupling coefficient kt of the insulating converter transformer PIT in the power supply circuit is set to approximately 0.65 or less.

Further, the circuit of FIG. 29 includes a voltage doubler full wave rectification circuit of a circuit configuration different from that of FIG. 28 as the secondary side rectification circuit.

In particular, in the voltage doubler full wave rectification circuit of the secondary side shown in FIG. 29, only one secondary side partial resonance capacitor Cp2 is provided as the secondary side partial resonance capacitor. The secondary side partial resonance capacitor Cp2 is inserted between a node between the anode of the rectification diode Do1 and the cathode of the rectification diode Do2 and another node between the anode of the rectification diode Do3 and the cathode of the rectification diode Do4.

Where such a form as described above is adopted, the secondary side partial resonance capacitor Cp2 is used as a capacitance for forming a secondary side partial voltage resonance circuit (parallel resonance circuit) in common with the first voltage doubler half wave rectification circuit and the second voltage doubler half wave rectification circuit.

In the voltage doubler full wave rectification circuit, the set of the rectification diodes Do1 and Do4 and the set of the rectification diodes Do2 and Do3 turn on/off at alternate timings. However, since the partial voltage resonance circuits are formed in such a manner as described above, a partial voltage resonance operation is obtained appropriately at timings at which the rectification diodes Do1 and Do4 are turned off and timings at which the rectification diodes Do2 and Do3 are turned off.

Figure 30:
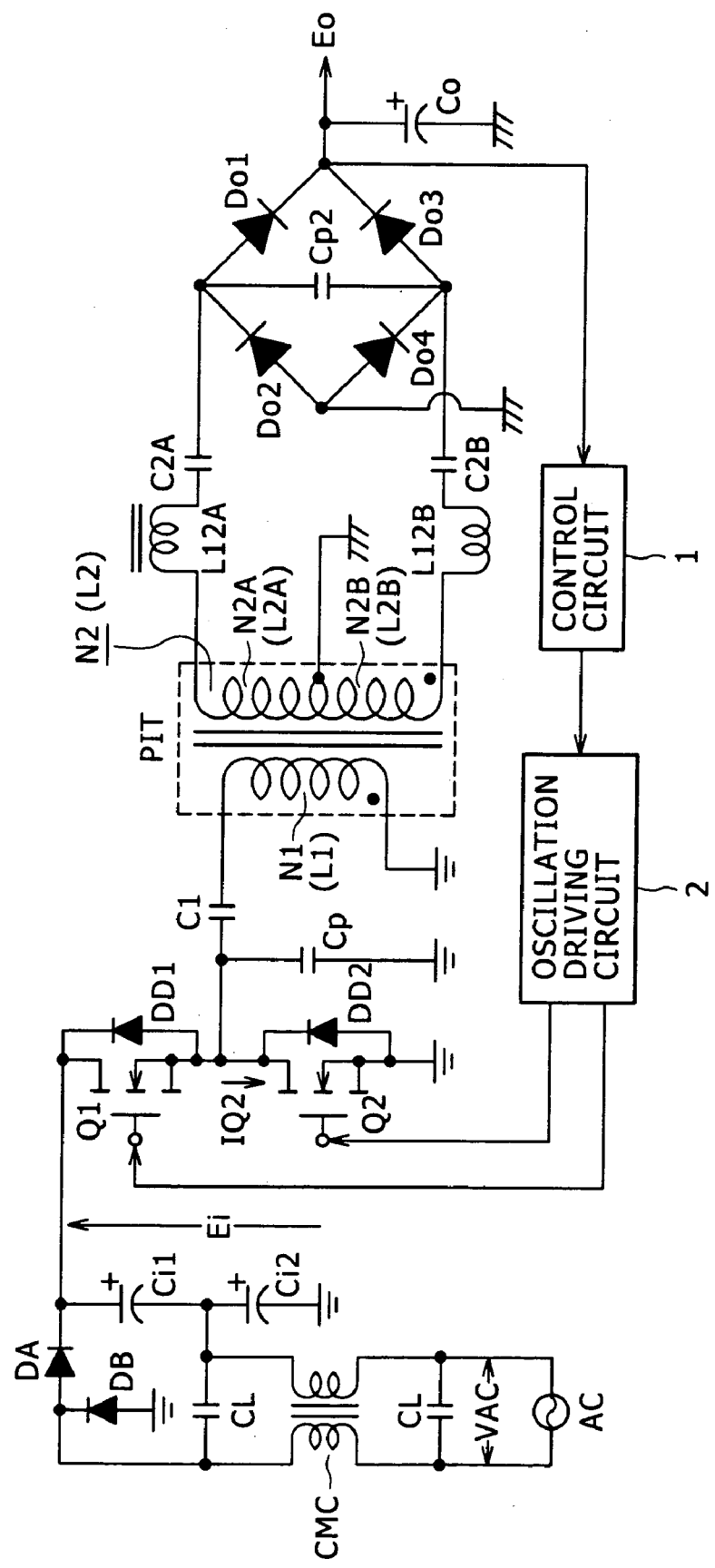
FIG. 30 is a circuit diagram showing an example of the configuration of a power supply circuit according to a second modification of the fifth and eighth embodiments.

FIG. 30 shows an example of the configuration of a power supply circuit according to a second modification of the fifth embodiment described above.

The modified power supply circuit adopts, as the configuration of the primary side and the insulating converter transformer PIT, a configuration ready for a heavy load similar to that of the power supply circuit of the second modification of the fourth embodiment described hereinabove with reference to FIG. 27. In particular, the modified power supply circuit includes a voltage doubler rectification circuit as a rectification circuit system for producing the rectification smoothed voltage Ei (DC input voltage), and the primary side current resonance type converter uses a half bridge coupling system in combination.

In order to set the composite coupling coefficient kt to kt=0.65 or less, the power supply circuit adopts a configuration similar to that of the second modification of the fourth embodiment described hereinabove with reference to FIG. 27.

In particular, the insulating converter transformer PIT itself is configured such that the gap length of the gap G of the inner magnetic leg, for example, in the structure shown in FIG. 2, is set to approximately 1.6 mm to set the coupling coefficient k to k=approximately 0.75. Further, the power supply circuit includes a high frequency inductor on the secondary side.

In this instance, since the secondary side rectification circuit is formed as a voltage doubler full wave rectification circuit similar to that in the first modification of the fifth embodiment shown in FIG. 29, as the high frequency inductor on the secondary side, actually two high frequency inductors L12A and L12B are provided individually corresponding to the first voltage doubler half wave rectification circuit and the second voltage doubler half wave rectification circuit.

The high frequency inductor L12A is inserted in series between the secondary winding section N2A and the secondary side series resonance capacitor C2A such that it has a series connection relationship to the secondary winding section N2A in the first voltage doubler half wave rectification circuit. Similarly, the high frequency inductor L12B is inserted in series between the secondary winding section N2B and the secondary side series resonance capacitor C2B such that it has a series connection relationship to the secondary winding section N2B in the second voltage doubler half wave rectification circuit.

Since the high frequency inductors L12A and L12B are provided in such a manner as described above, the apparent leakage inductance of the secondary winding sections N2A and N2B increases, and a loose coupling state wherein the composite coupling coefficient kt of the insulating converter transformer PIT is kt=approximately 0.65 or less is obtained.

It is to be noted that, with a circuit form of a voltage doubler full wave rectification circuit similar to that of FIG. 29, where the high frequency inductor L12A is inserted in series between the secondary winding section N2A and the secondary side series resonance capacitor C2A, the high frequency inductor L12A has a relationship that it is connected in series to the secondary winding section N2A in the first voltage doubler half wave rectification circuit. Similarly, where the high frequency inductor L12B is inserted in series between the secondary winding section N2B and the secondary side series resonance capacitor C2B, it has a relationship that it is connected in series to the secondary winding section N2B in the second voltage doubler half wave rectification circuit.

In the configuration described above, the secondary side partial resonance capacitor Cp2 cooperates, first in the first voltage doubler half wave rectification circuit, with the secondary side leakage inductance component of the insulating converter transformer PIT obtained by combining the leakage inductance L2A of the secondary winding section N2A and the inductance of the high frequency inductor L12A to form a partial voltage resonance circuit. Similarly, the secondary side partial resonance capacitor Cp2 cooperates, in the second voltage doubler half wave rectification circuit, with the secondary side leakage inductance component of the insulating converter transformer PIT obtained by combining the leakage inductance L2B of the secondary winding section N2B and the inductance of the high frequency inductor L12B to form another partial voltage resonance circuit.

Figure 31:
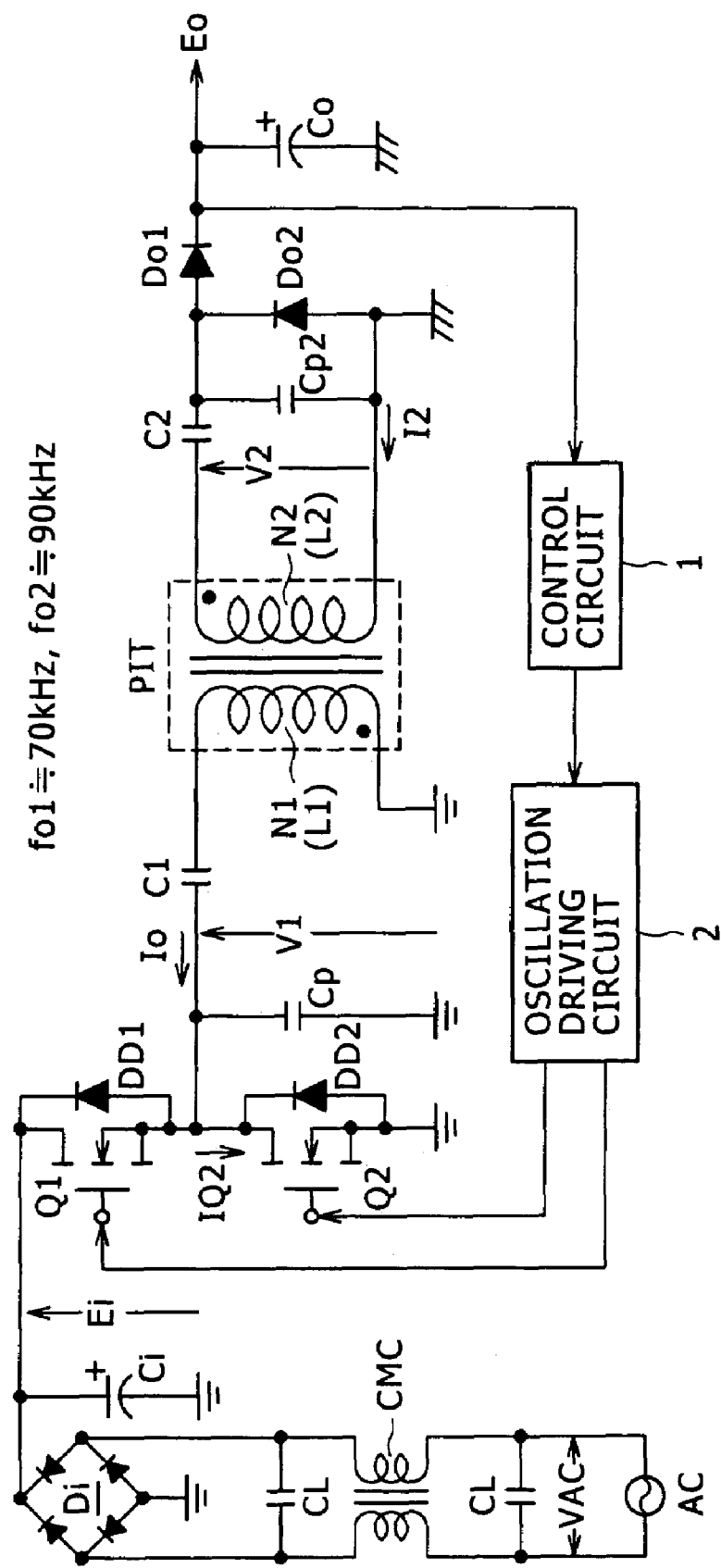
FIG. 31 is a circuit diagram showing an example of the configuration of a power supply circuit according to a sixth embodiment of the present invention.

FIG. 31 shows an example of the configuration of a power supply circuit according to a sixth embodiment of the present invention.

The power supply circuit of the sixth embodiment has a circuit configuration similar to that of FIG. 11. In particular, the power supply circuit includes a full wave rectification circuit (Di, Ci) as a rectification circuit system for producing a rectification smoothed voltage Ei (DC input voltage), and a primary side current resonance type converter which has a basic configuration as a multiple complicated resonance type converter which adopts the half bridge coupling system. Accordingly, the power supply circuit includes a secondary side series resonance circuit formed from the secondary winding N2 and a secondary side resonance capacitor. Further, the power supply circuit includes a voltage doubler half wave rectification circuit as a rectification circuit connected to the secondary winding N2.

Further, in the sixth embodiment, the gap G formed in the inner magnetic leg of the core of the insulating converter transformer PIT having, for example, the structure shown in FIG. 2, is set to a gap length of approximately 2.8 mm, and the coupling coefficient k of the insulating converter transformer PIT itself is set to k=approximately 0.65 or less.

Since the power supply circuit of the sixth embodiment shown in FIG. 31 includes the voltage doubler half wave rectification circuit in this manner, where it is configured with the same specifications as those in the power supply circuit of the fourth embodiment shown in FIG. 23 in regard to the AC input voltage condition, load condition and level of the secondary side DC output voltage Eo, the number of turns of the secondary winding N2 can be set to 12 T which is ½ the number of turns in the first embodiment and hence can be reduced, for example, from that in which the secondary side rectification circuit is an ordinary full wave rectification circuit or voltage doubler full wave rectification circuit. The other components of the power supply circuit may be selectively set the same as those of the power supply circuit of the fourth embodiment with which the experimental results of FIGS. 24 and 25 were obtained.

By an appropriate component selection, the resonance frequency fo1 of the primary side series resonance circuit in the sixth embodiment is set to a predetermined value of fo1≈70 kHz and the resonance frequency fo2 of the secondary side series resonance circuit is set to another predetermined value of fo2≈90 kHz, similar to the power supply circuits of the fourth and fifth embodiments.

As a result of an experiment conducted with the power supply circuit of the sixth embodiment shown in FIG. 31, substantially similar operation waveforms to those of FIG. 24 were obtained. It is to be noted, however, that since the secondary side performs a voltage doubler half wave rectification operation, the current I2 (rectification current) flowing to the secondary winding N2 has a substantially doubled peak level.

Further, as a variation characteristic of the switching frequency fs with respect to the load variation, where the load power Po varies from Po=0 W to Po=200 W, the necessary control range when the AC input voltage VAC is VAC=100 is 82.0 to 72.4 kHz, and the necessary control range Δ fs1 illustrated in FIG. 7 is Δ fs1=9.6 kHz.

On the other hand, when the AC input voltage VAC is VAC=230 V, the necessary control range is from 122.1 to 113.0 kHz, and the necessary control range Δ fs2 illustrated in FIG. 7 is Δ fs2=9.1 kHz. Also in the present embodiment, the necessary control range for the switching frequency fs for the individual ranges for power supplies of the AC 100 V type and the AC 200 V type is smaller than 10 kHz. Thus, the necessary control range remains sufficiently lower than 200 kHz, which is an upper limit to the switching driving frequency of a switching element driving IC (oscillation driving circuit 2) at present.

Further, as regards the AC→DC power conversion efficiency (η AC→DC), results of η AC→DC=91.1% at the AC input voltage VAC=100 V and η AC→DC=91.3% at the AC input voltage VAC=230 V were obtained in the load condition of the maximum load power Pomax=200 W. From this result, it can be recognized that, with the present embodiment, an improvement in the AC→DC power conversion efficiency is achieved in a condition in which the input level of the commercial AC power supply is high.

Figure 32:
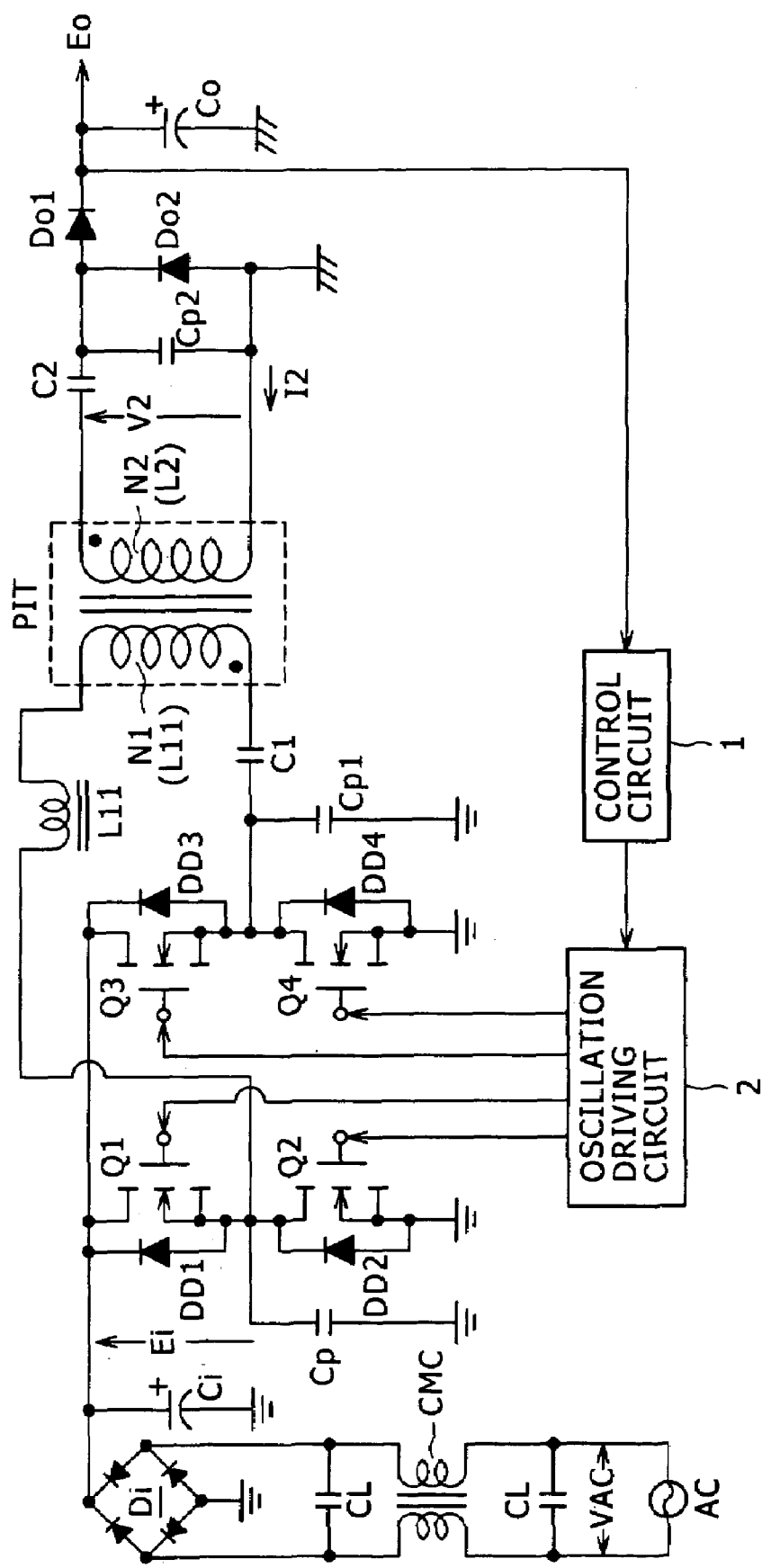
FIG. 32 is a circuit diagram showing an example of the configuration of a power supply circuit according to a first modification of the sixth and ninth embodiments.

FIG. 32 shows an example of the configuration of a power supply circuit according to a first modification of the sixth embodiment described above.

The modified power supply circuit adopts, as the configuration of the primary side and the insulating converter transformer PIT, a configuration ready for a heavy load similar to that of the power supply circuit of the first modification of the second and fourth embodiments described hereinabove with reference to FIGS. 26 and 29 and so forth. In particular, the primary side current resonance type converter has the configuration of a full bridge coupling system.

Further, the secondary side of the insulating converter transformer PIT includes a voltage doubler half wave rectification circuit similar to that in the sixth embodiment shown in FIG. 31.

Figure 33:
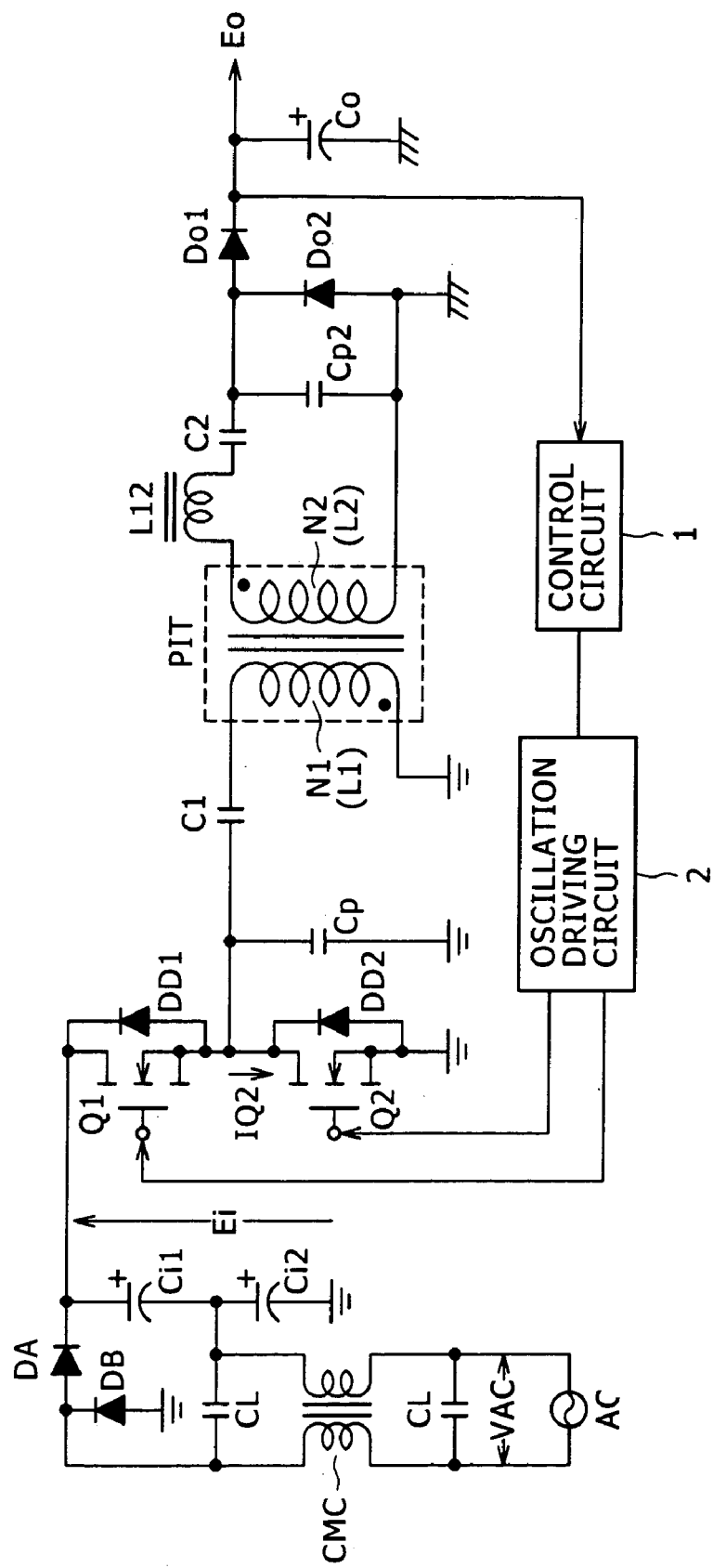
FIG. 33 is a circuit diagram showing an example of the configuration of a power supply circuit according to a second modification of the sixth and ninth embodiments.

FIG. 33 shows an example of the configuration of a power supply circuit according to a second modification of the sixth embodiment described above.

The modified power supply circuit adopts, as the configuration of the primary side and the insulating converter transformer PIT, a configuration ready for a heavy load similar to that of the power supply circuit of the second modification of the fourth embodiment described hereinabove with reference to FIG. 27. In particular, the modified power supply circuit includes a voltage doubler rectification circuit as a rectification circuit system for producing the rectification smoothed voltage Ei (DC input voltage), and uses a primary side current resonance type converter of a half bridge coupling system in combination.

In this instance, in order to set the composite coupling coefficient kt to kt=0.65 or less, the insulating converter transformer PIT itself is configured, similarly to the second modification to the fourth embodiment described hereinabove with reference to FIG. 27, such that the gap G of the inner magnetic leg of the core thereof, for example, in the structure shown in FIG. 2, is set to a gap length of approximately 1.6 mm to set the coupling coefficient k=approximately 0.75 or less. Additionally, the secondary side includes the high frequency inductor L12.

In this instance, the secondary side rectification circuit is formed as a voltage doubler half wave rectification circuit similar to that shown in FIG. 31. In the voltage doubler half wave rectification circuit, the high frequency inductor L12 can be inserted in series between one end of the secondary winding N2 and the secondary side series resonance capacitor C2 in the manner shown in FIG. 33. Where the high frequency inductor L12 is inserted in this manner, the apparent leakage inductance of the secondary winding N2 increases, and a loose coupling state wherein the composite coupling coefficient kt of the insulating converter transformer PIT is kt=approximately 0.65 or less is obtained.

It is to be noted that, according to the first and second modifications of the fifth and sixth embodiments described above which have a configuration ready for a heavy load, a power supply circuit which can be practically used for the maximum load power Pomax of, for example, Pomax=approximately 400 W can be obtained similar to the first and second modifications of the first embodiment.

Figure 34:
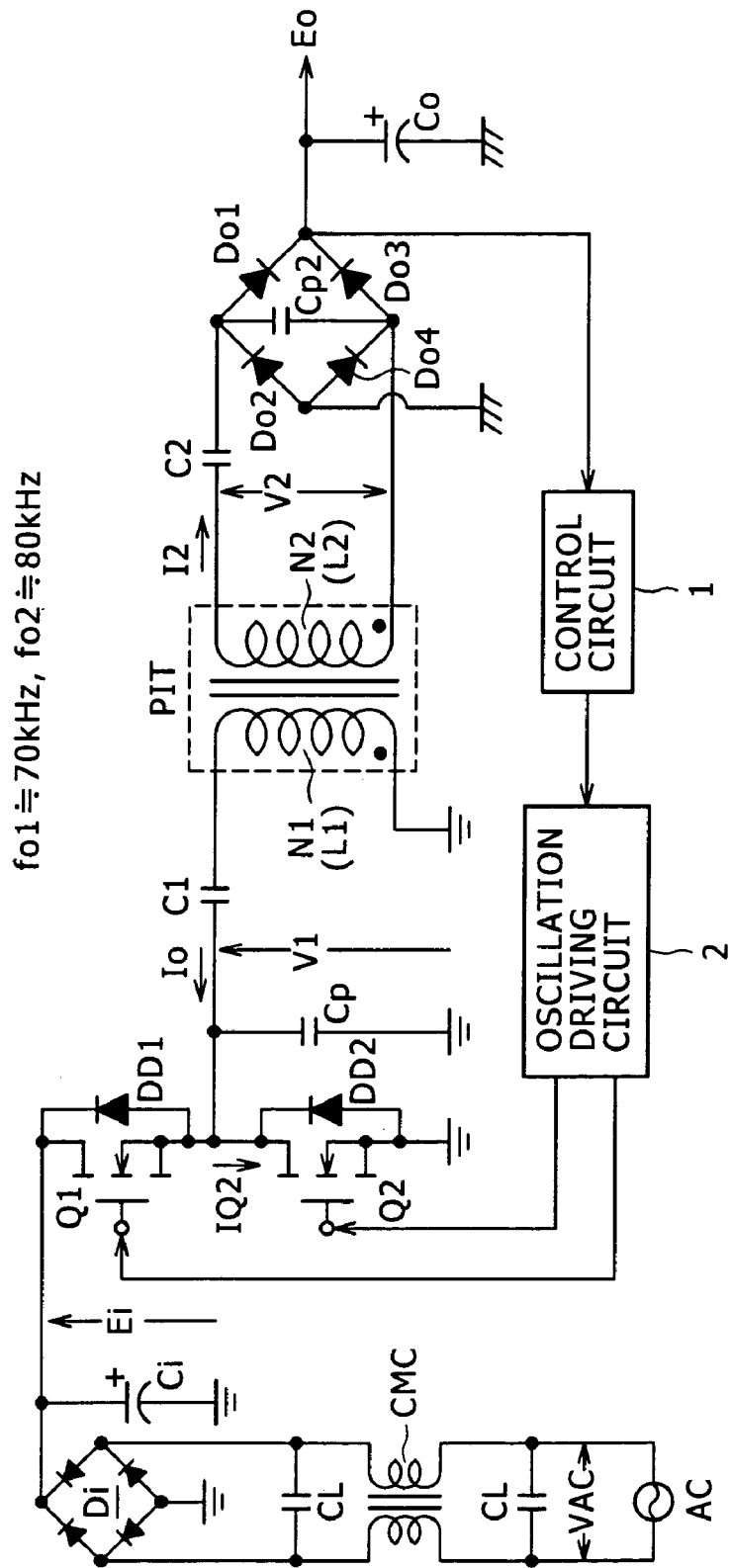
FIG. 34 is a circuit diagram showing an example of the configuration of a power supply circuit according to a seventh embodiment of the present invention.

FIG. 34 shows an example of the configuration of a switching power supply circuit according to a seventh embodiment of the present invention.

The power supply circuit of the seventh embodiment has a configuration ready for a wide range wherein it operates in response to commercial AC power supplies of both the AC 100 V type and the AC 200 V type. Further, the power supply circuit is ready for a range of variation of the load power Po, for example, from Po=approximately 150 W to Po=0 W (no load).

The circuit configuration itself of the power supply circuit shown in FIG. 34 is a multiple (composite) resonance type converter similar to that shown in FIGS. 1, 23 and so forth. In particular, the primary side includes the combination of a partial voltage resonance circuit with a separately excited current resonance type converter according to the half bridge coupling system. Meanwhile, the secondary side includes a secondary side series resonance capacitor C2 connected in series to a secondary winding N2 to form a secondary side series resonance circuit, and includes a bridge full wave rectification circuit as a secondary side rectification circuit. Further, the secondary side also includes a secondary side partial resonance capacitor Cp2 which forms a secondary side partial voltage resonance circuit.

The insulating converter transformer PIT has a structure described hereinabove with reference to FIG. 2, and the gap length of the gap G is set to approximately 2.8 mm. Consequently, the coupling coefficient k between the primary side and the secondary side is set to, for example, k=0.65 or less which indicates a loose coupling state. Actually, the coupling coefficient k was set to k=0.65.

Here, in the present embodiment, the relationship between the resonance frequency fo1 of the primary side series resonance circuit and the resonance frequency fo2 of the secondary side series resonance circuit is set in the following manner.

In particular, where the resonance frequency fo1 of the primary side series resonance circuit is considered as a reference, the resonance frequency fo2 of the secondary side series resonance circuit is represented by $$fo2 = fo1 \times n \quad (9)$$

In addition, the coefficient (magnification value) n in the expression (9) above has a value greater than a predetermined minimum value a (which is smaller than 1), but smaller than a predetermined maximum value b which is greater than 1 and hence is given by $$a < n < b \ (a < 1, b > 1) \quad (10)$$

In other words, the resonance frequency fo2 is set within a frequency range between a frequency (lower limit frequency) represented by the resonance frequency fo1×a and another frequency (upper limit frequency) represented by the resonance frequency fo1×b.

In the present embodiment, the minimum value a is set to approximately 0.9, and the maximum value b is set to approximately 1.1 to 1.2. More particularly, the resonance frequency fo1 of the primary side series resonance circuit is set to a predetermined value of fo1≈70 kHz, and the resonance frequency fo2 of the secondary side series resonance circuit is set to another predetermined value of $$fo2 \approx 80 \text{ kHz}.$$

Figure 35:
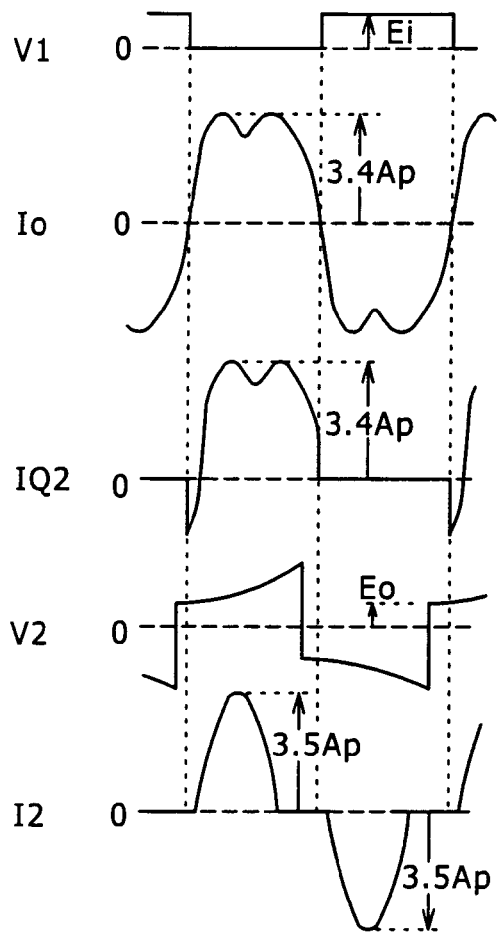
FIG. 35 is a waveform diagram illustrating the operation of several components of the power supply circuit of the seventh embodiment.
Figure 35:
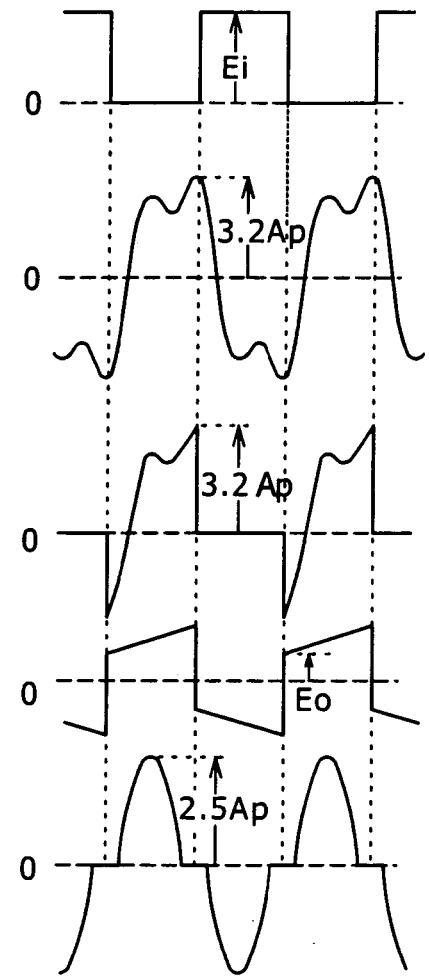
Figure 35:
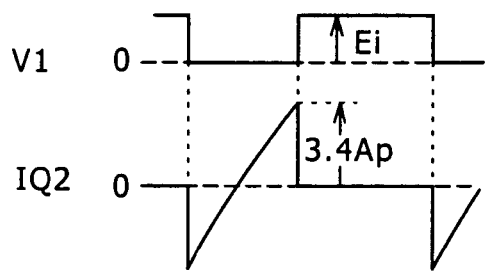
Figure 35:
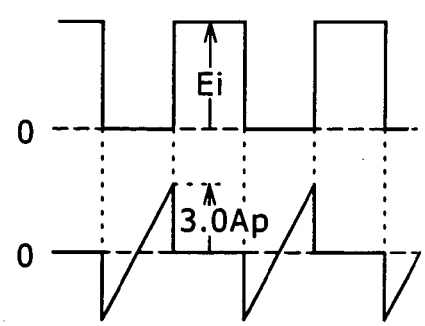
Figure 36:
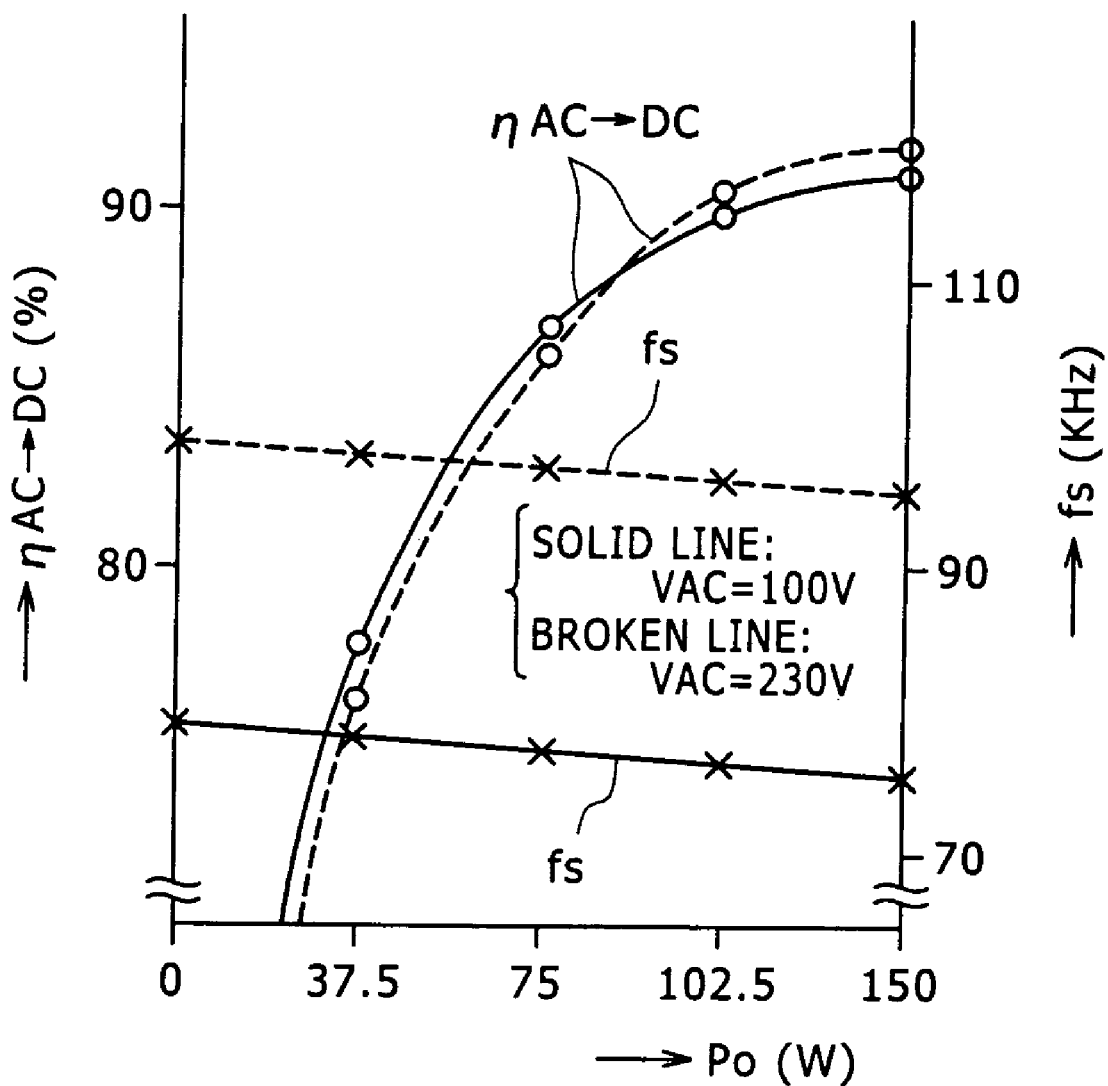
FIG. 36 is a graph illustrating the characteristics of switching frequency and AC→DC power conversion efficiency with respect to the load variation regarding the power supply circuit of the seventh embodiment.

Results of experiments conducted with a power supply circuit having the configuration described above with reference to FIG. 34 are illustrated in FIGS. 35 and 36. In the experiments, the components of the power supply circuit shown in FIG. 34 were set in the following manner.

First, as regards the insulating converter transformer PIT, an EER-35 type core was used as the EE type core and the gap length of the gap G of the core was set to 2.8 mm, and the number of turns of the primary winding N1 and the secondary winding N2 was set to N1=30 T and N2=24 T, respectively. By the structure just described, k=0.65 was obtained as the coupling coefficient k of the insulating converter transformer PIT itself.

Further, the resonance capacitors for forming the primary side series resonance circuit, secondary side series resonance circuit, primary side partial voltage resonance circuit and secondary side partial voltage resonance circuit were selectively set in the following manner:

Primary side series resonance capacitor C1=0.033 µF
Secondary side series resonance capacitor C2=0.068 µF
(Primary side) partial resonance capacitor Cp=1,000 pF
(Secondary side) partial resonance capacitor Cp2=1,000 pF Further, the secondary side DC output voltage Eo was set to a rated level of 135 V.

The resonance frequency fo1 of the primary side series resonance circuit of fo1≈70 kHz is set from the leakage inductance L1 of the primary winding N1 obtained from the structure of the insulating converter transformer PIT described above and the capacitance of the primary side series resonance capacitor C1. On the other hand, the resonance frequency fo2 of the secondary side series resonance circuit of fo2≈80 kHz is set from the leakage inductance L2 of the secondary winding N2 obtained from the structure of the insulating converter transformer PIT described above and the capacitance of the secondary side series resonance capacitor C2.

Also, under the relationship of the resonance frequencies fo1 and fo2 described above, where the primary side series resonance circuit and the secondary side series resonance circuit are provided, a steep unimodal characteristic is obtained as a constant voltage control characteristic as described hereinabove with reference to FIGS. 5 to 7. As a result, a configuration ready for a wide range only by switching frequency control is achieved similar to the embodiments described hereinabove.

FIG. 35 illustrates the operation of several components of the power supply circuit of FIG. 34 having the configuration for a wide range described above. More particularly, FIG. 35 illustrates waveforms in which the AC input voltage VAC condition/load condition are VAC=100 V (AC 100 V type)/Pomax (maximum load power)=150 W, VAC=100 V (AC 100 V type)/Pomin (minimum load power: no load)=0 W, VAC=230 V (AC 200 V type)/Pomax (maximum load power)=150 W, and VAC=230 V (AC 200 V type)/Pomin (minimum load power: no load)=0 W.

The voltage V1 of a rectangular waveform is the voltage across the switching element Q2 and indicates on/off timings of the switching element Q2.

The voltage V1 has a waveform in which it exhibits the 0 level within an on period in which the switching element Q2 is conducting and is in an on state, but is clamped at the level of the rectification smoothed voltage Ei within an off period in which the switching element Q2 is not conducting.

Within an on period of the switching element Q2, switching current IQ2 having the waveform illustrated in FIG. 35 flows in a switching circuit system formed from the switching element Q2 and a clamp diode DD2. Further, the switching current IQ2 exhibits the 0 level within an off period of the switching element Q2.

Further, though not shown, the voltage across the other switching element Q1 and the switching current flowing to the switching circuit (Q1, DD1) have waveforms displaced by 180° in phase from those of the voltage V1 and the switching element Q2, respectively. In other words, the switching element Q1 and the switching element Q2 perform switching operations at the same periodic timings such that they are turned on/off alternately.

Further, the primary side series resonance current Io flowing to the primary side series resonance circuit (L1–C1) has the waveform shown in FIG. 35 because it is formed by the combination of the switching currents flowing through the switching circuits (Q1, DD1) and (Q2, DD2).

Here, although the voltage V1 indicates switching timings as described above, where the waveforms thereof when the AC input voltage VAC is 100 V and 230 V are compared with each other in the same load condition, the waveform in which the AC input voltage VAC is VAC=100 V has a period longer than that in which the AC input voltage VAC is 230 V. This indicates that the switching frequency of the primary side decreases in response to the decreasing variation of the secondary side DC output voltage Eo as the input level of the commercial AC input voltage VAC drops, but increases in response to the increasing variation of the secondary side DC output voltage Eo as the input level of the commercial AC input voltage VAC rises.

Further, where the voltages V1 at the maximum load power Pomax=150 W and the minimum load power Pomin=0 W in the same level condition of the AC input voltage VAC are compared with each other, the voltage V1 at the maximum load power Pomax=150 W has a period longer than that of the voltage V1 at the minimum load power Pomin=0 W. In other words, the voltage V1 indicates a variation in which, when the load increases and the level of the secondary side DC output voltage Eo drops, the switching frequency decreases, but when the load decreases and the level of the secondary side DC output voltage Eo rises, the switching frequency increases.

This indicates that a constant control operation according to the switching frequency control system (upper side control) is performed as a constant voltage control operation of the secondary side DC voltage against the load variation and the variation of the commercial AC power supply input level.

Further, in response to the operation (V1, IQ2, Io) of the primary side described above, an alternating voltage V2 of the waveform illustrated in FIG. 35 is induced in the secondary winding N2 of the insulating converter transformer PIT. The length of one period of the alternating voltage V2 corresponds to the switching period of the primary side.

Then, within one of two half periods of the alternating voltage V2, the rectification diodes [Do1, Do4] of the secondary side conduct and rectification current flows, but within the other half period of the alternating voltage V2, the rectification diodes [Do2, Do3] of the secondary side conduct and rectification current flows. Further, the secondary winding current I2 flowing through the secondary winding N2 is obtained by the combination of the rectification currents flowing for every one half period of the alternating voltage V2, and the waveform shown in FIG. 35 is obtained.

FIG. 36 illustrates the characteristics of the power supply circuit shown in FIG. 34 and particularly illustrates the switching frequency fs and the AC→DC power conversion efficiency (η AC→DC) with respect to the load variation from the maximum load power Pomax=150 W to the minimum load power Pomin=0 W (no load). Further, in FIG. 36, each characteristic is indicated by a solid line where it is a characteristic at the AC input voltage VAC=100 V corresponding to the AC 100 V type, and by a broken line where it is a characteristic at the AC input voltage VAC=230 V corresponding to the AC 200 V type.

First, the switching frequency fs has a tendency in which it decreases as the load becomes heavier from the load power Po=0 W (minimum load power: no load) to Po=150 W (maximum load power) in both conditions of the AC input voltage VAC=100 V and the AC input voltage VAC=230 V.

Further, the variation range of the switching frequency fs with respect to the load power Po=0 to 150 W is higher at the AC input voltage VAC=230 V than at the AC input voltage VAC=100 V. In other words, also from FIG. 36, it can be seen that constant voltage control against the AC input voltage variation and the load variation is performed by the switching frequency control method (upper side control).

Further, in the present embodiment, the switching frequency fs indicates a linear variation within the range of the load power Po=0 to 150 W and does not exhibit a sudden variation within the load power range lower than a fixed level as in the case of the power supply circuit of the related art.

As particular values of the switching frequency fs, it was measured that, with respect to the load power Po varied within the range of the load power Po=0 to 150 W, at the AC input voltage VAC=100 V, the switching frequency varies (necessary control range) within the range of 78.3 to 75.0 kHz, and the variation control range (necessary control range) Δ fs1 illustrated in FIG. 7 is Δ fs1=3.3 kHz (78.3–75.0 kHz). On the other hand, at the AC input voltage VAC=230 V, the necessary control range of the switching frequency fs is 94.8 to 90.7 kHz, and the variation control range (necessary control range) Δ fs2 illustrated in FIG. 7 is Δ fs2=4.1 kHz (94.8 kHz–90.7 kHz). In this manner, the necessary control ranges of the switching frequency fs for the ranges where the AC input voltage VAC is the AC 100 V type and the AC 200 V type are substantially lower than 5 kHz and are reduced significantly when compared with those of the related art power supply circuits (FIGS. 44 and 45). Also, the frequency difference between 94.8 kHz (VAC=230 V/Pomin=0 W) which is the maximum value of the switching frequency fs and 75.0 kHz (VAC=100 V/Pomax=150 W) which is the minimum value of the switching frequency fs is 19.8 kHz (94.8–75.0 kHz). Thus, it can be seen that, where the power supply circuit is regarded as a power supply circuit ready for a wide range, the necessary control range of the switching frequency fs is reduced significantly from that of the related art power supply circuits and (FIGS. 44 and 45) is very small.

Further, according to the foregoing description, the range of the switching frequency fs is from approximately 94.8 to 75.0 kHz. Accordingly, the range of the switching frequency fs remains sufficiently within the approximately 200 kHz upper limit to the switching driving frequency of a switching driving IC (oscillation driving circuit 2) at present. In short, the power supply circuit of the present embodiment can be ready for a wide range only by switching frequency control while the configuration of the switching driving circuit system at present is maintained.

Further, while the AC→DC power conversion efficiency (η AC→DC) has a tendency that it rises as the load becomes heavier, when the maximum load power Pomax is Pomax=150 W, the AC→DC power conversion efficiency (η AC→DC) is 91.9% at the AC input voltage VAC=100 V and is 92.4% at the AC input voltage VAC=230 V. From this result, it can be recognized that, according to the present embodiment, a sufficient improvement of the AC→DC power conversion efficiency is achieved in a condition in which the input level of the commercial AC power supply is high.

Incidentally, according to FIG. 35, it can be seen that, when the AC input voltage VAC is VAC=100 V, the primary side series resonance current Io flowing to the primary side series resonance circuit sometimes exhibits a substantially M-shaped waveform in the proximity of a peak after every one half period and presents two peaks. This arises from the fact that the frequency difference between the resonance frequency fo1 of the primary side series resonance circuit and the resonance frequency fo2 of the secondary side series resonance circuit is within a fixed range.

The level of the M-shaped peak portion of the primary side series resonance current Io described above has a tendency that, in a relationship in which the resonance frequency fo1 is higher than the resonance frequency fo2, the preceding peak portion has a level higher than that of the succeeding peak portion. On the contrary, in another relationship in which the resonance frequency fo1 is lower than the resonance frequency fo2, the level of the M-shaped peak portion has a tendency that the preceding peak portion has a level lower than that of the succeeding peak portion.

Since such a difference between the levels of the two peak waveforms as described above gives rise to an increase of the peak level, it causes an increase in, for example, the switching loss and hence gives rise to a drop in the power conversion efficiency. Further, since the M-shaped peak portion of the primary side series resonance current Io appears, for example, as a variation component of the secondary side DC output voltage Eo, the increase causes a factor of expansion of the necessary control range ($\Delta$ fs) in the switching frequency control.

An experiment for investigating the relationship between the settings of the resonance frequencies fo1 and fo2 and the M-shaped peak waveform of the primary side series resonance current Io was conducted, and the following fact was obtained through the experiment. In particular, where the resonance frequency fo2 is controlled to a value equal to substantially 0.9 times to substantially 1.1 to 1.2 times the resonance frequency fo1, the two peaks of the M-shaped waveform of the primary side series resonance current Io have a substantially equal level and exhibit no difference therebetween, and where the frequency difference between the resonance frequencies fo1 and fo2 becomes greater, the difference becomes so conspicuous that it cannot be ignored.

According to the present embodiment, the relationship between the resonance frequency fo1 and the resonance frequency fo2 is set based on the fact confirmed as described above so that the two peaks of the M-shaped waveform of the primary side series resonance current Io may be equal to each other to achieve enhancement of the power conversion efficiency and suppression of an increase of the necessary control range.

Further, in the present embodiment, the resonance frequency fo2 is set to a frequency as high as possible within the frequency range from approximately 0.9 times to approximately 1.1 to 1.2 times the resonance frequency fo1.

Therefore, the secondary side series resonance capacitor C2 which forms the secondary side series resonance circuit is set to the highest capacitance within a range of the capacitance set in accordance with the resonance frequency fo2 which is within the frequency range from approximately 0.9 times to approximately 1.1 to 1.2 times the resonance frequency fo1. This makes it possible to selectively use a less expensive part of a minimized size (for example, a film capacitor) as the actual secondary side series resonance capacitor C2 to thereby achieve a reduction in the cost and weight of the circuitry.

A first modification of the seventh embodiment described above is now described. The first modification of the seventh embodiment has a basic configuration similar to that of the seventh embodiment shown in FIG. 34, but has a configuration ready for a heavier load condition.

The first modification of the seventh embodiment has a configuration similar to that of FIG. 26. However, the resonance frequency fo1 of the primary side series resonance circuit is set to fo1$\approx$70 kHz, which is the same as that of the power supply circuit of FIG. 34, by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2$\approx$80 kHz, which is the same as that of the power supply circuit of FIG. 34, by setting the leakage inductance L2 of the secondary winding N2 in correspondence to the composite coupling coefficient kt and the capacitance of the secondary side series resonance capacitor C2.

If the first modification of the seventh embodiment is actually configured such that it includes a combination of a current resonance type converter of the full bridge connection type and a high frequency inductor L11 as seen in FIG. 26, for example, a power supply circuit which can be ready for a maximum load power Pomax=approximately 300 W can be obtained in practical use.

Now, a second modification of the seventh embodiment described above is described. The second modification of the seventh embodiment also has a basic configuration similar to that of the seventh embodiment shown in FIG. 34, but has a configuration ready for a heavier load condition.

The second modification of the seventh embodiment has a configuration similar to that of FIG. 27 However, also in this instance, the resonance frequencies fo1 and fo2 are set in a similar manner as in the first modification of the seventh embodiment described above. In particular, the resonance frequency fo1 of the primary side series resonance circuit is set to fo1$\approx$70 kHz by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2$\approx$80 kHz by setting the leakage inductance L2 of the secondary winding N2 in correspondence to the composite coupling coefficient kt and the capacitance of the secondary side series resonance capacitor C2.

Where the second modification of the seventh embodiment is actually configured as seen in FIG. 27, a power supply circuit which can be ready for a maximum load power Pomax=approximately 300 W can be obtained.

Figure 37:
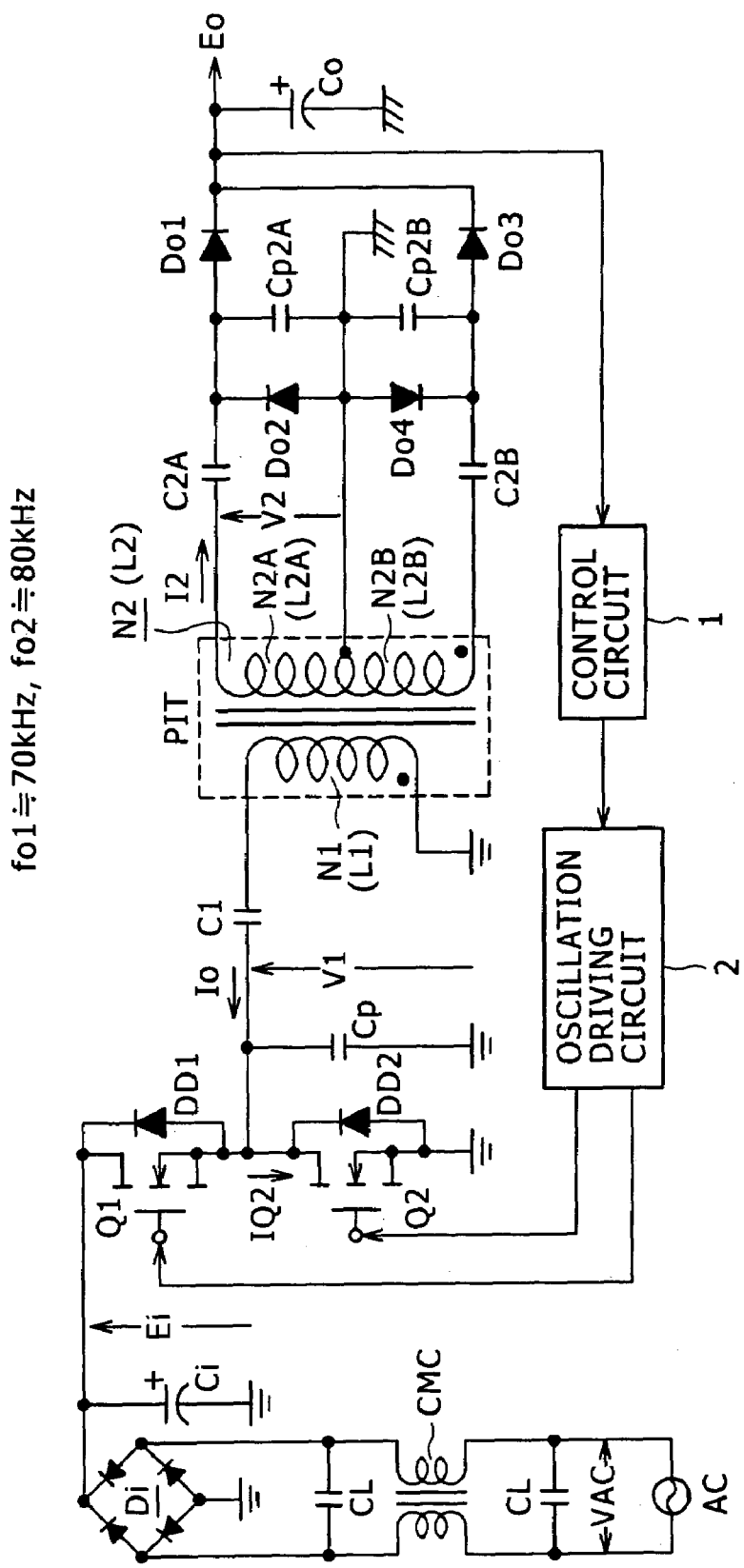
FIG. 37 is a circuit diagram showing an example of the configuration of a power supply circuit according to an eighth embodiment of the present invention.

FIG. 37 shows an example of the configuration of a power supply circuit according to an eighth embodiment of the present invention.

The power supply circuit of the eighth embodiment has a circuit configuration similar to those of FIGS. 17, 28 and so forth. In particular, the power supply circuit includes a full wave rectification circuit (Di, Ci) as a rectification circuit system for producing a rectification smoothed voltage Ei (DC input voltage), and a primary side current resonance type converter which has a basic configuration as a multiple complicated resonance type converter which adopts a half bridge coupling system. Additionally, the power supply circuit includes a secondary side series resonance circuit formed from the secondary winding N2 and a secondary side resonance capacitor. Further, the power supply circuit includes a voltage doubler full wave rectification circuit as a rectification circuit connected to the secondary winding N2.

Further, in the eighth embodiment, the gap G formed in the inner magnetic leg of the core of the insulating converter transformer PIT having, for example, the structure shown in FIG. 2, is set to a gap length of approximately 2.8 mm, and the coupling coefficient k of the insulating converter transformer PIT itself is set to k=approximately 0.65 or less. It is to be noted that the coupling coefficient k was actually set to k=0.65.

Since the power supply circuit of the eighth embodiment shown in FIG. 37 includes the voltage doubler full wave rectification circuit in this manner, where it is configured with the same specifications as those in the power supply circuit of the seventh embodiment shown in FIG. 34 in regard to the AC input voltage condition, load condition and level of the secondary side DC output voltage Eo, the number of turns of each of the secondary winding sections N2A and N2B can be set to 12 T, which is ½ the number of turns of the secondary winding N2 of, for example, the power supply circuit of FIG. 34. The other components of the power supply circuit may be selectively set the same as those of the power supply circuit of the seventh embodiment with which the experimental results of FIGS. 35 and 36 were obtained.

By the component selection described above, the resonance frequency fo1 of the primary side series resonance circuit in the eighth embodiment is set to a predetermined value of fo1≈70 kHz and the resonance frequency fo2 of the secondary side series resonance circuit is set to another predetermined value of fo2≈80 kHz, similar to the power supply circuit of the seventh embodiment.

As a result of an experiment conducted with the power supply circuit of the eighth embodiment shown in FIG. 37, substantially similar operation waveforms to those of FIG. 35 were obtained.

Further, as a variation characteristic of the switching frequency fs with respect to the load variation, where the load power Po varies from Po=0 W to Po=150 W, the necessary control range when the AC input voltage VAC is VAC=100 is 78.4 to 75.0 kHz, and the necessary control range Δ fs1 illustrated in FIG. 7 is Δ fs1=3.4 kHz.

On the other hand, when the AC input voltage VAC is VAC=230 V, the necessary control range is from 95.7 to 90.7 kHz, and the necessary control range Δ fs2 illustrated in FIG. 7 is Δ fs2=5.0 kHz. Also in the present embodiment, the necessary control range for the switching frequency fs for the individual ranges for power supplies of the AC 100 V type and the AC 200 V type is 5 kHz or less which is very narrow. Thus, the necessary control range remains sufficiently lower than 200 kHz, which is an upper limit to the switching driving frequency of a switching element driving IC (oscillation driving circuit 2) at present.

Further, as regards the AC→DC power conversion efficiency (η AC→DC), results of η AC→DC=91.7% at the AC input voltage VAC=100 V and η AC→DC=92.3% at the AC input voltage VAC=230 V were obtained in the load condition of the maximum load power Pomax=150 W. From this result, it can be recognized that, with the present embodiment, an improvement in the AC→DC power conversion efficiency is achieved in a condition in which the input level of the commercial AC power supply is high.

A first modification of the eighth embodiment described above is now described. The first modification of the eighth embodiment has a basic configuration similar to that of the eighth embodiment shown in FIG. 37, but has a configuration ready for a heavier load condition.

The first modification of the eighth embodiment has a configuration similar to that of FIG. 29. In particular, the modified power supply circuit adopts, as the configuration of the primary side and the insulating converter transformer PIT, a configuration ready for a heavy load similar to that of the power supply circuit of the first modification of the fifth embodiment described hereinabove with reference to FIG. 29. In particular, the primary side current resonance type converter has the configuration of a full bridge coupling system. Further, the insulating converter transformer PIT itself is configured such that, for example, the gap length of the gap G of the inner magnetic leg in the structure shown in FIG. 2 is set to approximately 1.6 mm to set the coupling coefficient k to k=approximately 0.75. Further, a high frequency inductor L11 having a predetermined inductance is inserted in a series connection with the primary winding N1 of the insulating converter transformer PIT so that the composite coupling coefficient kt of the insulating converter transformer PIT in the power supply circuit is set to approximately 0.65 or less.

Meanwhile, the resonance frequency fo1 of the primary side series resonance circuit is set to fo1≈70 kHz, which is the same as that of the power supply circuit of FIG. 37, by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2≈80 kHz, which is the same as that of the power supply circuit of FIG. 37, by setting the leakage inductance L2 of the secondary winding N2 in correspondence to the composite coupling coefficient kt and the capacitance of the secondary side series resonance capacitor C2.

If the first modification of the eighth embodiment is actually configured such that it includes a combination of the current resonance type converter of the full bridge connection type and the high frequency inductor L11 as seen in FIG. 29, then, for example, a power supply circuit which can be ready for a maximum load power Pomax=approximately 300 W can be obtained in practical use.

Now, a second modification of the eighth embodiment described above is described. The second modification of the eighth embodiment also has a basic configuration similar to that of the eighth embodiment shown in FIG. 37, but has a configuration ready for a heavier load condition.

The second modification of the eighth embodiment has a configuration similar to that of FIG. 30. However, also in this instance, the resonance frequencies fo1 and fo2 are set in a similar manner as in the first modification of the eighth embodiment described above. In particular, the resonance frequency fo1 of the primary side series resonance circuit is set to fo1≈70 kHz by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2≈80 kHz by setting the leakage inductance L2 of the secondary winding N2 in correspondence to the composite coupling coefficient kt and the capacitance of the secondary side series resonance capacitor C2.

Also, where the second modification of the eighth embodiment is configured as seen in FIG. 30, a power supply circuit which can be ready for a maximum load power Pomax=approximately 300 W can be obtained.

Figure 38:
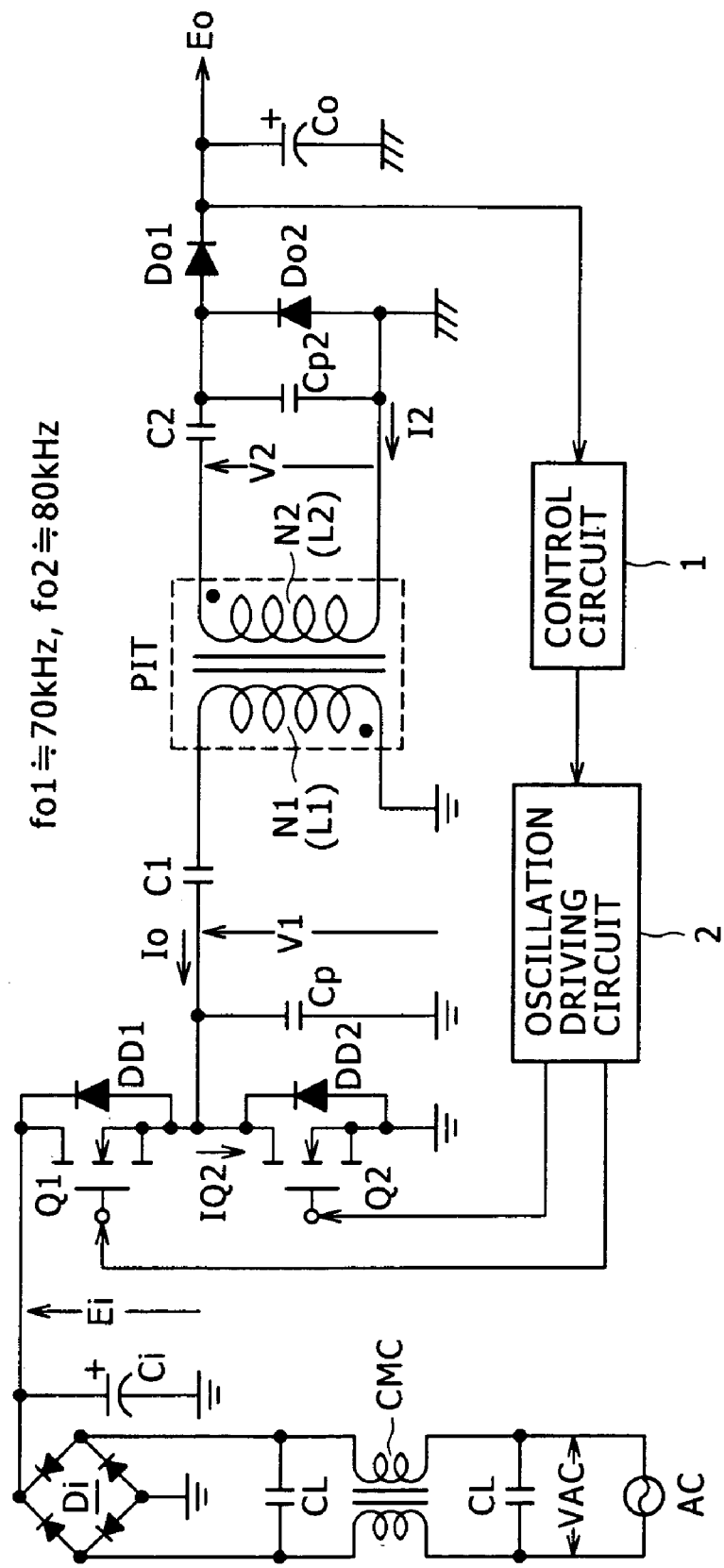
FIG. 38 is a circuit diagram showing an example of the configuration of a power supply circuit according to a ninth embodiment of the present invention.

FIG. 38 shows an example of the configuration of a power supply circuit according to a ninth embodiment of the present invention.

The power supply circuit of the ninth embodiment has a circuit configuration similar to that of FIGS. 11, 31 and so forth. In particular, the power supply circuit includes a full wave rectification circuit (Di, Ci) as a rectification circuit system for producing a rectification smoothed voltage Ei (DC input voltage), and a primary side current resonance type converter which has a basic configuration as a multiple complicated resonance type converter which adopts a half bridge coupling system. Additionally, the power supply circuit includes a secondary side series resonance circuit formed from the secondary winding N2 and a secondary side resonance capacitor. Further, the power supply circuit includes a voltage doubler half wave rectification circuit as a rectification circuit connected to the secondary winding N2.

Further, in the ninth embodiment, the gap G formed in the inner magnetic leg of the core of the insulating converter transformer PIT having, for example, the structure shown in FIG. 2, is set to a gap length of approximately 2.8 mm, and the coupling coefficient k of the insulating converter transformer PIT itself is set to k=approximately 0.65 or less. It is to be noted that the coupling coefficient k was actually set to k=0.65.

Since the power supply circuit of the ninth embodiment shown in FIG. 38 includes the voltage doubler half wave rectification circuit in this manner, where it is configured with the same specifications as those in the power supply circuit of the seventh embodiment shown in FIG. 34 in regard to the AC input voltage condition, load condition and level of the secondary side DC output voltage Eo, the number of turns of the secondary winding N2 can be set to 12 T which is ½ the number of turns of the secondary winding N2 of the power supply circuit, for example, of FIG. 34. The other components of the power supply circuit may be selectively set the same as those of the power supply circuit of the seventh embodiment with which the experimental results of FIGS. 35 and 36 were obtained.

By the component selection described above, the resonance frequency fo1 of the primary side series resonance circuit in the ninth embodiment is set to a predetermined value of fo1≈70 kHz and the resonance frequency fo2 of the secondary side series resonance circuit is set to another predetermined value of fo2≈80 kHz, similar to the power supply circuit of the seventh embodiment.

As a result of an experiment conducted with the power supply circuit of the ninth embodiment shown in FIG. 38, substantially similar waveforms to those of FIG. 35 were obtained. It is to be noted, however, that since the secondary side performs a voltage doubler half wave rectification operation, the current I2 (rectification current) flowing to the secondary winding N2 has a substantially doubled peak level.

Further, as a variation characteristic of the switching frequency fs with respect to the load variation, where the load power Po varies from Po=0 W to Po=150 W, the necessary control range when the AC input voltage VAC is VAC=100 is 78.1 to 75.0 kHz, and the necessary control range Δ fs1 illustrated in FIG. 7 is Δ fs1=3.1 kHz.

On the other hand, when the AC input voltage VAC is VAC=230 V, the necessary control range is from 95.3 to 90.7 kHz, and the necessary control range Δ fs2 illustrated in FIG. 7 is Δ fs2=4.6 kHz. Also in the present embodiment, the necessary control range for the switching frequency fs for the individual ranges for power supplies of the AC 100 V type and the AC 200 V type is smaller than 5 kHz which is very narrow. Thus, the necessary control range remains sufficiently lower than 200 kHz, which is an upper limit to the switching driving frequency of a switching element driving IC (oscillation driving circuit 2) at present.

Further, as regards the AC→DC power conversion efficiency (η AC→DC), results of η AC→DC=91.5% at the AC input voltage VAC=100 V and η AC→DC=92.1% at the AC input voltage VAC=230 V were obtained in the load condition of the maximum load power Pomax=150 W. Thus, an improvement in the AC→DC power conversion efficiency is achieved in a condition in which the input level of the commercial AC power supply is high.

A first modification of the ninth embodiment described above is now described. The first modification of the ninth embodiment has a basic configuration similar to that of the ninth embodiment shown in FIG. 38, but has a configuration ready for a heavier load condition.

The first modification of the ninth embodiment has a configuration similar to that of FIG. 32. In particular, the power supply circuit of the first modification of the ninth embodiment adopts, as the configuration of the primary side and the insulating converter transformer PIT, a configuration ready for a heavy load similar to that of the power supply circuit of the first modification of the sixth embodiment described hereinabove with reference to FIG. 32. In particular, the primary side current resonance type converter has the configuration of a full bridge coupling system. Further, the insulating converter transformer PIT itself is configured such that, for example, the gap length of the gap G of the inner magnetic leg in the structure shown in FIG. 2 is set to approximately 1.6 mm to set the coupling coefficient k to k=approximately 0.75. Further, a high frequency inductor L11 having a predetermined inductance is inserted in a series connection with the primary winding N1 of the insulating converter transformer PIT so that the composite coupling coefficient kt of the insulating converter transformer PIT in the power supply circuit is set to approximately 0.65 or less.

Meanwhile, the resonance frequency fo1 of the primary side series resonance circuit and the resonance frequency fo2 of the secondary side series resonance circuit are set similarly to those of the power supply circuit of FIG. 38. In particular, the resonance frequency fo1 of the primary side series resonance circuit is set to fo1≈70 kHz by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2≈80 kHz by setting the leakage inductance L2 of the secondary winding N2 in correspondence to the composite coupling coefficient kt and the capacitance of the secondary side series resonance capacitor C2.

If the first modification of the ninth embodiment is actually configured such that it includes a combination of the current resonance type converter of the full bridge connection type and the high frequency inductor L11 as seen in FIG. 32, for example, a power supply circuit which can be ready for a maximum load power Pomax=approximately 300 W can be obtained in practical use.

Now, a second modification of the ninth embodiment described above is described. The second modification of the ninth embodiment also has a basic configuration similar to that of the ninth embodiment shown in FIG. 38, but has a configuration ready for a heavier load condition.

The second modification of the ninth embodiment has a configuration similar to that of FIG. 33. However, also in this instance, the resonance frequencies fo1 and fo2 are set in a similar manner as in the first modification of the ninth embodiment described above. In particular, the resonance frequency fo1 of the primary side series resonance circuit is set to fo1≈70 kHz by setting the leakage inductance L1 of the primary winding N1 in correspondence to the composite coupling coefficient kt and the capacitance of the primary side series resonance capacitor C1. Similarly, the resonance frequency fo2 of the secondary side series resonance circuit is set to fo2≈80 kHz by setting the leakage inductance L2 of the secondary winding N2 in correspondence to the composite coupling coefficient kt and the capacitance of the secondary side series resonance capacitor C2.

Also, where the second modification of the ninth embodiment is configured as seen in FIG. 33, a power supply circuit which can be ready for a maximum load power Pomax=approximately 300 W can be obtained.

Now, a tenth embodiment of the present invention is described with reference to FIGS. 39 to 43.

The power supply circuit of the tenth embodiment has a circuit configuration similar to any of those of the embodiments shown in FIGS. 1, 11, 17, 23, 28, 31, 34, 37 and 38. In other words, from a point of view of a circuit diagram, the power supply circuit of the tenth embodiment may have a configuration of a basic multiple resonance converter which includes no high frequency inductors (L11, L12, L12A or L12B).

Figure 39:
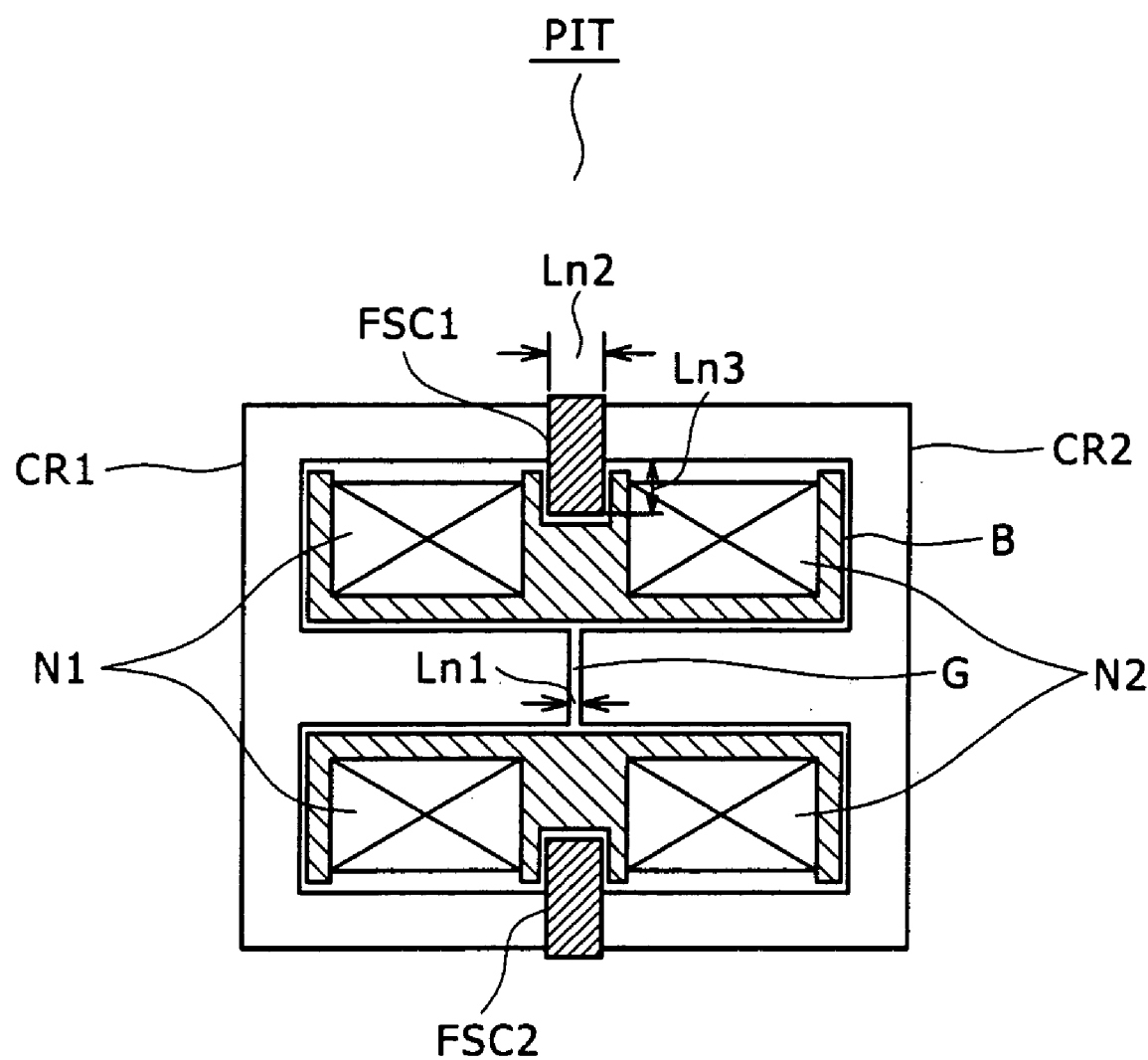
FIG. 39 is a sectional view showing an example of the structure of an insulating converter transformer used in a tenth embodiment of the present invention.

Further, in the tenth embodiment, the insulating converter transformer PIT has, for example, a structure such as that shown in the sectional view of FIG. 39.

The insulating converter transformer PIT shown in FIG. 39 includes an EE type core (EE-shaped core) formed from a pair of E-type cores CR1 and CR2 made of a ferrite material and combined with each other such that the magnetic legs thereof are opposed to each other. It is to be noted that actually an EER type core may be selectively used.

Also in this instance, the primary winding N1 and the secondary winding N2 are wound on winding receiving portions of a bobbin B which are different from each other. The bobbin B in this instance is made of, for example, a resin material and has such a divisional shape that the winding receiving portions on the primary side and the secondary side thereof are separated from each other so as to be independent of each other. The bobbin B on which the primary winding N1 and the secondary winding N2 are wound in this manner is attached to the EE type core (CR1, CR2). Consequently, the primary winding N1 and the secondary winding N2 are wound on the inner magnetic leg of the EE type core.

A gap G is formed in the inner magnetic leg of the EE type core in the manner shown in FIG. 39. The gap G in this instance is formed such that the gap length Ln1 thereof is set, for example, to approximately 1.6 mm. Consequently, in a form of the insulating converter transformer PIT in which ferrite sheet cores FSC1 and FSC2 described below are not inserted, the coupling coefficient k of the insulating converter transformer PIT itself is approximately k=approximately 0.75.

In the insulating converter transformer PIT shown in FIG. 39, the ferrite sheet cores FSC1 and FSC2 are provided in a sandwiched state between central portions of the two outer magnetic legs of the EE type core, that is, portions of the outer magnetic legs at the boundary between the winding receiving portion for the primary winding N1 and the winding receiving portion for the secondary winding N2. The ferrite sheet cores FSC1 and FSC2 have a predetermined thickness Ln2.

The ferrite sheet cores FSC1 and FSC2 in this instance are made of ferrite similar to the E type cores CR1 and CR2 as can be recognized from their name and are provided in a state in which they are held between the outer magnetic legs. Further, the ferrite sheet cores FSC1 and FSC2 are provided such that each of them has a portion (magnetic path generation portion) of a predetermined length Ln3 projecting toward the inner magnetic leg of the EE type core from the inner side end face portion of an outer magnetic leg. Consequently, the end portions of the ferrite sheet cores FSC1 and FSC2 are inserted by a predetermined length at the location between the winding receiving portions of the bobbin B for the primary winding N1 and the secondary winding N2.

Here, in the case of a simple EE type core structure wherein the ferrite sheet cores FSC1 and FSC2 are not inserted, for example, like the insulating converter transformer PIT described hereinabove with reference to FIG. 2, magnetic paths are formed as indicated by magnetic fluxes $\phi 1$ and $\phi 2$ in FIG. 40A. It is to be noted that, in FIGS. 40A and 40B, the bobbin B is omitted to facilitate understanding of the illustration.

Figure 40A:
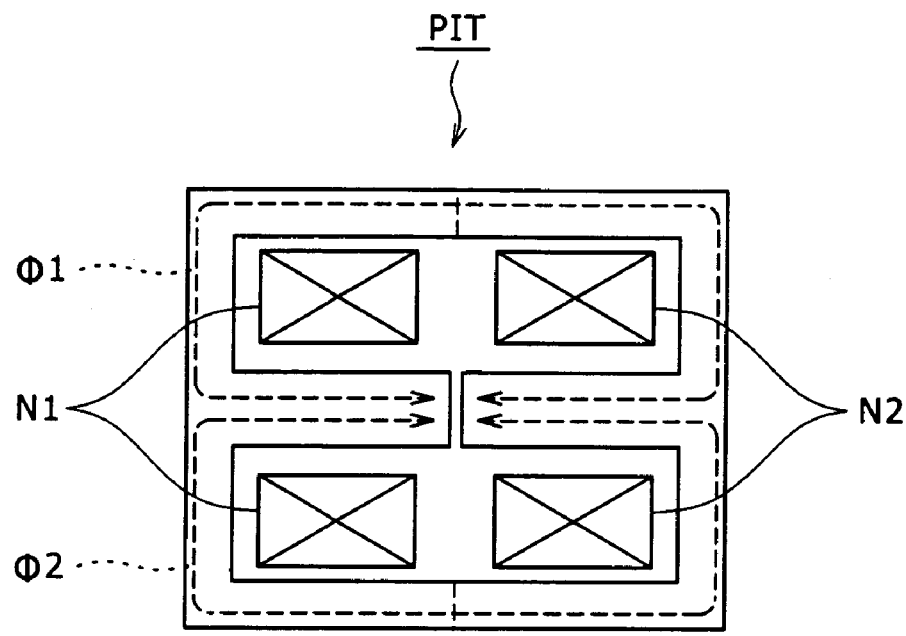
FIGS. 40A and 40B are sectional views illustrating magnetic paths of the insulating converter transformer used in the tenth embodiment.

As can be seen from FIG. 40A, the magnetic paths of the magnetic fluxes $\phi 1$ and $\phi 2$ extend along the outer magnetic legs such that they pass through the primary winding N1 side and the secondary winding N2 side. Therefore, the original coupling degree between the primary winding N1 and the secondary winding N2 is correspondingly high, and such a coupling coefficient k of the insulating converter transformer PIT as k=approximately 0.75 mentioned hereinabove is obtained by forming the gap G of a gap length of approximately 1.6 mm in the inner magnetic leg.

Figure 40B:
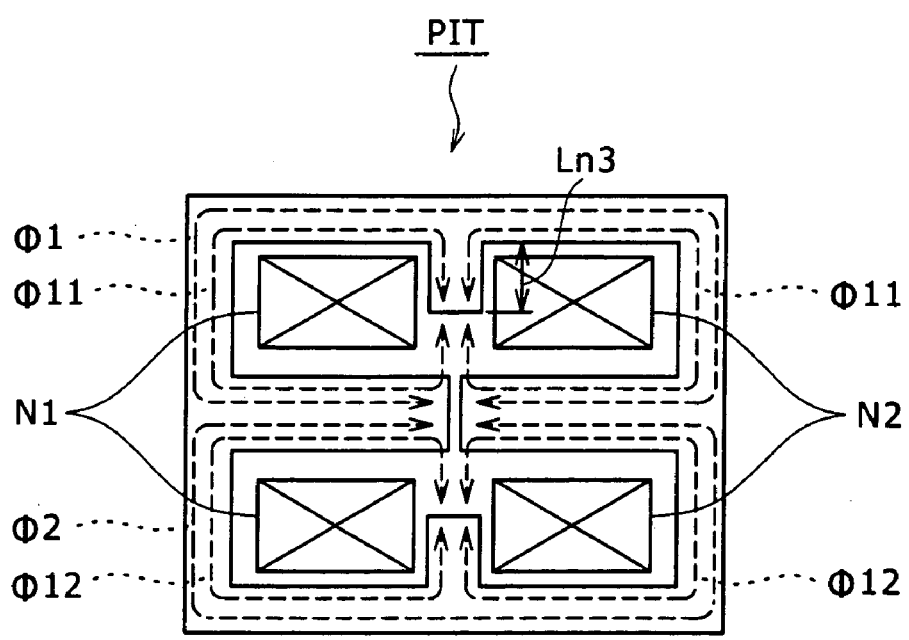

In contrast, where the ferrite sheet cores FSC1 and FSC2 are provided in such a manner as seen in FIG. 39, since the E type cores CR1 and CR2 are made of the same ferrite material as that of the ferrite sheet cores FSC1 and FSC2, it is possible to consider that the EE type core has a shape in which a central portion of each of the outer magnetic legs projects toward the central portion of the inner magnetic leg as seen in FIG. 40B. According to the shape of the EE type core just described, the spatial distance between the central portion of each of the outer magnetic legs and the central portion of the inner magnetic leg is shorter by the length Ln3 of the projecting portion (magnetic path generation portion) than that of the EE type core shape of FIG. 40A.

As the central portions of the outer and inner magnetic legs come nearer to each other, in the insulating converter transformer PIT in FIG. 39, magnetic fluxes denoted by $\phi 11$ and $\phi 12$ and indicated by broken lines in FIG. 40B are generated. The amount of the components of the magnetic fluxes $\phi 11$ and $\phi 12$ increases as the length Ln3 of the projecting portions of the ferrite sheet cores FSC1 and FSC2 increases so as to decrease the spatial distance between the central portions of the outer magnetic legs and the central portion of the inner magnetic leg. Meanwhile, the amount of the component of the magnetic fluxes $\phi 1$ and $\phi 2$ decreases.

The magnetic paths of the magnetic fluxes $\phi 11$ and $\phi 12$ are formed corresponding to the primary winding N1 side and the secondary winding N2 side, respectively. Accordingly, that the magnetic fluxes $\phi 11$ and $\phi 12$ increase as the component amount of the magnetic fluxes $\phi 1$ and $\phi 2$ decreases signifies that the coupling degree between the primary winding N1 and the secondary winding N2, that is, the composite coupling coefficient kt, increases. Then, as a result of the increase of the composite coupling coefficient kt, the value of the leakage inductance between the primary winding N1 side and the secondary winding N2 side of the insulating converter transformer PIT increases equivalently from the amount which depends upon the gap G of the inner magnetic leg.

Figure 41:
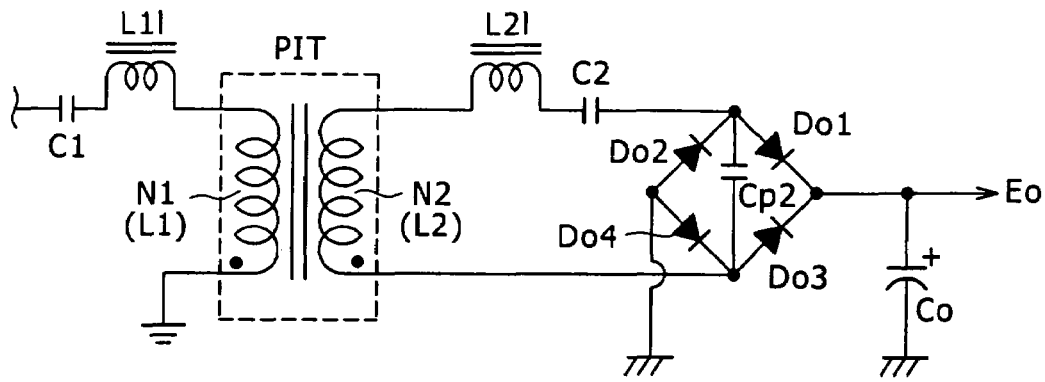
FIGS. 41 to 43 are circuit diagrams showing equivalent circuits used in the power supply circuit according to the tenth embodiment.
Figure 42:
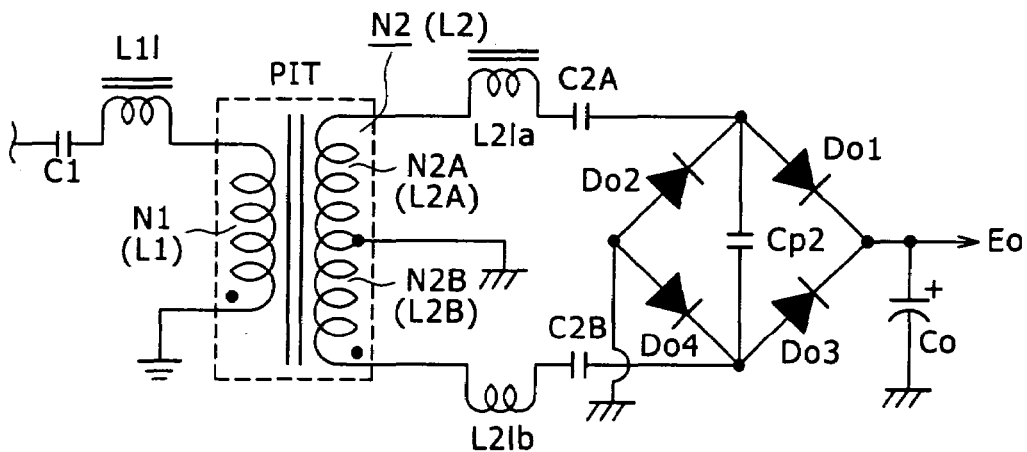
Figure 43:
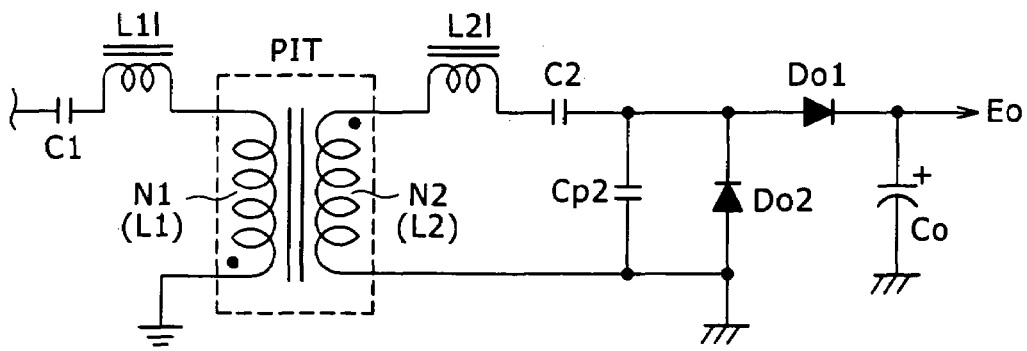

Circuit diagrams of equivalent circuits of the power supply circuit which include the insulating converter transformer PIT described above with reference to FIG. 39 are shown in FIGS. 41 to 43.

In particular, FIG. 41 shows an equivalent circuit to the power supply circuit which includes a full wave rectification circuit in the secondary side rectification circuit.

Referring to FIG. 41, the insulating converter transformer PIT shown has a leakage inductance L1 of the primary winding N1 determined from the gap G as a factor and another leakage inductance L2 of the secondary winding N2. This applies similarly to the equivalent circuits shown in FIGS. 42 and 43.

Further, equivalent increasing amounts of the leakage inductances by the provision of the ferrite sheet cores FSC1 and FSC2 in the insulating converter transformer PIT can be represented as an inductor L11 connected in series to the primary winding N1 and another inductor L21 connected in series to the secondary winding N2, respectively. In other words, it can be regarded that the power supply circuit has a circuit configuration which includes the high frequency inductor L11 on the primary side and the high frequency inductor L12 on the secondary side as provided in the first and second modifications to the fourth to ninth embodiments described hereinabove.

FIG. 42 shows an equivalent circuit to the power supply circuit which includes a voltage doubler full wave rectification circuit in the secondary side rectification circuit like the power supply circuits, for example, shown in FIGS. 17, 21, 22, 28, 29, 30 and 37. It is to be noted that, although the same voltage doubler full wave rectification circuit as those shown in FIGS. 28 and 29 is shown in FIG. 42, similar equivalent circuits also can be formed with regard to the voltage doubler full wave rectification circuits shown in the remaining figures.

In the power supply circuit shown in FIG. 42, in which an insulating converter transformer PIT having the structure described hereinabove with reference to FIG. 39 is provided, equivalent increasing amounts of the leakage inductances by the provision of the ferrite sheet cores FSC1 and FSC2 can be represented as an inductor L11 connected in series with the primary winding N1 and inductors L21$a$ and L21$b$ connected in series with the secondary winding sections N2A and N2B, respectively. Accordingly, in this instance, it can be regarded that the power supply circuit has a circuit configuration which includes the high frequency inductor L11 on the primary side and the high frequency inductors L12A and L12B corresponding to the voltage doubler full wave rectification circuit on the secondary side.

FIG. 43 shows an equivalent circuit to the power supply circuit which includes a voltage doubler half wave rectification circuit in the secondary side rectification circuit like the power supply circuits, for example, shown in FIGS. 11, 15, 31, 32, 33 and 38. It is to be noted that, although a voltage doubler half wave rectification circuit having a circuit configuration different from those of the figures mentioned above is shown in FIG. 16, a circuit diagram of an equivalent circuit to the circuit of FIG. 16 can be produced by connecting, based on the circuit diagram of FIG. 16, an inductor L11 in series with the primary winding N1 and connecting another inductor L21 in series with the secondary winding N2.

In the power supply circuit shown in FIG. 43, in which the insulating converter transformer PIT having the structure described hereinabove with reference to FIG. 39 is provided, equivalent increasing amounts of the leakage inductances by the provision of the ferrite sheet cores FSC1 and FSC2 can be represented as an inductor L11 connected in series with the primary winding N1 and another inductor L21 connected in series with the secondary winding N2, respectively. Accordingly, also in this instance, it can be regarded that the power supply circuit has a circuit configuration which includes the high frequency inductor L11 on the primary side and the high frequency inductor L12 corresponding to the voltage doubler half wave rectification circuit on the secondary side.

Based on the formation of the equivalent circuits shown in FIGS. 41 to 43, according to the tenth embodiment, for example, the inductances of the inductor L11 on the primary side and the inductor L21 (inductors L21$a$ and L21$b$) on the secondary side are set so that the composite coupling coefficient kt of the insulating converter transformer PIT is set to kt=approximately 0.65 or less. The inductances can be set principally by the length Ln3 (and thickness Ln2) of the projecting portions (magnetic path generation portions) of the ferrite sheet cores FSC1 and FSC2.

By setting the composite coupling coefficient kt of the insulating converter transformer PIT to kt=approximately 0.65 or less in this manner, a unimodal characteristic described hereinabove with reference to FIGS. 6 and 7 is obtained as the control characteristic of the secondary side DC voltage in a similar manner as with the power supply circuits of those embodiments which include the high frequency inductor L11 on the primary side, or the high frequency inductor L12 or high frequency inductors L12A and L12B on the secondary side. Consequently, the power supply circuit can be ready for a wide range.

It is described here for confirmation that, in the structure of the insulating converter transformer PIT in the tenth embodiment, as described hereinabove with reference to FIG. 39, the gap G of the inner magnetic leg has a gap length (Ln1) of approximately 1.6 mm, similar to the above-described embodiments. Further, the ferrite sheet cores FSC1 and FSC2 provided for the outer magnetic legs merely give rise to a variation of the magnetic flux condition, and even if an equivalent increase of the leakage inductance is provided, an increase of the leakage inductance does not actually occur. Accordingly, the insulating converter transformer PIT is free from the problem of increasing eddy current loss in the proximity of the inner magnetic leg.

Further, as can be understood from the foregoing description, the composite coupling coefficient kt may be set such that a portion of the length Ln3 as a magnetic path generation portion is formed on the basic shape of the EE type core. Therefore, when the core of the insulating converter transformer PIT is to be shaped, for example, E type cores deformed so as to obtain the actual core shape as shown, for example, in FIG. 40B may be shaped and combined with each other without using a ferrite sheet core.

However, in the present embodiment, it is taken into consideration that, under present conditions, it is simpler and easier as a production process to sandwich the ferrite sheet cores (FSC1 and FSC2) in the outer magnetic legs of the core than to shape such an E shaped core as described above.

It is to be noted that, in the foregoing description, the coupling coefficient between the primary side and the secondary side of the insulating converter transformer PIT itself is represented by k, while the coupling coefficient between the primary side and the secondary side of the insulating converter transformer PIT in the power supply circuit is represented by kt so that they are distinguished from each other.

However, where a high frequency inductor is not connected in series to the primary winding N1 and/or the secondary winding N2 of the insulating converter transformer PIT, as in the embodiments and modifications described hereinabove except the first and second modifications of the fourth to ninth embodiments, if it is regarded that the inductance of the high frequency inductor is 0, then the composite leakage inductance of the insulating converter transformer PIT in the circuit can be represented as L1+0 where the leakage inductance of the primary winding N1 itself is represented by L1, or as L2+0 where the leakage inductance of the secondary winding N2 itself is represented by L2. As a concept in the present invention, the coupling coefficient k in this instance should be handled as the composite coupling coefficient kt where the inductance of the high frequency inductor is 0.

The present invention should not be restricted to the embodiments described hereinabove.

For example, according to the equivalent circuit diagrams shown in FIGS. 41 to 43, the power supply circuit may be configured such that the coupling coefficient k of the insulating converter transformer PIT itself is set to k=approximately 0.75 and actual part elements as the high frequency inductors L11 and L12 of predetermined inductance values are connected in series to the primary winding N1 and the secondary winding N2, respectively.

Further, the structure of the insulating converter transformer PIT beginning with the core type and so forth may be modified suitably as far as necessary magnetic paths are formed. However, as regards the first to third embodiments, if the gap length of the gap G formed in the core of the insulating converter transformer PIT is expanded to such a degree that, for example, a coupling coefficient k=approximately 0.65 is obtained, then a steep rising tendency of the switching frequency appearing in a light load condition in the related-art power supply circuit can be suppressed.

Further, while the switching converters illustrated in the embodiments are based on a separately excited current resonance type converter, it is possible to form a power supply circuit alternatively including, for example, a self-excited current resonance converter. Further, the switching elements used in the switching converters may each be formed from some other element than a MOS-FET such as, for example, a bipolar transistor or an IGBT (Insulated Gate Bipolar Transistor).

Further, the constants and so forth of the part elements described hereinabove may be suitably changed in accordance with actual conditions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A switching power supply circuit, comprising:
   a switching circuit including a switching device operable to perform a switching operation at a switching frequency based on a DC input voltage, the switching operation resulting in a switching output;
   a switching driving unit operable to drive the switching device to perform the switching operation;
   an insulating converter transformer having a core with a primary winding on a primary side and a secondary winding on a secondary side, the primary winding being supplied with the switching output of the switching operation, and the secondary winding having an alternating voltage induced therein by the primary winding, the core having a gap formed at a predetermined position between the primary side and the secondary side, the gap having a length selected to produce a predetermined coupling coefficient between the primary side and the secondary side;
   a primary side series resonance circuit including a leakage inductance component of the primary winding and a capacitance of a primary side series resonance capacitor connected in series with the primary winding for producing a predetermined primary side resonance frequency for making the switching circuit operate on a current resonance basis;
   a secondary side series resonance circuit including a leakage inductance component of the secondary winding and a capacitance of a secondary side series resonance capacitor connected in series with the secondary winding for producing a predetermined secondary side resonance frequency;
   the primary side series resonance circuit and the secondary side series resonant circuit forming an electromagnetic coupling type resonance circuit;
   a secondary side DC output voltage production unit operable to input a resonance output from the secondary side series resonance circuit and to perform a rectification operation on the input resonance output to produce a secondary side DC output voltage;
   a constant voltage control unit operable to control the switching driving unit in response to a level of the secondary side DC output voltage to adjust the switching frequency of the switching circuit to perform constant voltage control for the secondary side DC output voltage; and
   a composite coupling coefficient setting unit operable to set a composite coupling coefficient between the primary side and the secondary side of the insulating converter transformer so that the electromagnetic coupling type resonance circuit has a unimodal output characteristic with respect to an input of a frequency signal having the switching frequency.

2. The switching power supply circuit according to claim 1, wherein the secondary side resonance frequency is lower than the primary side resonance frequency.

3. The switching power supply circuit according to claim 1, wherein the secondary side resonance frequency is higher than the primary side resonance frequency.

4. The switching power supply circuit according to claim 1, wherein the secondary side resonance frequency has a predetermined value within a range between a lower limit frequency represented by a predetermined magnification value less than 1 and an upper limit frequency represented by a predetermined magnification value greater than 1 with respect to the primary side resonance frequency.

5. The switching power supply circuit according to claim 1, wherein the composite coupling coefficient setting unit includes the insulating converter transformer, and the length of the gap in the core of the insulating converter transformer is selected so that the composite coupling coefficient between the primary side and the secondary side of the insulting converter transformer is based on the coupling coefficient of the insulating converter transformer.

6. The switching power supply circuit according to claim 1, wherein the composite coupling coefficient setting unit includes:

the insulating converter transformer, wherein the length of the gap in the core of the insulating converter transformer is selected so that the coupling coefficient of the insulating converter transformer has a predetermined value higher than the composite coupling coefficient; and an inductor having a predetermined inductance connected in series with the primary winding and/or the secondary winding of the insulating converter transformer.

7. The switching power supply circuit according to claim 1, wherein the composite coupling coefficient setting unit includes the insulating converter transformer, the insulating converter transformer including a magnetic path generating portion operable to equivalently form an inductor connected in series with the primary winding and/or the secondary winding of the insulating converter transformer.

8. The switching power supply circuit according to claim 7, wherein the core of the insulating converter transformer is an EE type core having a pair of outer magnetic legs and an inner magnetic leg, and the magnetic path generating portion includes a projection formed on at least one of the outer magnetic legs so as to project toward the inner magnetic leg.

9. The switching power supply circuit according to claim 1, wherein the secondary side DC output voltage producing unit includes a rectification device having on and off conditions, the switching power supply circuit further comprising a secondary side partial resonance capacitor having a capacitance that cooperates with the leakage inductance component of the secondary winding to form a partial resonance circuit, the partial resonance circuit being operable to perform a partial resonance operation when the rectification device is in the off condition.

10. The switching power supply circuit according to claim 1, wherein the switching circuit includes four switching devices connected in a full bridge connection.

11. The switching power supply circuit according to claim 1, further comprising a rectification smoothing circuit operable to input a commercial AC power supply voltage and to output the DC input voltage as a rectification smoothed voltage, the rectification smoothing circuit being a voltage doubler rectification circuit operable to form the rectification smoothed voltage at twice the voltage of the commercial AC power supply voltage.

12. The switching power supply circuit according to claim 1, wherein the secondary side DC output voltage producing unit includes a bridge rectification circuit including rectification devices connected in a bridge connection to produce a rectification output and a secondary side smoothing capacitor operable to smooth the rectification output, the bridge rectification circuit performing a full wave rectification operation.

13. The switching power supply circuit according to claim 1, wherein the secondary side DC output voltage producing unit is a voltage doubler rectification circuit operable to produce the secondary side DC output voltage at twice the voltage of the alternating voltage induced in the secondary winding.

14. The switching power supply circuit according to claim 13, further comprising a secondary side smoothing capacitor, wherein the voltage doubler rectification circuit is a voltage doubler half-wave rectification circuit formed so as to charge a rectification current within only ones of half cycles of the alternating voltage induced in the secondary winding into the secondary side smoothing capacitor to produce at least part of the secondary side DC output voltage as a voltage across the secondary side smoothing capacitor.

15. The switching power supply circuit according to claim 13, further comprising a secondary side smoothing capacitor, wherein the voltage doubler rectification circuit is a voltage doubler full-wave rectification circuit formed so as to charge a rectification current within both of half cycles of the alternating voltage induced in the secondary winding into the secondary side smoothing capacitor to produce at least part of the secondary side DC output voltage as a voltage across the secondary side smoothing capacitor.

* * * * *